US008060347B2

(12) United States Patent
Dong et al.

(10) Patent No.: US 8,060,347 B2
(45) Date of Patent: Nov. 15, 2011

(54) COMPLEXITY MANAGEMENT FOR VEHICLE ELECTRICAL/ELECTRONIC ARCHITECTURE DESIGN

(75) Inventors: Yibing Dong, Rochester Hills, MI (US); Salim Momin, Troy, MI (US)

(73) Assignee: Mentor Graphics Corporation, Wilsonville, OR (US)

( * ) Notice: Subject to any disclaimer, the term of this patent is extended or adjusted under 35 U.S.C. 154(b) by 494 days.

(21) Appl. No.: 12/181,832

(22) Filed: Jul. 29, 2008

(65) Prior Publication Data
US 2010/0031212 A1     Feb. 4, 2010

(51) Int. Cl.
*G06F 17/50* (2006.01)
(52) U.S. Cl. .......................................................... 703/1
(58) Field of Classification Search .............. 703/2, 7, 703/1; 710/1; 250/221; 701/1, 2, 29, 33
See application file for complete search history.

(56) References Cited

U.S. PATENT DOCUMENTS

| | | | |
|---|---|---|---|
| 2003/0014229 A1* | 1/2003 | Borth et al. ................... | 703/2 |
| 2004/0139238 A1* | 7/2004 | Luhrs ............................ | 710/1 |
| 2005/0080502 A1 | 4/2005 | Chernyak et al. | |
| 2005/0240383 A1* | 10/2005 | Hashima et al. ................ | 703/7 |
| 2006/0025897 A1* | 2/2006 | Shostak et al. ................. | 701/1 |
| 2006/0208169 A1* | 9/2006 | Breed et al. .................. | 250/221 |
| 2007/0100520 A1* | 5/2007 | Shah et al. .................... | 701/33 |
| 2007/0294001 A1* | 12/2007 | Underdal et al. ............... | 701/29 |
| 2008/0052049 A1* | 2/2008 | Moriyama et al. ............. | 703/2 |
| 2008/0195261 A1* | 8/2008 | Breed .......................... | 701/2 |

OTHER PUBLICATIONS

Freescale, V-Architect Tool Suite, Freescale Semiconductor, Inc., 2006, Document number: VARCHITECTTSFS/ Rev 0, 2 pages.

* cited by examiner

*Primary Examiner* — Kandasamy Thangavelu
(74) *Attorney, Agent, or Firm* — Mentor Graphics Legal Department

(57) ABSTRACT

Disclosed herein are computer aided design (CAD) techniques to implement a unified data schema and graphical user interface (GUI) to link ECU/devices, in-vehicle communications, and vehicle harness information together with respect to architectural relation, performance relation, and cost relation, and to facilitate a designer's understanding and manipulation of this information. The domain-specific information from each domain is converted to objects in this unified data schema and stored in a unified database that is accessible to every domain, so that the impact of the current state in the device domain can be accessed and analyzed by a designer from any domain. This approach enables design data sharing and real-time collaboration between different electrical/electronic (E/E) design domains, thereby facilitating the realization of design data collaboration, design change management, and product lifetime management (PLM) and product data management (PDM) implementation.

30 Claims, 64 Drawing Sheets

COMPLEXITY MANAGEMENT FOR VEHICLE ELECTRICAL/ELECTRONIC ARCHITECTURE DESIGN

CROSS-REFERENCE TO RELATED APPLICATIONS

The present disclosure is related to U.S. patent application Ser. No. 12/181,824, entitled "GUI-FACILITATED CHANGE MANAGEMENT FOR VEHICLE ELECTRICAL/ELECTRONIC ARCHITECTURE DESIGN" having common inventorship and filed on even date herewith, and U.S. patent application Ser. No. 12/181,828, entitled "GUI-FACILITATED SIMULATION AND VERIFICATION FOR VEHICLE ELECTRICAL/ELECTRONIC ARCHITECTURE DESIGN" having common inventorship and filed on even date herewith, the entireties of which are incorporated by reference herein.

FIELD OF THE DISCLOSURE

The present disclosure relates generally to computer assisted design (CAD) for vehicle electrical/electronic (E/E) architecture and product lifetime management (PLM) and more particularly to complexity management in vehicle E/E architecture design.

BACKGROUND

Electronic systems are no longer isolated with a vehicle; instead they are distributed with their functionality dependent on multiple electronic control units (ECUs) and sub-systems connected over numerous harnesses and network buses. However, the specification of these distributed systems does not fit well with conventional vehicle design methodologies, which are based on the design self-contained systems. For proper and reliable operation, the interfaces between sub-systems/ECUs must be not only specified at the signal/connectivity level, but also must meet specified performance requirements. This ensures that when the vehicle manufacturer (who typically plays the role of systems integrator) integrates the various components from various suppliers, the vehicle electrical system will perform as expected. Therefore, a key to a successful integration at the vehicle level is to accurately characterize the complete electrical/electronics (E/E) architecture of the vehicle, which comprises: power/ground distribution; electrical connectivity (i.e., wiring); network buses, network topology and messaging strategies; and distribution of system functionality into electronic control units (ECUs) and other devices. Due to the complexity of modern vehicles, vehicle manufactures have evolved from a component/subsystem focus to specifying a performance-driven E/E architecture for the vehicle. However, the designers of an E/E architecture for a vehicle typically are compartmentalized into separate design domains, such as wire harness design, software design, electronic control unit (ECU) design, network bus design, and the like. In most instances, the designers in a given design domain focus on the architecture of that domain with little collaboration or information sharing among the various design domains, resulting in a bottom-up development process that can introduce cost overruns, delay the final development of the E/E architecture, and produce a non-optimal E/E architecture for the vehicle.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIGS. 20-25 are diagrams illustrating example GUIs that facilitate editing of signals of a vehicle library in accordance with at least one embodiment of the present invention.

FIGS. 46-54 are diagrams illustrating example GUIs that facilitate the initial VVD/complexity determination process of FIG. 45 in accordance with at least one embodiment of the present invention.

DETAILED DESCRIPTION

Figure 1:
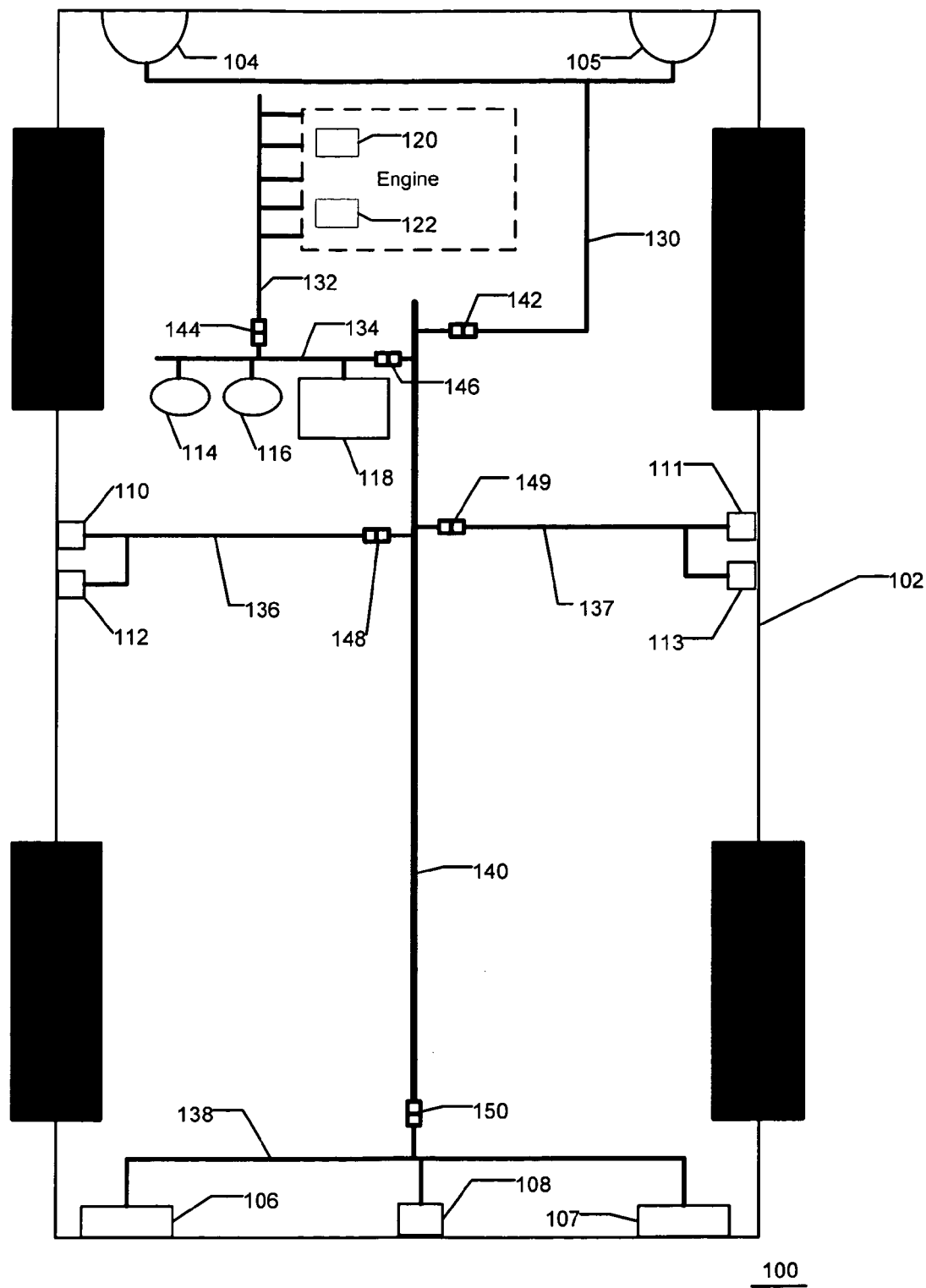
FIG. 1 is a diagram illustrating an example electrical/electronic (E/E) architecture for a vehicle in accordance with at least one embodiment of the present invention.
Figure 64:
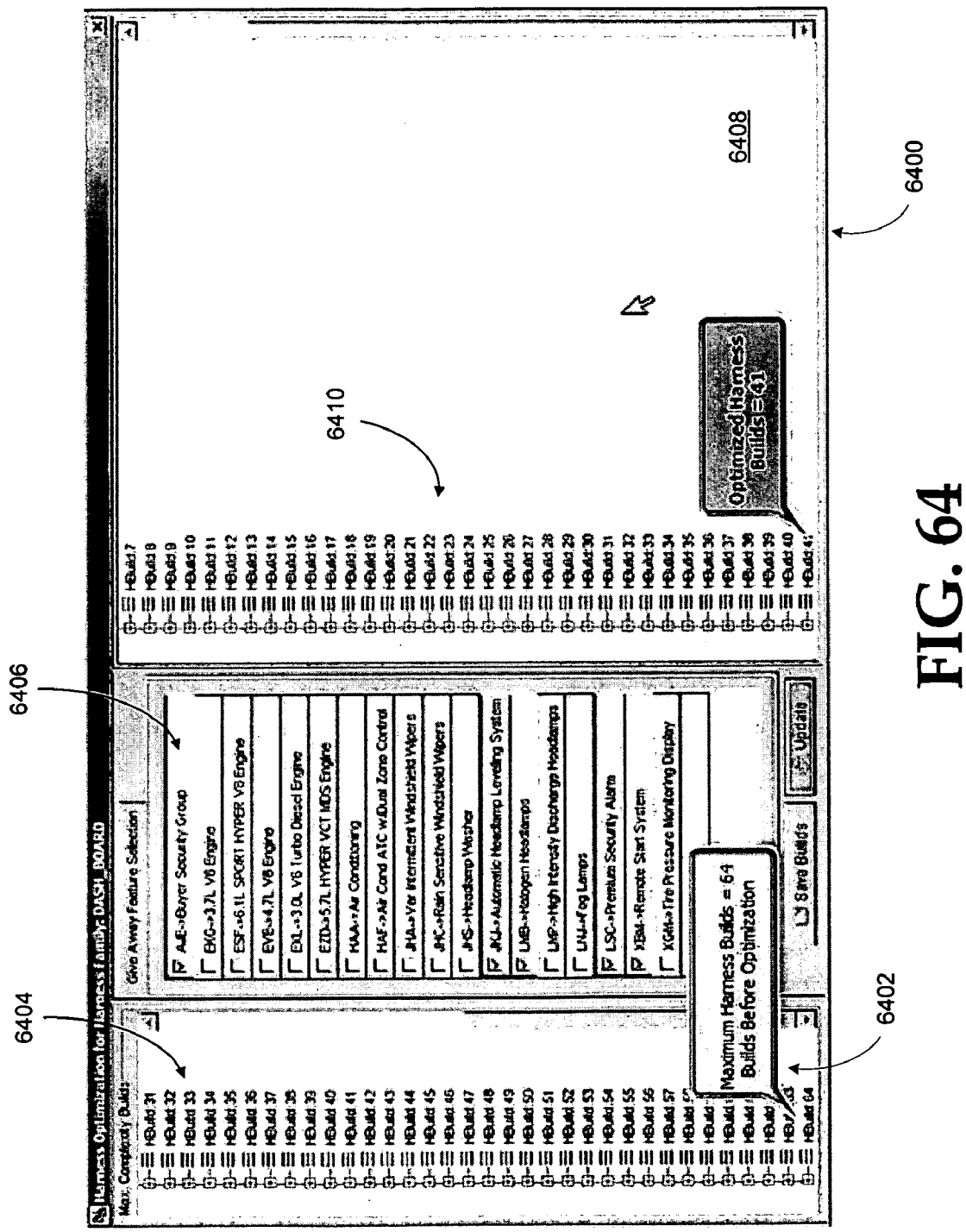

As noted above, vehicle manufactures have evolved from a component/subsystem focus to specifying a performance-driven E/E architecture for the vehicle. Accordingly, the vehicle manufacturer would benefit from a system-level design, specification and validation environment and methodology to enable specification of a performance-drive E/E architecture. FIGS. 1-64 illustrate example techniques for such an environment.

In general, the E/E design for a vehicle manufacturer is separated into three major domains: the device domain responsible for designing the electronic control units (ECUs) and other devices (e.g., actuators, sensors, etc.); the harness (or wiring) domain responsible for designing the wire harness connections; and the network domain responsible for designing the in-vehicle network buses (such as controller area network (CAN) buses, local interconnect network (LIN) buses, FlexRay buses, etc.). From these main design domains arise two other common domains: the software domain responsible for designing the software to implement the functionality assigned to software-based ECUs; and the subsystem domain responsible for integration of all of the E/E components on a sub-system level (e.g., for the instrument panel of a vehicle). Each domain may use different and separate design tools to carry out their design responsibilities. In conventional design environments, the different design domains typically are segregated such that inter-domain communication typically is conducted via in-person meetings or via email communications. This inefficient communication strategy can negatively affect the quality of the designs and can limit the productivity of the designers. It often is the case that the design requirements generated from each domain that affect the other domains are out-of-sync, inconsistent, or incomplete. Without effective collaboration, there is substantial effort by the designers to catch-up to the current state in each domain.

To address this issue, the present disclosure describes a design system that implements a unified data schema to link product planning data (including volume planning or "take-rate" data), ECU/devices, in-vehicle communications, and vehicle harness information together with respect to architectural relation, performance relation, and cost relation. The domain-specific information from each domain is converted to objects in this unified data schema and stored in a unified database that is accessible to every domain, so that the impact of the current state in the device domain can be accessed and analyzed by a designer from, for example, the harness domain. Thus, once imported into the unified database, the object-oriented approach of the unified database enables design data sharing and collaboration between different E/E design/development teams and domains, thereby facilitating the realization of design data collaboration, design change management, and product lifetime management (PLM) and product data management (PDM) implementation into each object level.

The unified database, in one embodiment, uses an object-oriented approach to represent each component in the E/E architecture of a vehicle platform, including: ECU/device specifications; logical harness design information, physical harness design information; in-vehicle network information; power/ground distribution; and inline connectivity. The unified schema objects of the database link the components together based on their logical and physical relationships. The linked relationships represented in the unified database facilitates design collaboration, design change management, and product optimization between different design domains throughout the vehicle platform.

In at least one embodiment, the computer aided design (CAD) system implementing the unified database uses graphical user interface (GUI) to facilitate the design collaboration between domains. The use of the GUI to graphically present relationships between components of the E/E architecture, to graphically present the impacts of changes within the E/E architecture at every object level, and to graphically present the simulated performance characteristics of the E/E architecture permits the designers to rapidly assess and modify the E/E architecture in a collaborative manner to achieve a higher-quality E/E architecture design.

FIG. 1 illustrates a schematic 100 of a simplified representation of the electrical/electronic (E/E) architecture of an automobile 102 in accordance with at least one embodiment of the present disclosure. The electrical configuration of the automobile 102 includes a plurality of devices interconnected via one or more harnesses and network busses. In the depicted simplified example, the plurality of devices includes headlamp assemblies 104 and 105, tail lamp assemblies 106 and 107, a trunk latch actuator 108, door latch actuators 110 and 111, power window switch assemblies 112 and 113, instrument panel gauge 114, instrument panel heating/cooling control panel 116, navigation display 118, engine sensor 120 (e.g., an oxygen sensor), engine control unit 121 (e.g., an ignition ECU), and the like. The harnesses include a front headlamp harness 130, an engine harness 132, an instrument panel harness 134, a left door harness 136, a right door harness 137, and a rear headlamp harness 138. The electrical configuration also includes a body network bus 140 (e.g., a controller area network (CAN) bus). In the example of FIG. 1, the front headlamp harness 130 is connected to the headlamps 104 and 105 and connected to the body network bus 140 via an inline 142. The engine harness 132 is connected to the engine sensor 120 and the engine control unit 121 and connected to the instrument panel harness 134 via an inline 144. The instrument panel harness 134 is connected to the instrument panel gauge 114, the instrument panel heating/cooling control panel 116, and the navigation display 118 and connected to the body network bus 140 via an inline 146. The left door harness 136 is connected to the door latch actuator 110 and the power window switch assembly 112 and connected to the body network bus 140 via an inline 148. The right door harness 137 is connected to the door latch actuator 111 and the power window switch assembly 113 and connected to the body network bus 140 via an inline 149. The rear headlamp harness 138 is connected to the rear headlamps 106 and 107 and the trunk latch actuator 108 and connected to the body network bus 140 via an inline 150.

The components of the electrical configuration further can be logically organized into various subsystems. To illustrate, the headlamps 104 and 105 and the front headlamp harness 130 can be logically grouped as a front headlamp subsystem, and the instrument panel harness 134, the instrument panel gauge 114, the instrument panel heating/cooling control panel 116, and the navigation display 118 can be logically grouped as an instrument panel subsystem, etc.

Figure 2:
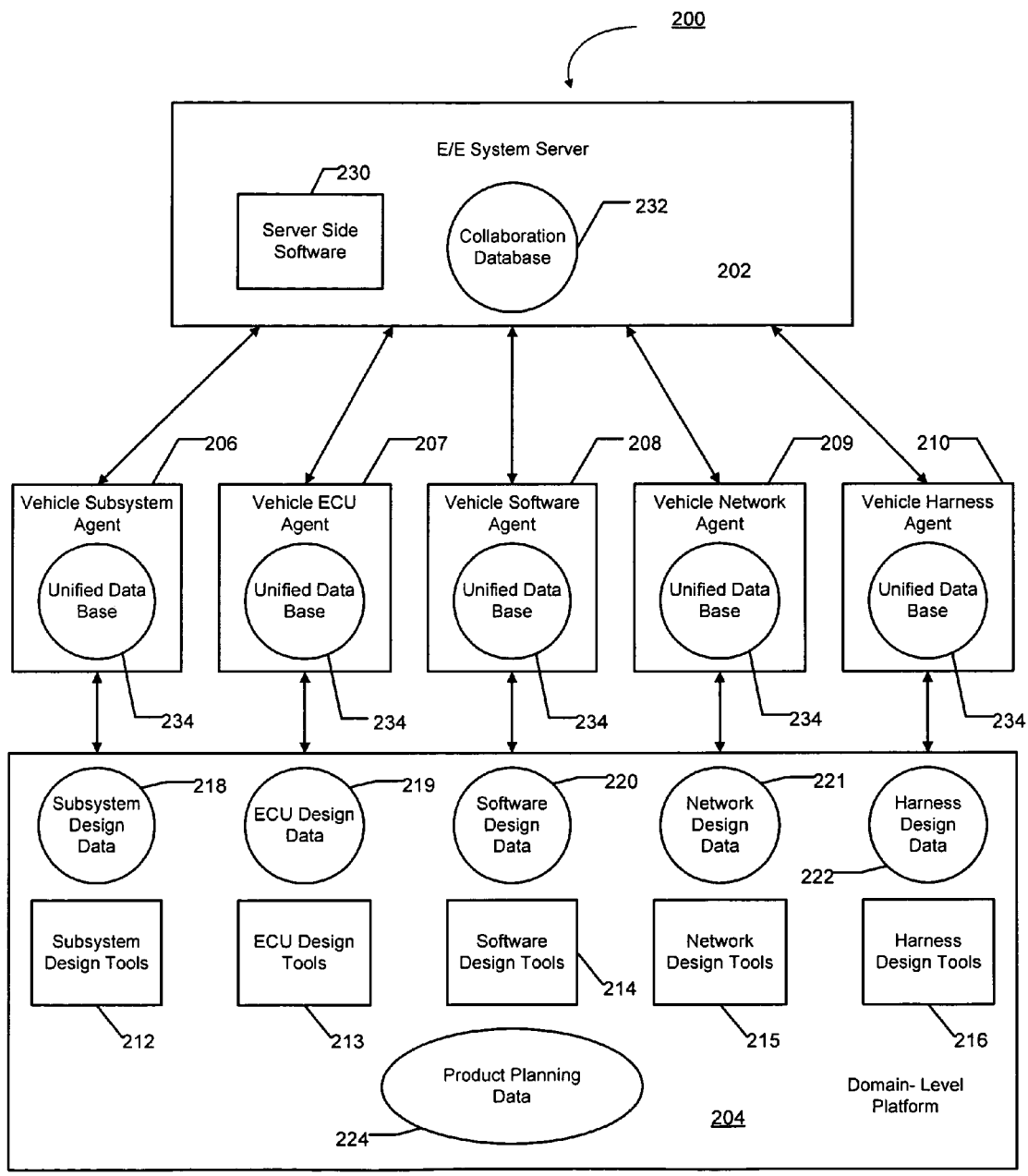
FIG. 2 is a diagram illustrating an example E/E design system in accordance with at least one embodiment of the present invention.

The addition, removal, or modification of a component of the electrical configuration of the automobile 102 can result in widespread changes to other components. To illustrate, the addition of a power sunroof to the automobile 102 can result in, for example, the addition of at least a motor actuator, a control switch, and either a new harness or a new splice into an existing harness or network bus. As another example, transfer of one function from one ECU to another ECU can result in a change in the number or configuration of circuits in one or more harnesses or network busses, the addition or removal of a harness or network bus, a change in the processing performance requirements of an ECU, and the like. FIGS. 2-64 below illustrate GUI-assisted techniques to allow automotive designers to manage the electrical configuration of the automobile 102.

FIG. 2 illustrates a system 200 for facilitating vehicle electrical/electronic (E/E) configuration design collaboration in accordance with at least one embodiment of the present disclosure. The system 200 includes an E/E system server 202, a domain level platform 204, and a plurality of domain-specific agents for each design domain, including a vehicle subsystem agent 206, a vehicle ECU agent 207, a vehicle software agent 208, a vehicle network agent 209, and a vehicle harness agent 210 (collectively, "the domain agents 206-210").

The domain-level platform 204 implements the domain-specific design tools and domain-specific design data created, manipulated, and implemented by the domain designers. The design tools of the domain-level platform 204 can include subsystem design tools 212, ECU design tools 213, software design tools 214, network design tools 215, and harness design tools 216. In the network domain, some example network design tools include the DaVinci Network Designer, CANoe, and LIN Network Architect applications. In the ECU domain, common design tools include the DaVinci Tool Suite, MATLAB, Simulink/Stateflow, and Rational Rhapsody applications. In the harness design domain, example design tools include the Zuken, Saber Cable, CAPH, AutoCAD, and CATIA applications. The data manipulated by these tools can include subsystem design data 218, ECU design data 219, software design data 220, network design data 221, and harness design data 222. The domain-level platform 204 further can include product planning data, such as the different builds of the vehicle, the projected number of sales of each build, past sales history for each build, available features (options or "sales codes"), exclusivity between features or devices, implementation costs, budgetary constraints, and the like.

The E/E system server 202 includes server-side software 230 and a collaboration database 232. The server-side software 230 is configured to facilitate communications between the various domain agents 206-210, including communicating changes made to the E/E configuration in one domain agent to the other domain agents. As discussed in greater detail below, a copy of a unified database resides at each domain agent, whereby the E/E architecture data is imported from domain-specific design tool format into a unified data schema. This data and the relationships between components represented by the data are stored in the collaboration database 232. In at least one embodiment, the data stored in the collaboration database 232 is organized by vehicle project and is based on a different data schema than the domain agent unified data schema. The collaboration database 232 enables the multiple domain agents to pull from and save to a common data repository for a particular vehicle project. Standard revision control processes can apply to the data stored in the collaboration database 232. Collaboration is facilitated when the workflow engines are overlaid on the data transactions. To illustrate, when a domain agent uploads data that has been modified, the workflow engines will automatically notify the appropriate users that the data has changed. Any changes to the data and the impact of the changes is recognized when the data is pulled down into the domain agents unified database. For example; when a domain agent downloads a modified product plan, the domain agent automatically displays, via a GUI, the differences in the product plan as compared to what was stored in the local copy of the unified database of the domain agent. Once the domain agent accepts the "new" data, the domain agent, via the GUI, displays the impact of the new product plan to the designer's particular design domain. Thus, a characteristic of this collaboration process is that all domain agents are working off of the same version of the data contained in the collaboration database 232 at the E/E system server 202. This process avoids the conventional design practice whereby the different design domains have different design data repositories and thus it is common to find that some of the designers are working on "stale" data and therefore design issues that could arise from the "fresh" data are not uncovered till late in the design process. The collaboration database 232 ensures that the designers are synchronized on the latest set of data.

Each of the domain agents 206-210 is configured to interface with the E/E system server 202 in collaborating in the design of the E/E architecture for a vehicle. The collaboration process can include specifying an initial E/E architecture, modifying various aspects of the E/E architecture, modeling the signal routing of the E/E architecture, modeling the signaling performance of the E/E architecture, and the like. In at least one embodiment, this collaborative process is facilitated through the use of a graphical user interface (GUI) implemented by the software of each domain agent. The GUI-facilitated collaborative design process is described in greater detail herein with respect to FIGS. 4-64.

The domain-specific data of the domain-level platform 204 typically has a particular format in accordance with the domain-specific tools that utilize the domain-specific data. To illustrate, the ECU design data 219 may be formatted for use by a particular ECU design tool 213. These domain-specific formats for the data can impede information sharing between domain agents. Accordingly, to facilitate the design collaboration process, the data of each design domain is formatted in accordance with a unified data scheme and the resulting reformatted data is combined into a unified data base 234, a copy if which is stored locally at each domain agent. In one embodiment, the unified data scheme is an object-oriented model employing schemas for the various design components. To illustrate, the unified data scheme can include ECU schema, device schema, signal schema, circuit schema, medium schema, functional model schema, and physical harness schema.

The ECU schema includes information related to ECU architecture, such as physical input/output (I/O) connections, logical I/O connections, ECU hardware information, ECU software architecture information, function context and implementation information, as well as layer formats, such as formats for the hardware layer, the transport layer, the software application layer, etc. The device schema is similar to the ECU schema, with the exception that the functional context and implementation information will be represented in the context of hardware. The signal schema includes information related to each signal implemented in the E/E architecture. The signal schema acts as a placeholder for the basic definition of the signal, such as signal name, signal type, etc. Each signal instance is a connection between function instances. Each signal instance typically should have only one sender (signal initiator) and at least one receiver (signal consumer). The function schema includes information related to functions implemented in the E/E architecture. Each instance of a function is represented by a function model. The function model describes the behavior of the function, such as input (signals), output (signals), signal generation process, signal latency requirements, etc. The medium schema represents both the wire harness connections and any in-vehicle network bus connection and serves to represent the implementation of the signal instances. Instances of the medium schema typically include information indicating the device(s) or ECU(s) to which the medium is connected, the signal delay requirement for the medium, the implementation method, and if the medium is a harness, the harness connector and circuit (wire) information. Thus, it will be appreciated that a medium instance can include more than one signal instance. The circuit schema represents the implementation of the harnesses. A circuit instance represents the aspects of one or more circuits (or wires), including a list of the harness connector pins, a list of circuits, and a list of splices. Typically, there should be a one-to-one mapping between logical signal instances and circuit instances. The physical harness schema represents the design information related to the physical implementation of a harness, including the circuits, splices, and harness connector information for the physical harness instance. An example listing of unified data scheme schemas is listed in Appendix A.

Figure 3:
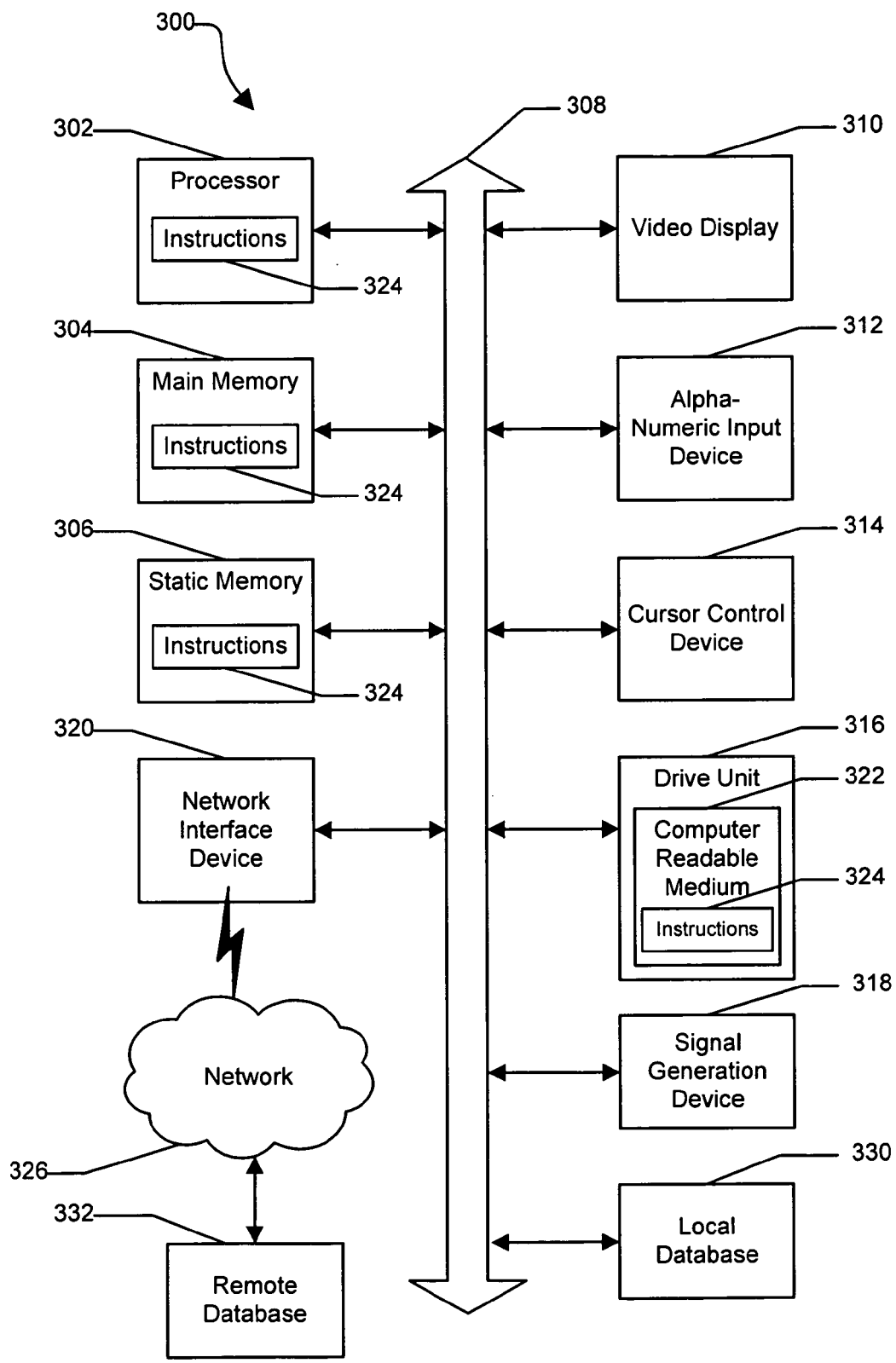
FIG. 3 is a diagram illustrating an example processing system in accordance with at least one embodiment of the present invention.

FIG. 3 illustrates a processing system 300 in accordance with at least one embodiment of the present disclosure. The processing system 300 can include a set of instructions that can be executed to manipulate the processing system 300 to perform any one or more of the methods or functions disclosed herein. The processing system 300 may operate as a standalone device or may be connected, e.g., using a network, to other processing systems or peripheral devices. The processing system 300 can represent an implementation of a domain agent (e.g., domain agents 206-210 of FIG. 2), an implementation of the E/E system server 202 (FIG. 2), or both. While a single processing system 300 is illustrated, the term "system" shall also be taken to include any collection of systems or sub-systems that individually or jointly execute a set, or multiple sets, of instructions to perform one or more computer functions to implement one or more processes described herein.

The processing system 300 may include one or more processors 302, which can include, for example, a single-core or multiple-core central processing unit (CPU). Moreover, the processing system 300 can include a main memory 304 and a static memory 306 that can communicate with each other via a bus 308. As shown, the processing system 300 may further include a video display unit 310, such as a liquid crystal display (LCD), an organic light emitting diode (OLED), a flat panel display, a solid state display, or a cathode ray tube (CRT). Additionally, the processing system 300 may include an input device 312, such as a keyboard, and a cursor control device 314, such as a mouse. The processing system 300 can also include a disk drive unit 316, a signal generation device 318, such as a speaker, and a network interface device 320. The processing system 300 further can include a local database 330 (e.g., the unified database of FIG. 2 if a domain agent or the collaboration database 232 if the E/E system server 202), as well as being connected via the network 326 to a remote database 232.

In a particular embodiment, as depicted in FIG. 3, the disk drive unit 316 may include a computer readable storage device 322 in which one or more sets of instructions 324, e.g. software, can be embedded. Further, the instructions 324 may embody one or more of the methods or logic as described herein. In a particular embodiment, the instructions 324 may reside completely, or at least partially, within the main memory 304, the static memory 306, and/or within the processor 302 during execution by the processing system 300. The main memory 304 and the processor 302 also may include computer readable media. The network interface device 320 can provide connectivity to a network 326, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and processing systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented, in whole or in part, by software programs executable by a processing system. The present disclosure contemplates a computer readable storage device that includes instructions or receives and provides instructions for execution responsive to a propagated signal, so that a device connected to a network can communicate voice, video or data over the network 326. Further, the instructions 324 may be transmitted or received over the network 326 via the network interface device 320.

While the computer readable storage device is shown to be a single storage device, the term "computer readable storage device" includes a single storage device or multiple storage devices, such as a centralized or distributed database, and/or associated caches and servers that store one or more sets of instructions. The term "computer readable storage device" also includes any storage device that is capable of storing a set of instructions for execution by a processor or that cause a processing system to perform any one or more of the methods or operations disclosed herein.

In a particular non-limiting, exemplary embodiment, the computer readable storage device can include a solid-state memory such as a memory card or other package that houses one or more non-volatile read-only memories. Further, the computer readable storage device can be a random access memory or other volatile re-writeable memory. Additionally, the computer readable storage device can include a magneto-optical or optical medium. Accordingly, the disclosure is considered to include any one or more of a computer readable storage device or a distribution medium and other equivalents and successor media, in which data or instructions may be stored.

Figure 4:
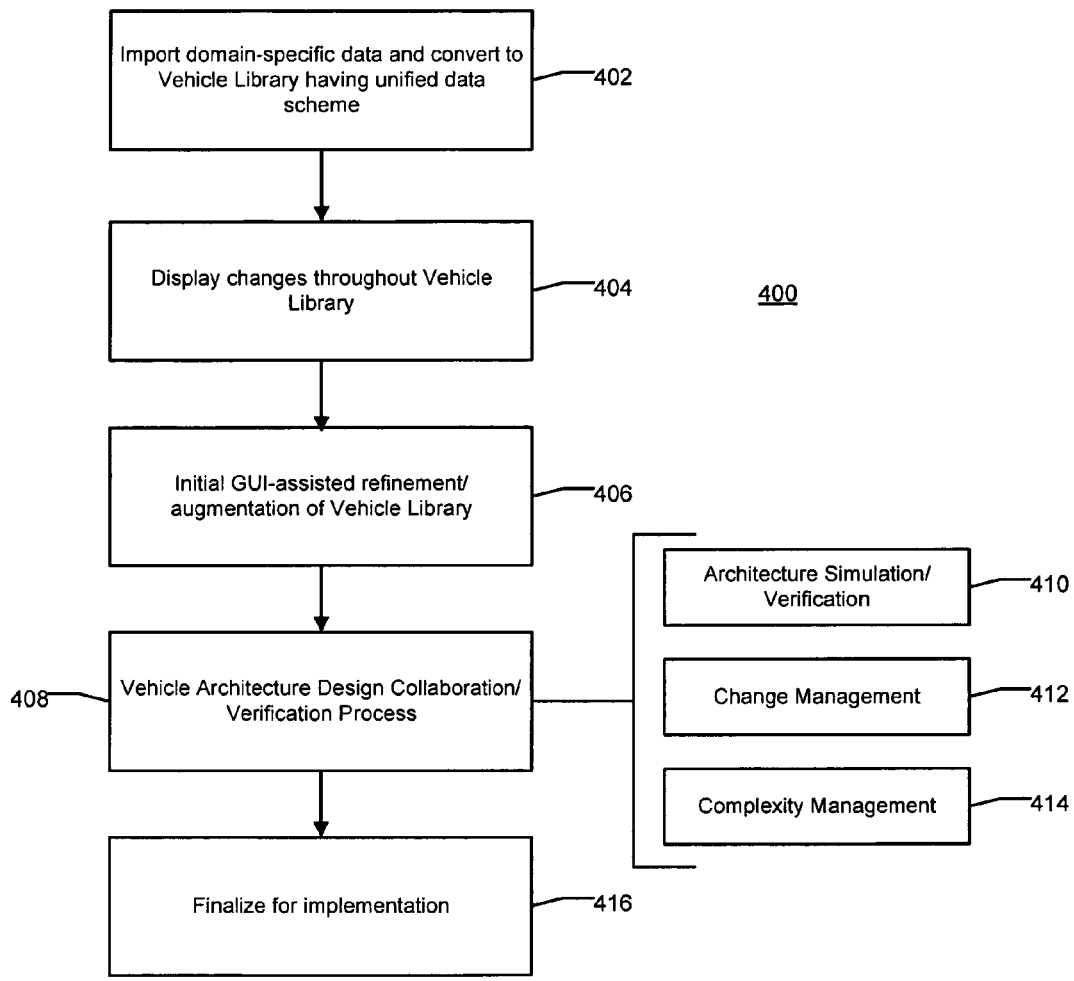
FIG. 4 is a flow diagram illustrating a collaborative E/E design process in accordance with at least one embodiment of the present invention.

FIG. 4 illustrates an example E/E architecture design process 400 utilizing the system 200 of FIG. 2 in accordance with at least one embodiment of the present disclosure. The E/E design process 400 initiates at block 402 with the initial data configuration for the E/E architecture to be designed. In one embodiment, certain domain-specific data from the various design domains is imported by the E/E system server 202 and converted to a vehicle library having the unified data scheme (and stored in the unified database 234). In at least one embodiment, this domain-specific data is provided by the vehicle manufacturer in a certain format, such as a spreadsheet file or a comma-delimited file. In another embodiment, the initial E/E architecture is created by manually inputting the various architecture components via the GUI interfaces implemented by the domain agents. To illustrate, one or more designers can individually create instances of various architecture schemas, such as function instances, ECU instances, device instances, physical harness instances, etc. In yet another embodiment, the initial E/E architecture is created through a combination of importing domain-specific data and manual creation of architectural components by designers.

It will be appreciated that the E/E architecture design process for a vehicle typically is an iterative process whereby requirements and specifications can change. Accordingly, in instances whereby new or modified architecture information is introduced to the design environment, at block 404, the domain agent can utilize a GUI to graphically display to a designer the ramifications of the new or modified architecture information to the vehicle library, such as what components of the E/E architecture have been modified, which components are present only in the original data, which components are present only in the new data, etc.

At block 406, the designers can perform an initial refinement or augmentation of the vehicle library created at block 402. To illustrate, the designers can eliminate redundant or unused components, add additional components not represented in the imported domain-specific data, change performance parameters, etc. The initial refinement/augmentation process is described in greater detail herein with reference to FIGS. 5-25.

At block 408, the designers use the GUI provided by the design agents to collaborate across the different design domains in revising and verifying E/E architectures for a vehicle. As illustrated in FIG. 4, this process can include simulating the operation of an E/E architecture and verifying it meets signaling and performance criteria (block 410). The architecture simulation/verification process is described herein in greater detail with reference to FIGS. 26-37. The collaboration process further can include a change management process (block 412) in response to changes made in various aspects of an E/E architecture. The change management process is described in greater detail below with reference to FIGS. 38-43. The collaboration process further can include a complexity management process (block 414) whereby the E/E architecture can be modified to reduce the number of vehicle variations, to reduce the number of harness builds, or a combination thereof. The complexity management process is described in greater detail below with reference to FIGS. 44-64.

The collaboration process is concluded upon determination of an E/E architecture that meets the specified performance, complexity, and cost constraints. The resulting E/E architecture is then finalized for implementation in the vehicle manufacture at block 416. This finalization process can include generation of comprehensive documentation for the various design domains so as to permit the various design domains to engineer the respective components of the E/E architecture in accordance with the specified E/E architecture.

Figure 5:
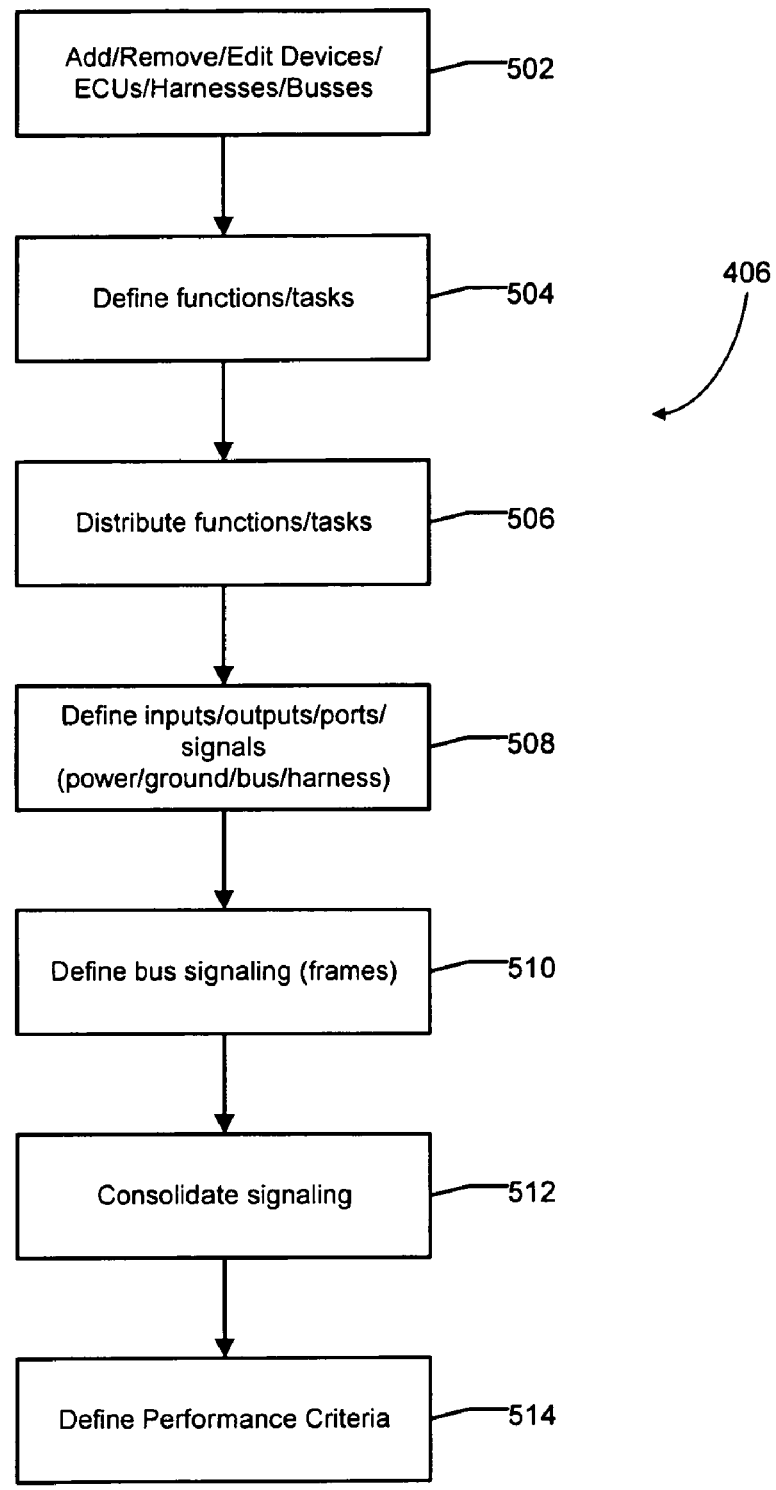
FIG. 5 is a flow diagram illustrating initial refinement/augmentation process of the process of FIG. 4 in accordance with at least one embodiment of the present invention.

FIG. 5 illustrates the initial refinement/augmentation process (block 406 of FIG. 4) in accordance with at least one embodiment of the present disclosure. The initial refinement/augmentation process can include using a GUI of a domain agent to add, remove, or modify devices, harnesses, ECUs, or network busses of the E/E architecture at block D502. The initial refinement/augmentation process further can include using a GUI to define functions or tasks at block D504 or distributing functions or tasks among the ECUs and devices of the E/E architecture at block DD06. At block D508, the designers can use a GUI to define signal and power inputs, outputs, ports, of the devices, ECUs, network busses and harnesses of the E/E architecture. At block D510, the designer can use a GUI to define bus signaling (i.e., transmission frames) of the network busses of the E/E architecture. In certain instances, redundant or unused signaling may be present in the E/E architecture, and thus the designer can use a GUI to consolidate signaling at block D512. Further, a designer can use a GUI to specify performance criteria for components or subsystems of the E/E architecture at block D514.

Figure 6:
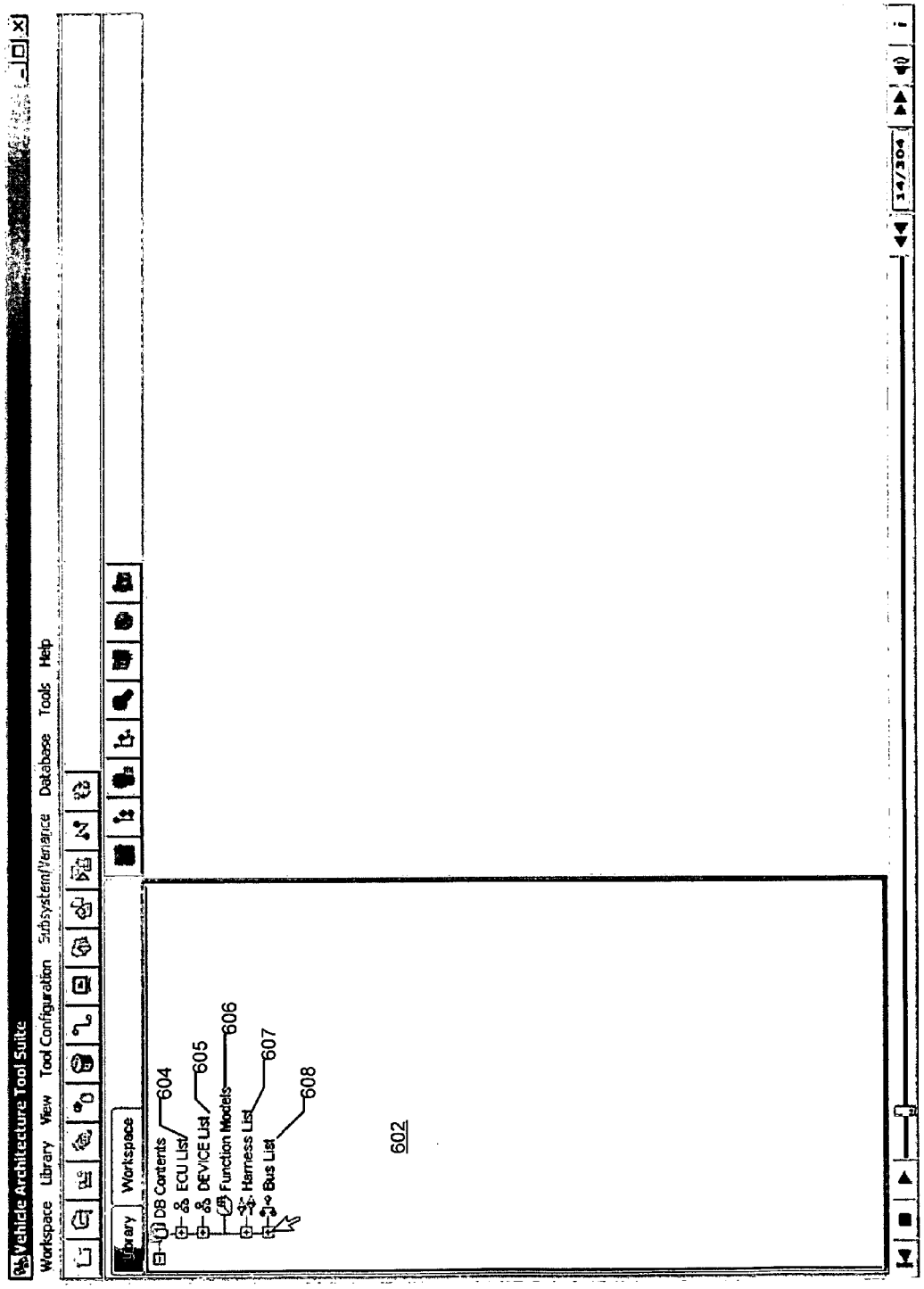
FIGS. 6-9 are diagrams illustrating example graphical user interfaces (GUIs) that provide a top-level graphical representation of components of a vehicle library in accordance with at least one embodiment of the present invention.
Figure 7:
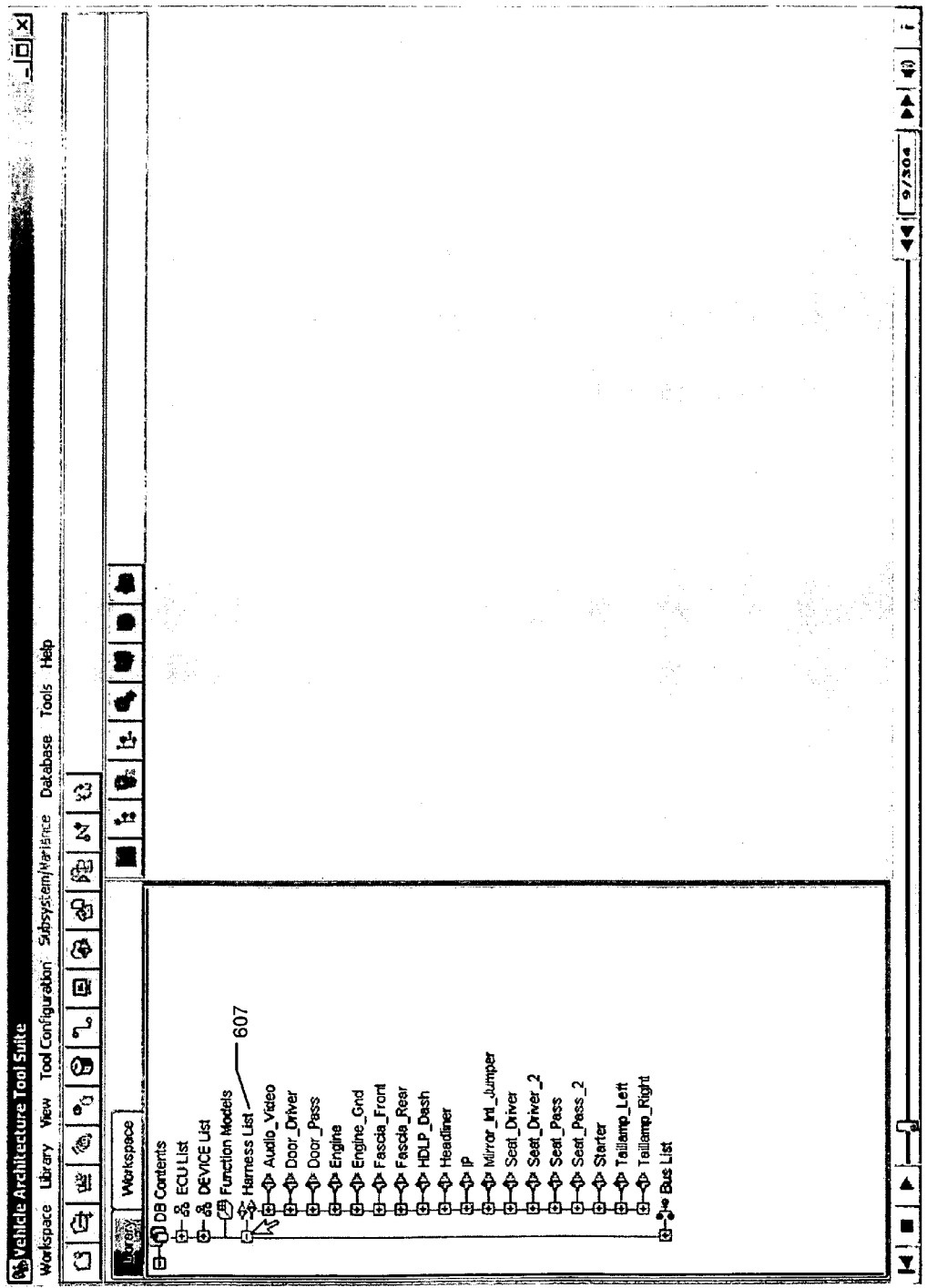

FIGS. 6-9 illustrate various example GUIs that provide a top-level graphical representation of the components of the vehicle library in accordance with at least one embodiment of the present disclosure. FIG. 6 is an example GUI 600 illustrating the top-level of the vehicle library for an example E/E architecture. The GUI 600 includes a list pane 602 having an expandable list of the components of the vehicle library, including an expandable ECU list 604 that lists the ECUs present in the vehicle library, an expandable device list 605 that lists the devices present in the vehicle library, an expandable function model list 606 that lists the functions present in the vehicle library, an expandable harness list 607 that lists the harnesses present in the vehicle library, and an expandable bus list 608 that lists the network busses present in the vehicle library. A user can select a particular list to expand it to graphically display the corresponding components. To illustrate, FIG. 7 depicts an expansion of the harness list 607 to graphically list a plurality of harnesses, such as a harness for the driver door ("Door_Driver"), a harness for the instrument panel ("IP"), and the like. A user then may select one of the listed harnesses to access the information for the selected harness.

Figure 8:
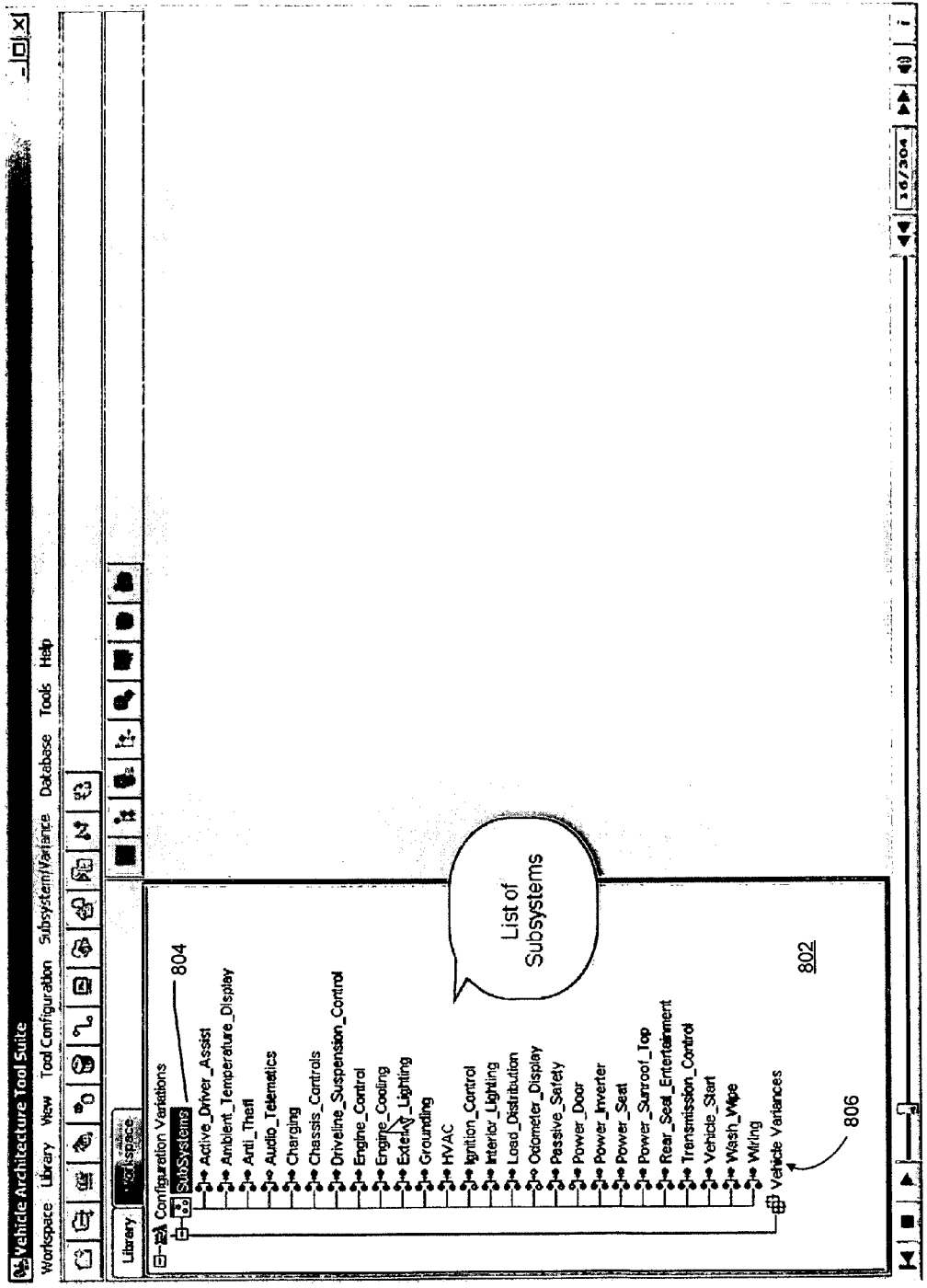
Figure 9:
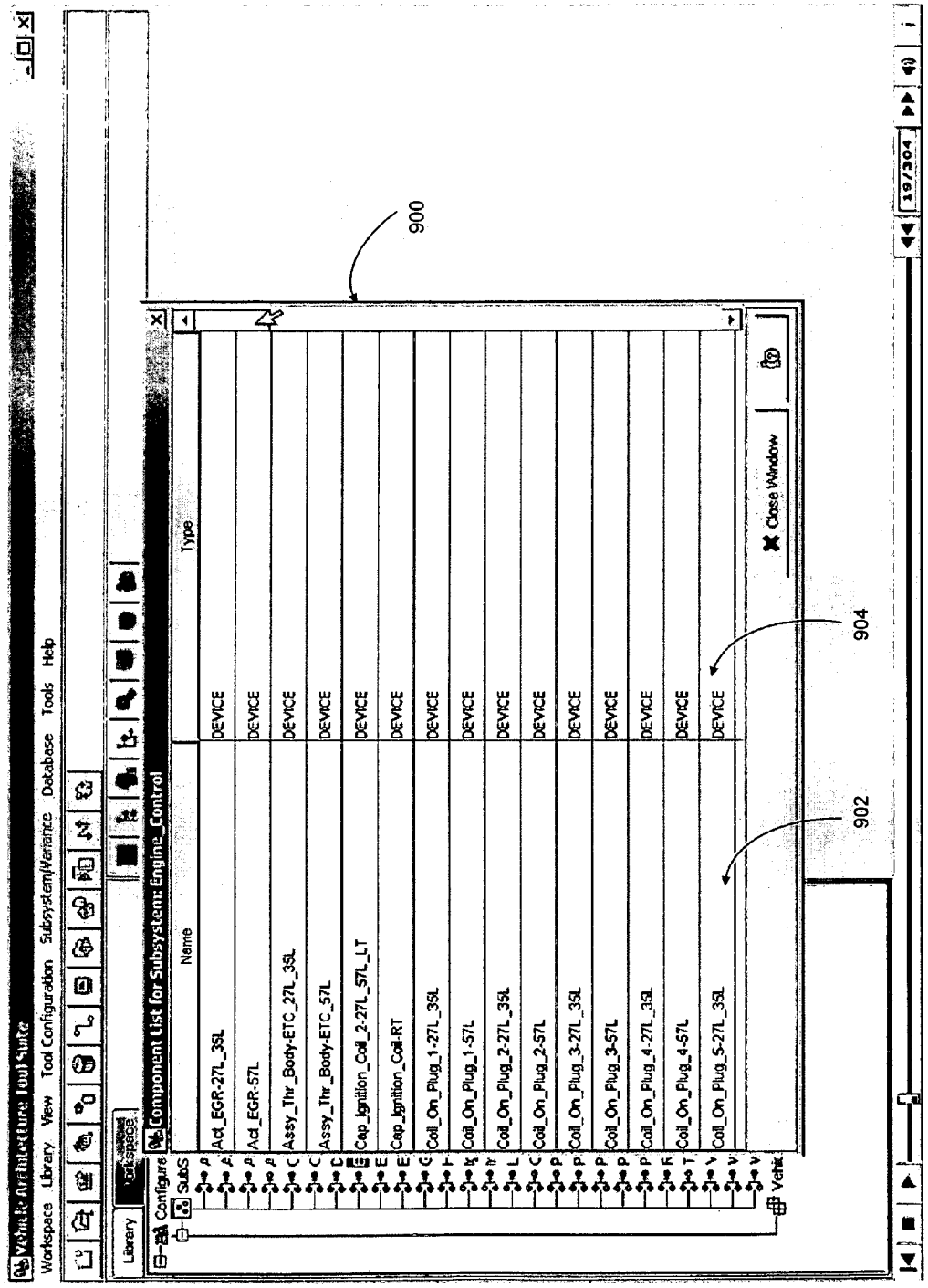

FIG. 8 is an example GUI 800 that graphically presents the organization of the vehicle library by subsystem. The GUI 800 includes a list pane 802 having an expanded subsystem list 804 and an expandable vehicle variance list 806. A user can select a particular listed subsystem to access the information related to the selected subsystem. To illustrate, FIG. 9 illustrates a GUI 900 displayed upon selection of the "Engin26Control" subsystem from the subsystem list 804 from the GUI 800. The GUI 900 includes a list of components associated with the "Engin26Control" subsystem, each component identified by a name field 902 and a component type field 904 (e.g., "device", "ECU", "harness", "network bus", etc.).

Figure 10:
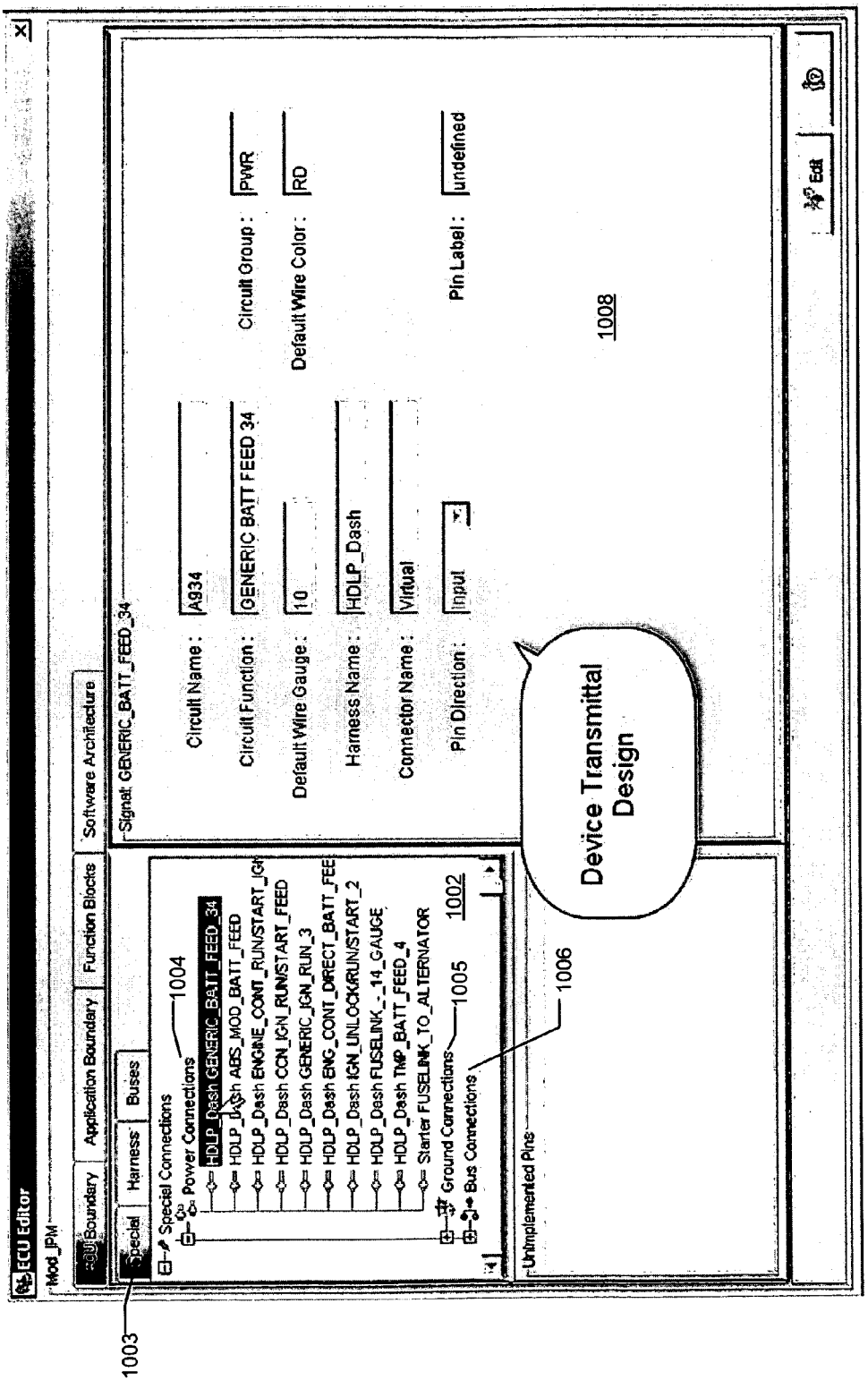
FIGS. 10-16 are diagrams illustrating example GUIs that facilitate editing of an electronic control unit (ECU) of a vehicle library in accordance with at least one embodiment of the present invention.
Figure 11:
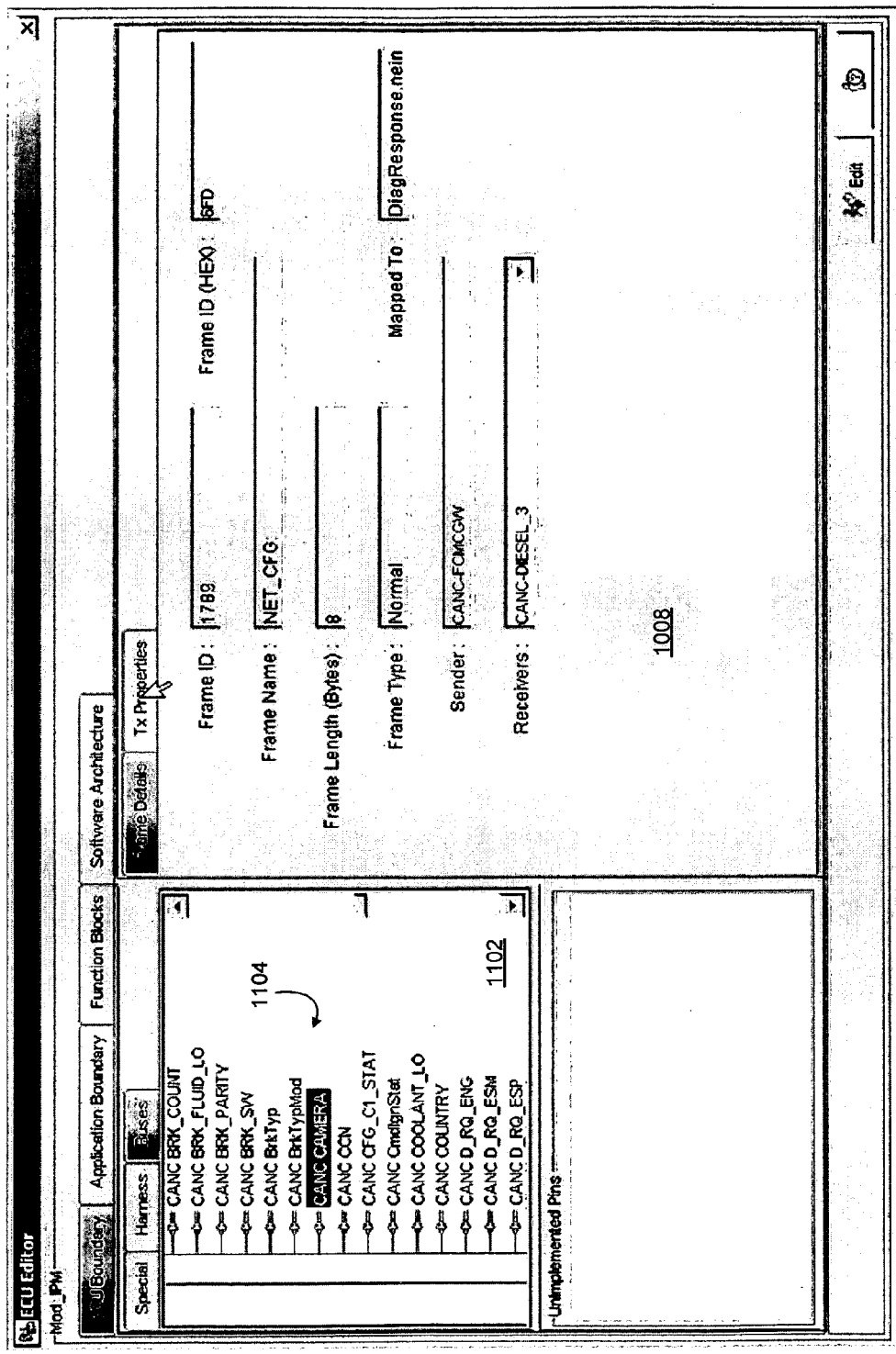
Figure 12:
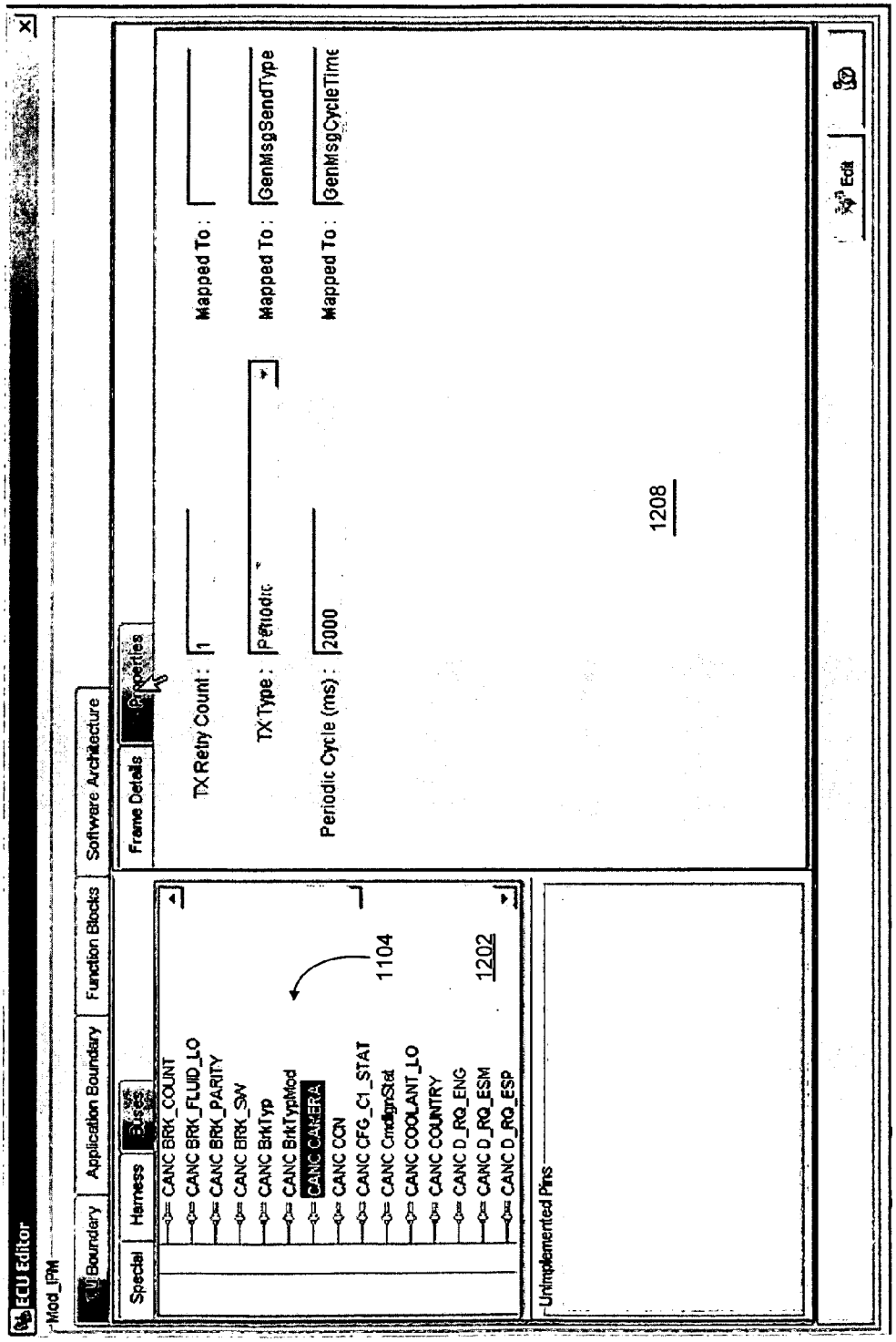

FIGS. 10-16 illustrate various example GUIs that facilitate editing of the ECU of the vehicle library in accordance with at least one embodiment of the present disclosure. Similar GUIs can be implemented to facilitate editing of devices of the vehicle library. FIGS. 10-12 are examples of GUIs that graphically presents connections at the ECU boundary of an ECU selected from the ECU list 604 (FIG. 6). In FIG. 10, a GUI 1000 includes a list pane 1002 having an expanded power connections list 1004 that lists the power connections of the vehicle library, an expandable ground connections list 1005 that lists the ground connections of the vehicle library, and an expandable bus connections list 1006 that lists the connections of the network buses of the vehicle library. The GUI 1000 further includes an information pane 1008 that graphically presents certain information about an item selected in the list pane 1002. To illustrate, a user's selection of the "HDLP_Dash_GENERIC_BATT_FEED_34" power connection from the power connections list 1004 can result in the display in the information pane 1008 of the circuit name ("A934"), a description of the circuit function ("GENERIC BATT FEED 34"), the circuit group ("PWR"), the default wire gauge ("10"), the name of the harness in which the power connection is implemented ("HDLP_Dash"), the connector name ("Virtual"), etc. A similar GUI can be provided to list the harness to which the ECU is connected, the particular circuits of each listed harness, and to graphically present information about a harness circuit selected from the harness list. In FIG. 11, a GUI 1100 includes a list pane 1102 having an expanded network bus list 1104 that lists the network buses to which the ECU is connected, and the particular logical signals (frames) which are to be received from or provided to the corresponding network bus. The GUI 1100 further includes an information pane 1108 that graphically presents certain information about an item selected in the list pane 1102. To illustrate, upon selection of a frame "CANC CAMERA" from the network bus list 1106, the information pane 1108 is used to display frame information for the selected bus connector, including the frame ID ("1789"), the frame name ("NET_CFG:"), the frame length ("8" bytes), the frame type ("normal"), the sender (or source) of the frame ("CANC-FCMCGW") and a pull-down list of receivers of the frame ("CANC-DIESEL_D" etc.). FIG. 12 illustrates a GUI 1200 whereby an information pane 1208 is used to display transmission ("Tx") properties for the frame "CANC CAMERA" selected from the network bus list 1106 from a list pane 1202, including the number of transmission retries to be performed by the ECU ("1"), the transmission type ("periodic"), the periodic cycle of the transmission of the frame ("2000" milliseconds) at the ECU, and the like. The user may edit the information presented in the information panes of the GUIs 1000, 1100, and 1200 using the input fields of the corresponding information pane.

Figure 13:
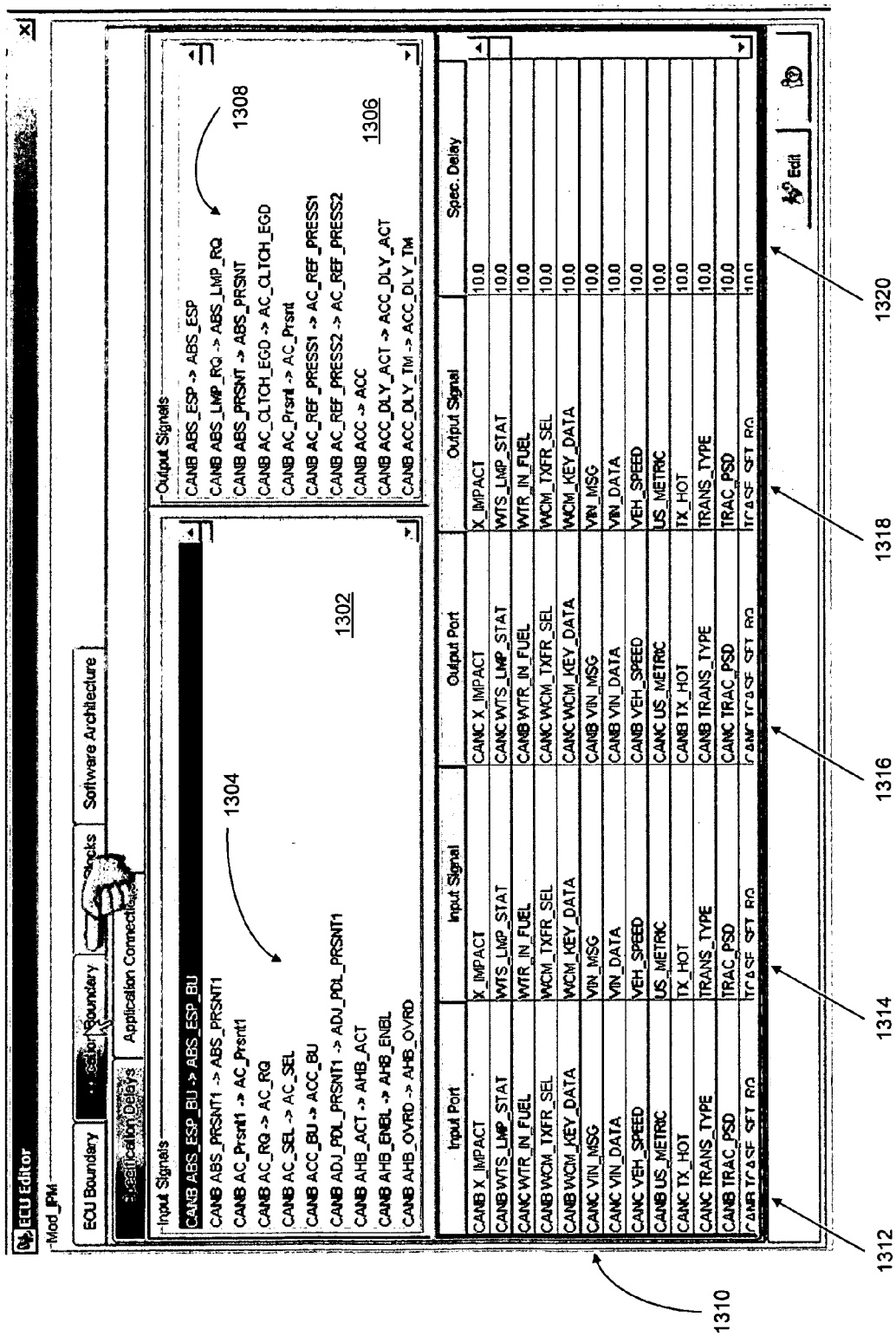

FIG. 13 is an example GUI 1300 that graphically presents all of the signals input to or output from the ECU, the port through which a corresponding signal is received or output, and the specified delays of the signals at the ECU. The GUI 1300 includes an input signal pane 1302 that graphically depicts an input signal list 1304 that lists the logical and physical signals input to the ECU and the port through which it is received and an output signal pane 1306 that graphically depicts an output signal list 1308 that lists the logical and physical signal output from the ECU and the port through which it is output. Further, the ECU may be used to forward signals and thus the GUI 1300 can include a forwarded signal pane 1310 that lists signals forwarded by the ECU, where each forwarded signal listed includes an input port field 1312 indicating the port of the ECU which receives the signal and an input signal field 1314 identifying the input signal, an output port field 1316 identifying the port the ECU uses to transmit the signal, an output signal field 1318 identifying the output signal, and a specified delay field 1320 specifying the expected delay introduced by the ECU while forwarding the signal. These characteristics can be edited via the GUI 1300.

Figure 14:
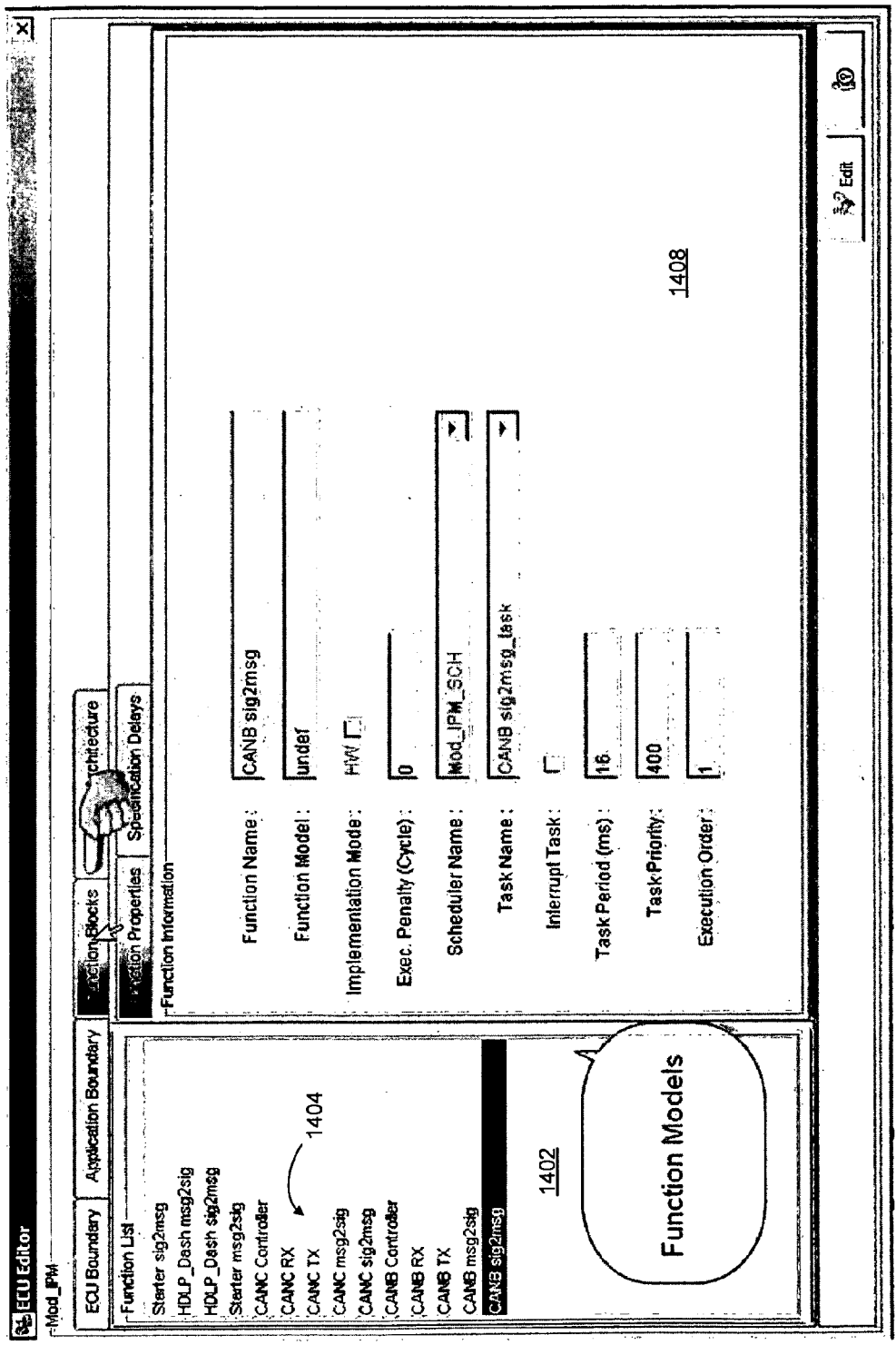

FIG. 14 is an example GUI 1400 that graphically presents the function models assigned to the ECU. The GUI 1400 includes a list pane 1402 that displays a function model list 1404 of the function models and an information pane 1408 that displays information associated with a selected function model, such as the function name (e.g., "CANB sig2msg"), the function model, the implementation mode (e.g., whether implemented in software or hardware), the execution penalty (i.e., the number of execution cycles of the ECU needed to perform the function), the name of the scheduler associated with the function, the task associated with the function, whether it is an interrupt-type task, the period it takes to execute the task (e.g., 16 milliseconds), the priority of the task, and the execution order, which is defined by the user and is a priori.

Figure 15:
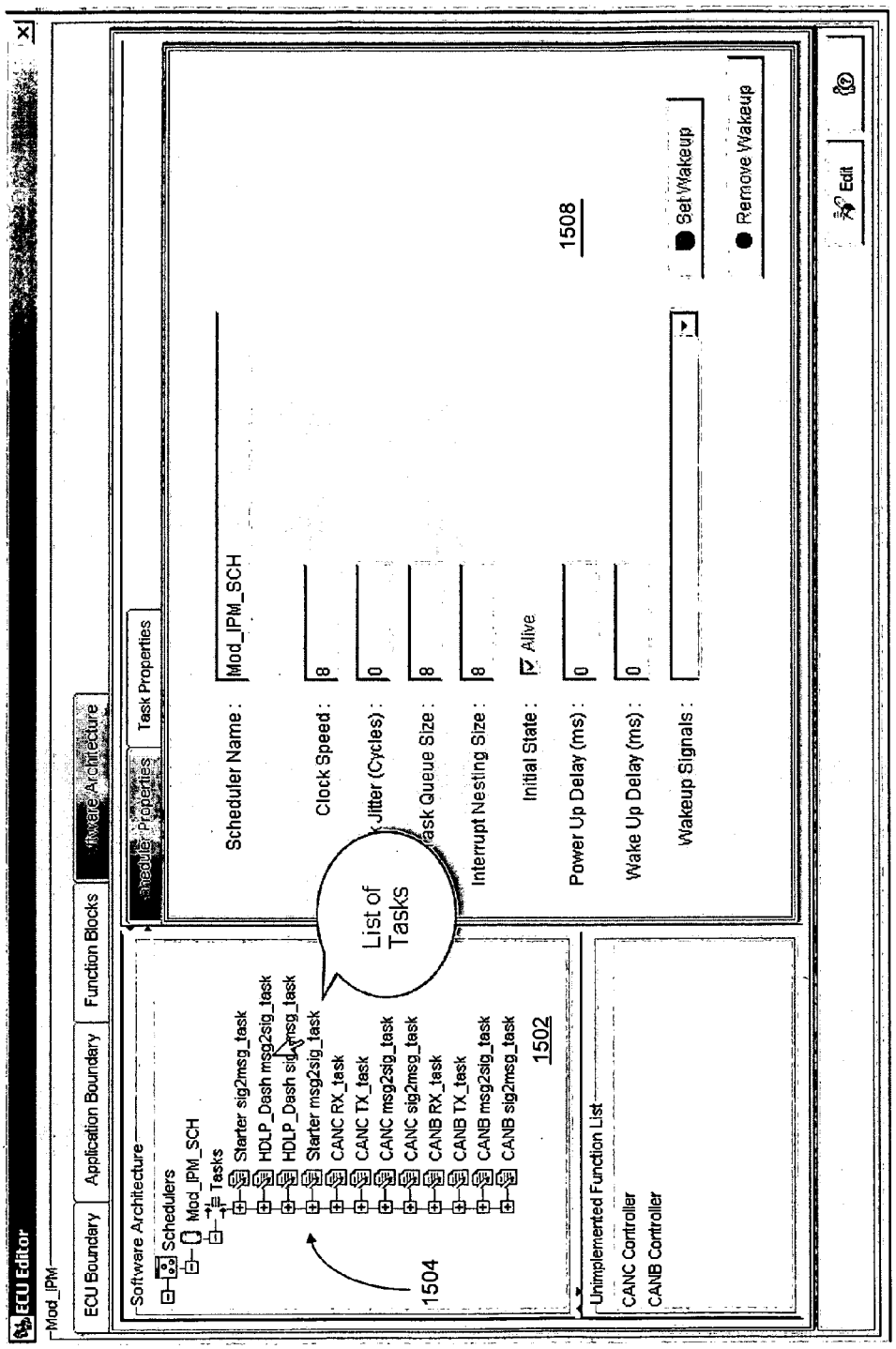

FIG. 15 is an example GUI 1500 that graphically presents the software architecture of the ECU. The GUI 1500 includes a list pane 1502 that displays an expandable task list 1504 that lists the schedulers of the ECU and their corresponding tasks. The GUI 1500 further includes an information pane 1508 that displays information related to a scheduler selected from the task list 1504. The information can include the name of the scheduler (e.g., "Mod_IPM_SCH"), the clock speed of the scheduler (e.g., "8" MHz), the clock jitter, the task queue size of the scheduler, the interrupt nesting size, the initial state of the scheduler (e.g., "alive" or "asleep"), the power-up delay of the scheduler, the wake-up delay of the scheduler, and any signals used to wake up the scheduler. These characteristics can be edited via the GUI 1500.

Figure 16:
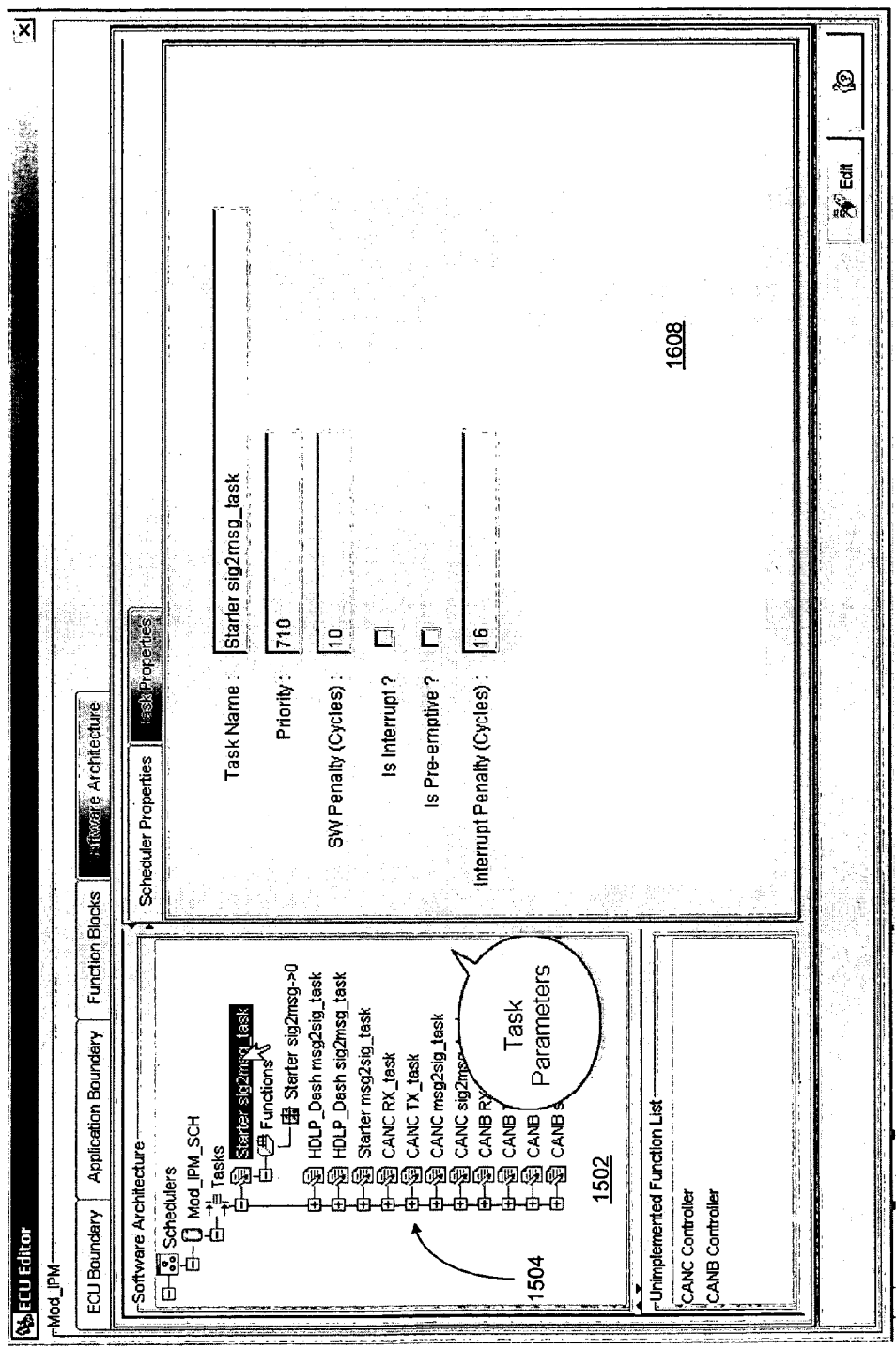

FIG. 16 is an example GUI 1600 having an information pane 1608 to graphically present information related to a task selected from the task list 1504 in the list pane 1502. This information can include, for example, the task name (e.g., "Starter sig2ms44task"), the priority of the task, the software penalty (i.e., the number of cycles needed by the ECU to execute the task), whether the task is an interrupt, whether the tasks is preemptive, and the number of cycles needed by the ECU to recover from an interrupt while performing the task.

Figure 17:
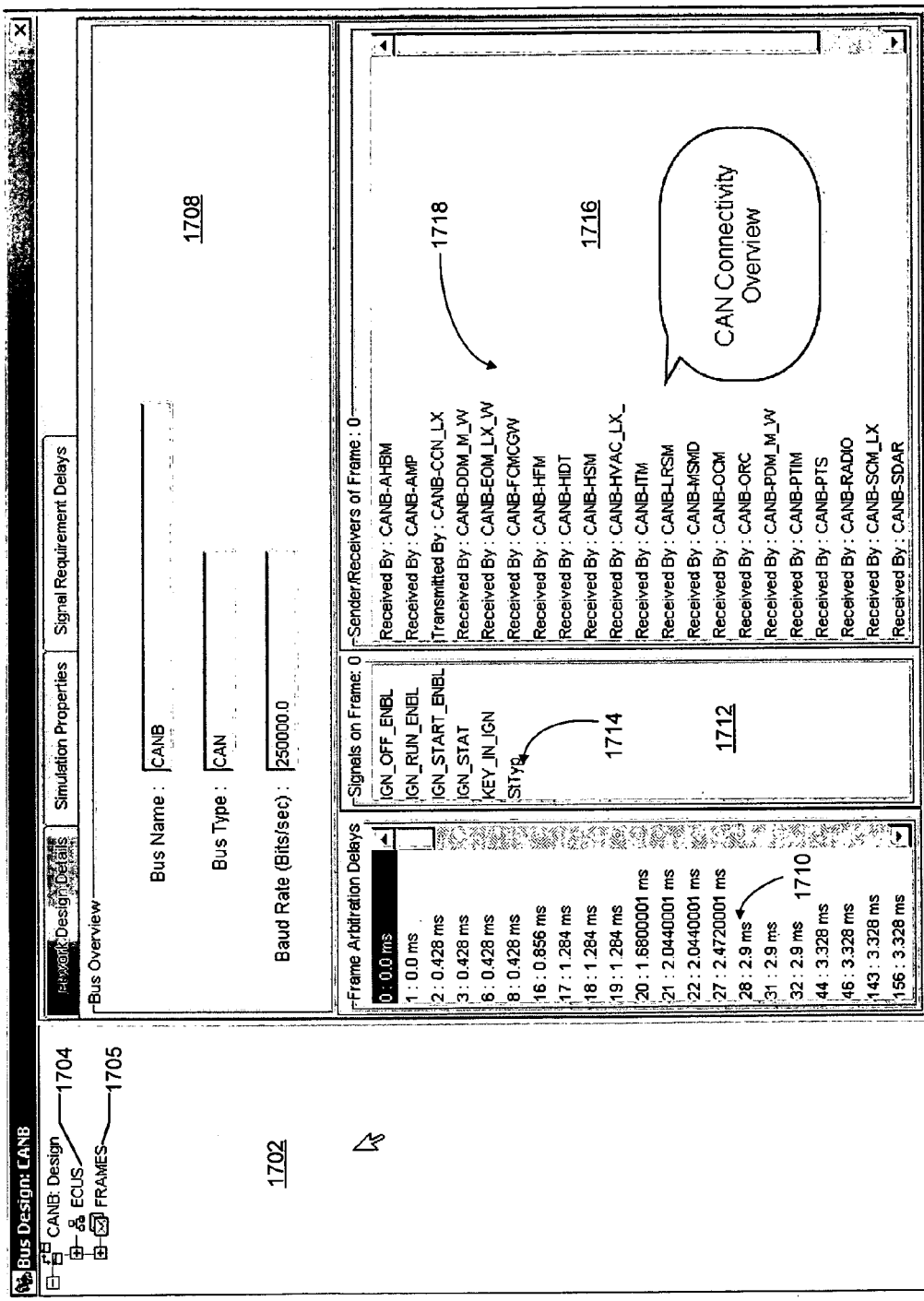
FIGS. 17-20 are diagrams illustrating example GUIs that facilitate editing of a network bus of a vehicle library in accordance with at least one embodiment of the present invention.
Figure 18:
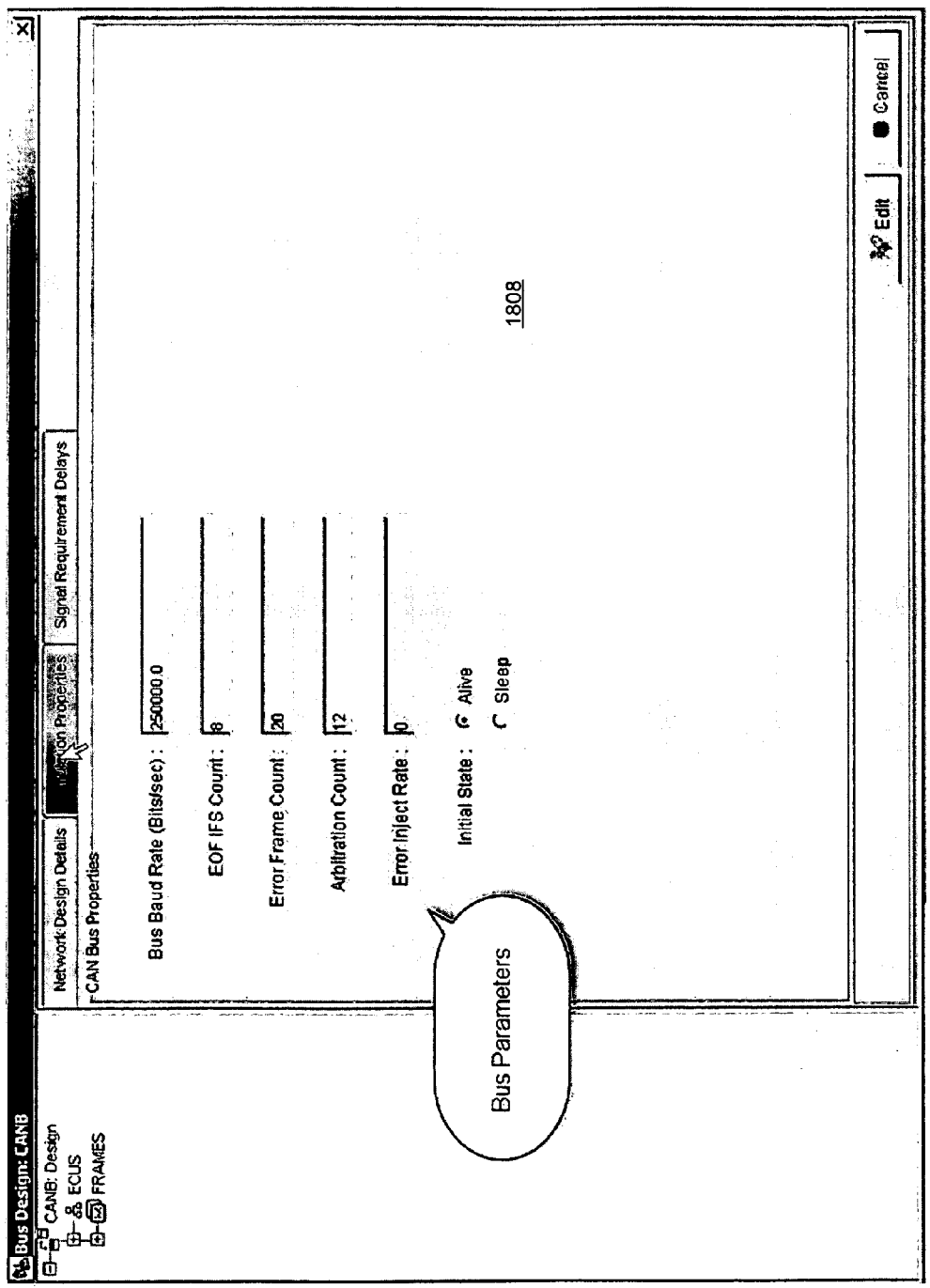

FIGS. 17-20 illustrate various example GUIs that facilitate editing of a network bus of the vehicle library in accordance with at least one embodiment of the present disclosure. FIG. 17 is an example GUI 1700 having a list pane 1702 displaying an expandable ECU list 1704 of ECUs connected to the network bus and displaying an expandable frame list 1705 of frames transmitted via the network bus. The GUI 1700 also includes an information pane 1708 that displays general information about the network bus, such as the bus name, the bus type (e.g., CAN, LIN, etc.), and the bus throughput (baud rate). The GUI 1700 further can include a list pane 1710 listing the frames and their arbitration delays. For a selected frame, a list pane 1712 can display a logical signal list 1714 of the logical signals transmitted in the frame and a list pane 1716 can display a list of the sending component and the receiving components of the frame. FIG. 18 is an example GUI 1800 having an information pane 1808 to display various performance parameters for the network bus for simulation/verification purposes. These performance parameters can include, for example, the throughput of the network bus, the initial state of the network bus (i.e., "alive" or "sleep"), and the various performance parameters of the network protocol implemented for the network bus. These parameters can be edited by a user via the GUI 1800.

Figure 19:
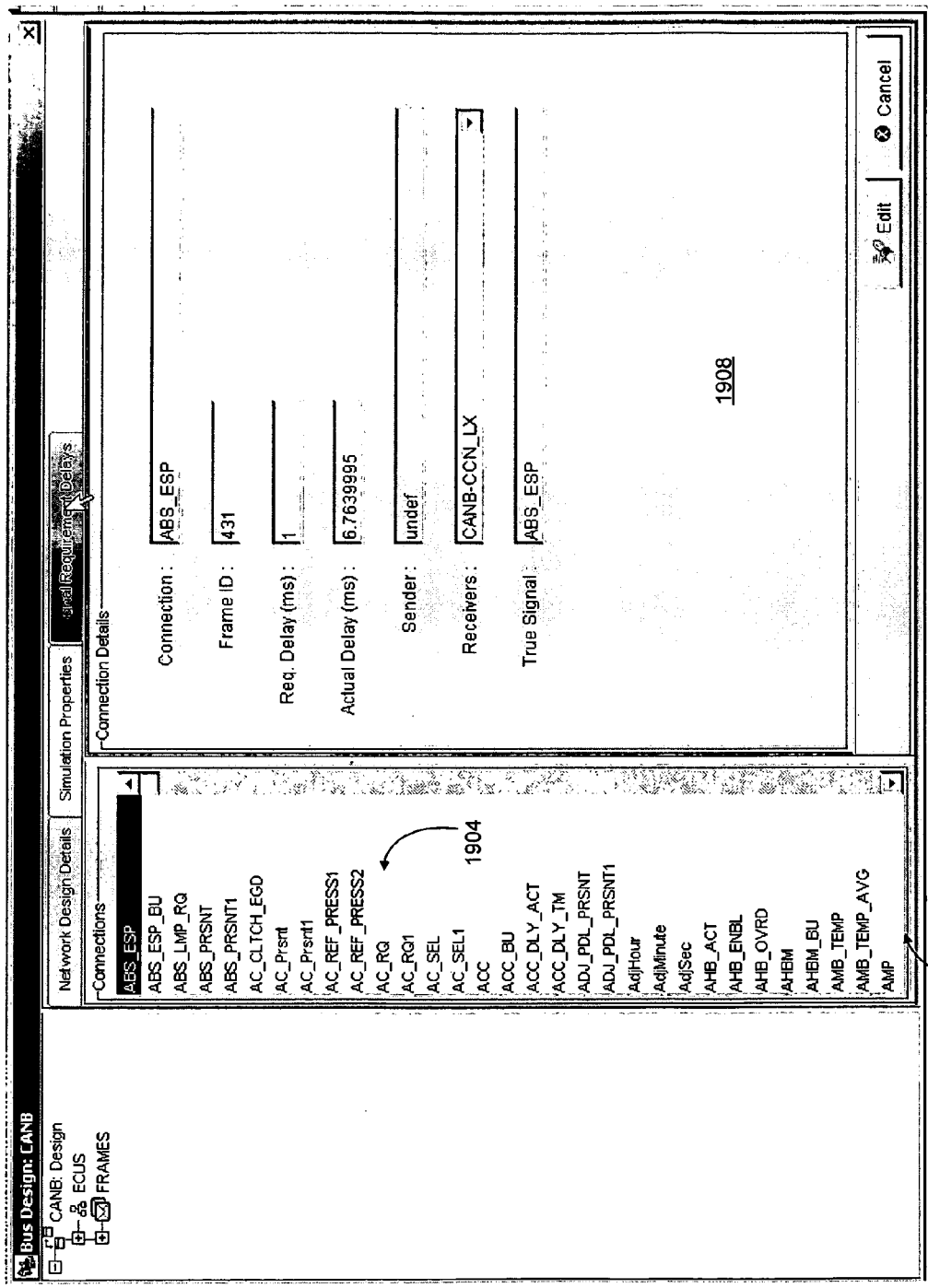

FIG. 19 is an example GUI 1900 having a list pane 1902 that displays a list of the logical signals transmitted via the network bus and an information pane 1908 to display signal delay requirement information for the signal, including the required maximum end-to-end delay (as specified by the designer) and the actual end-to-end delay of the signal as determined using a simulation process described in greater detail below.

Figure 20:
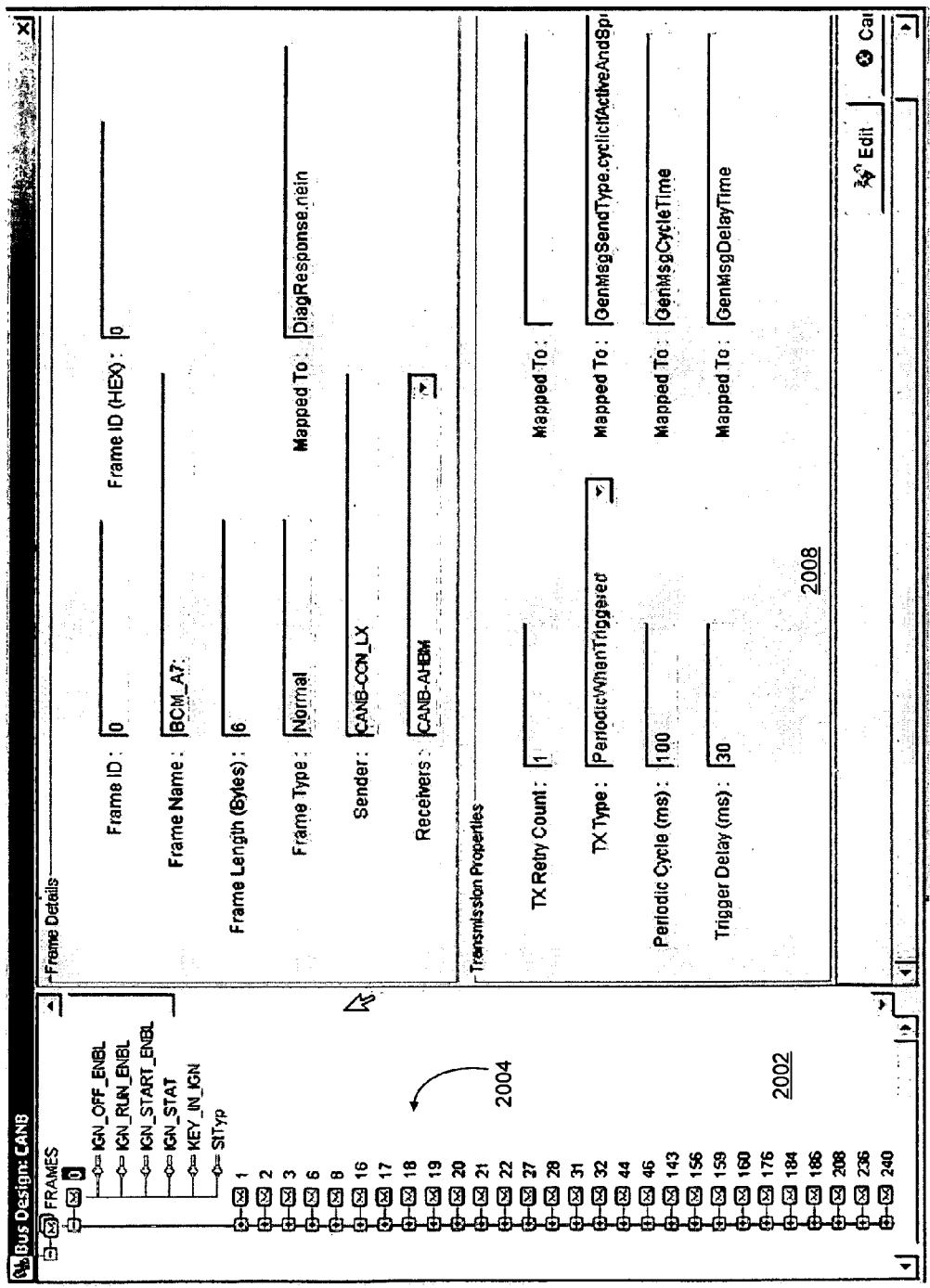

FIG. 20 is an example GUI 2000 having a list pane 2002 that displays a frame list 2004 of the frames transmitted by the network bus and the logical signals transmitted in each listed frame. The GUI 2000 further includes an information pane 2008 that displays information related to a selected frame, including the frame ID, the frame name, the frame length (e.g., 6 bytes), the frame type, the sender of the frame, the one or more receivers of the frame. The displayed information further can include transmission properties regarding the frame, such as the number of transmission retries to be attempted, the transmission type (e.g., periodic, periodic when triggered, etc.), the periodic cycle, and the trigger delay. This information can be modified via the GUI 2000.

Figure 21:
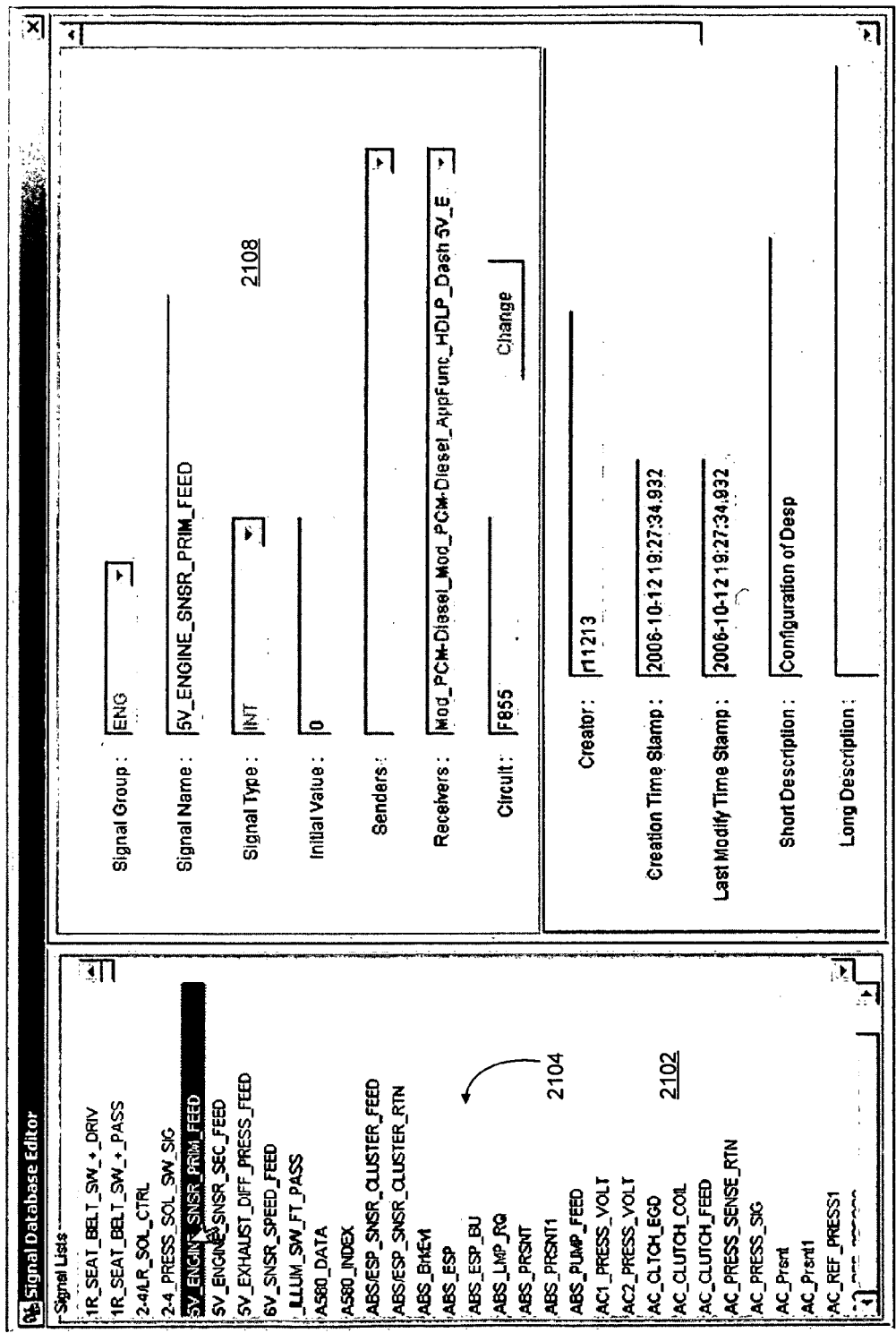
Figure 22:
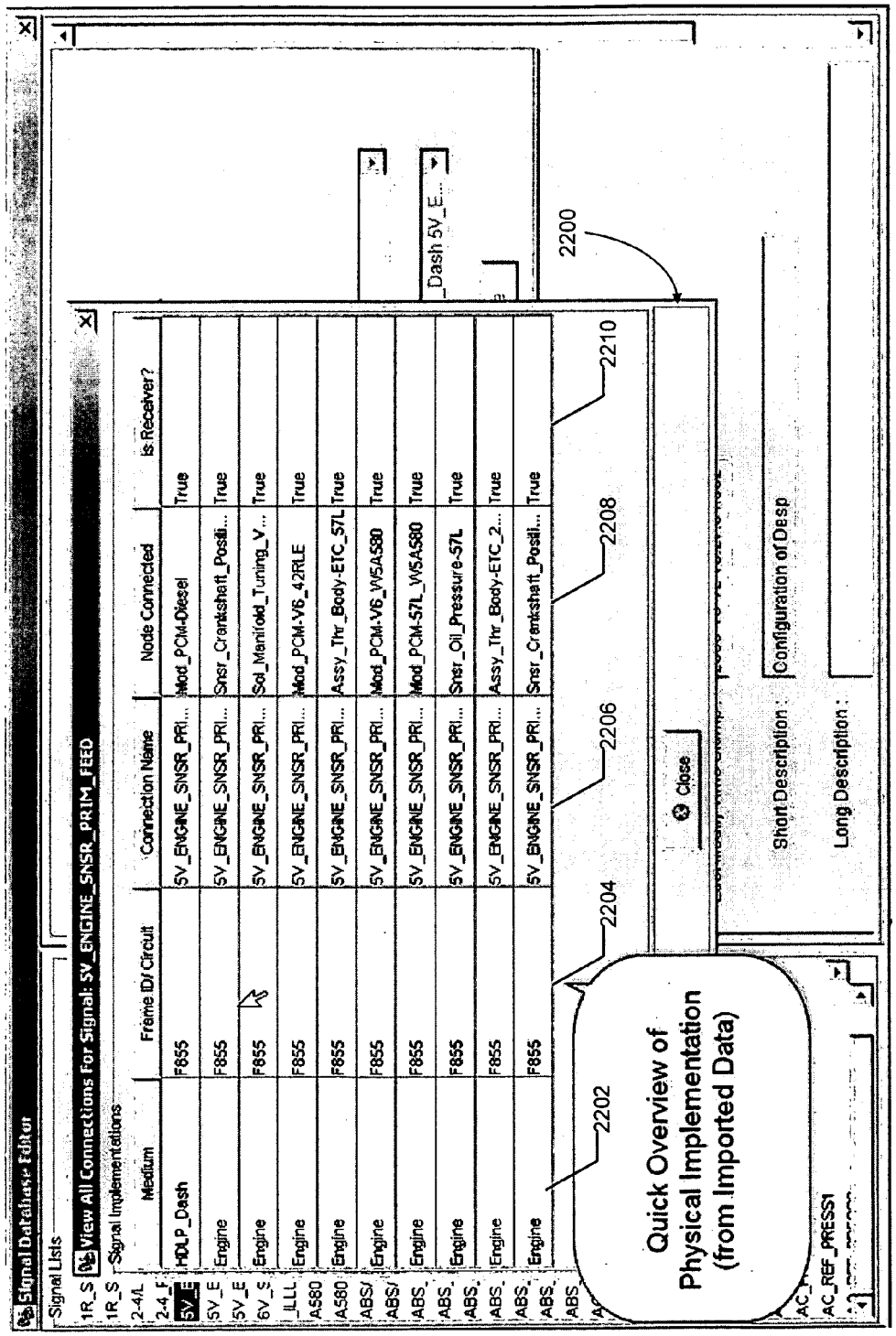

FIGS. 21-25 illustrate various example GUIs that facilitate editing of signals of the vehicle library in accordance with at least one embodiment of the present disclosure. FIG. 21 is an example GUI 2100 having a list pane 2102 to display a signal list 2104 of the signals (logical and physical) of the vehicle library and an information pane 2108 to display general information for a selected signal, including the signal group to which the signal belongs, the name of the signal, the type of signal (e.g., analog, digital, logical, Boolean, integer, etc.), the initial or default value or state (e.g., logic "0" or logic "1") of the signal, the senders of the signal, the receivers of the signal, and the circuit or frame used to transmit the signal. FIG. 22 is an example GUI 2200 for displaying the connections for a signal selected from the signal list 2104 of the GUI 2100. The GUI 2200 lists an entry for each component connection for the selected signal. Each entry includes a medium field 2202 identifying the component, a frame ID/circuit field 2204 identifying the frame ID (if the selected signal is a logical signal) or the circuit ID (if the selected signal is a physical signal), a connection name field 2206 to identify the name of the connection, a node field 2208 to identify the node, and a receiver field 2210 identifying whether the component of the connection is a receiver or sender of the signal.

Figure 23:
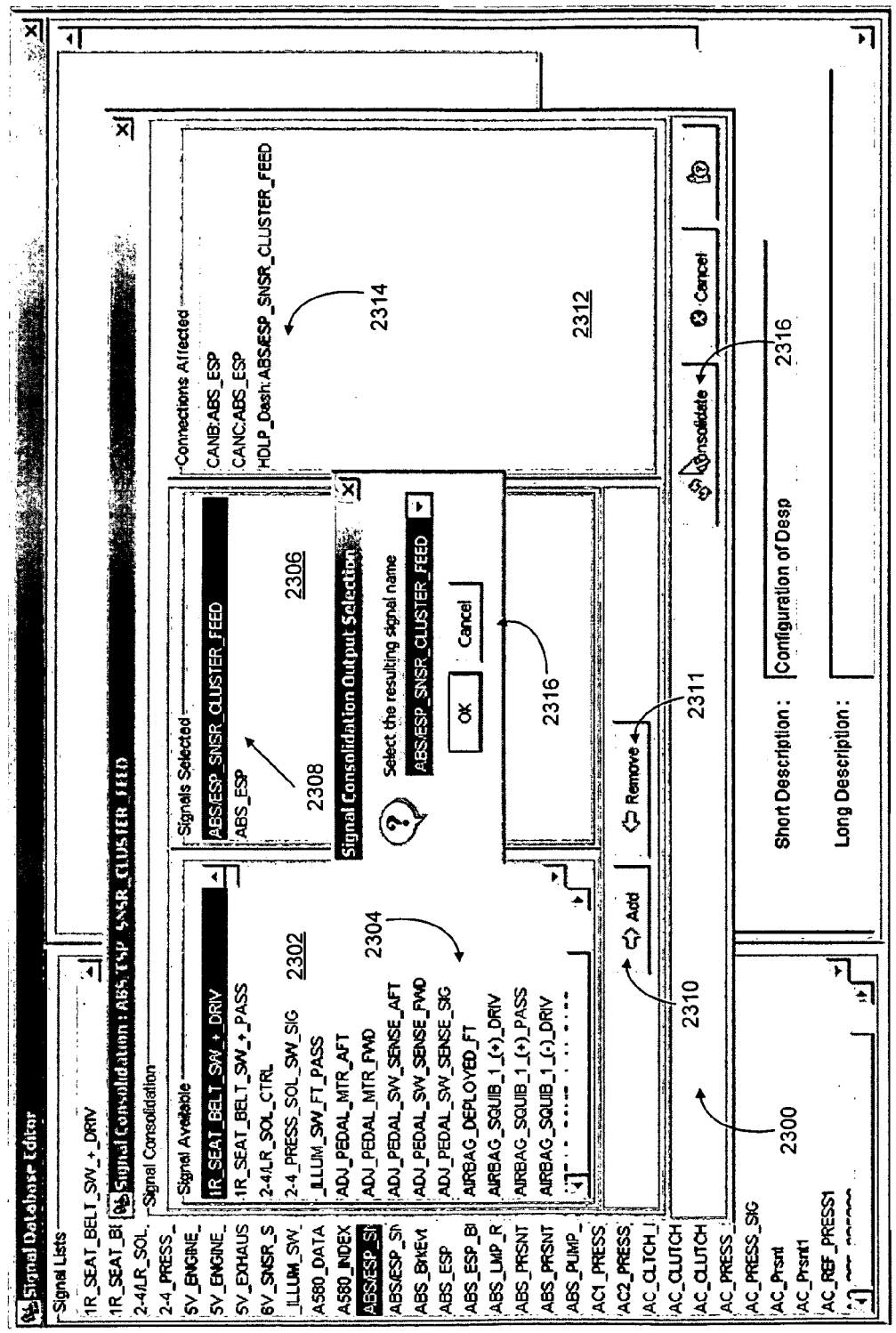

In certain instances, designers in different design domains may give the same signal different names, and thus when the domain-specific data is imported into the unified database, there may be multiple instances of the same signal, albeit with different signal names. FIG. 23 is an example GUI 2300 to facilitate the consolidation of duplicate or redundant signals into a single signal instance in the unified database. The GUI 2300 includes a list pane 2302 that displays a signal list 2304 of the signals of the vehicle library and a selected signal pane 2306 that displays a signal list 2308 of signals selected from the signal list 2304 (via, e.g., an add button 2310) for consolidation. The GUI 2300 further includes an information pane 2312 that lists the connections that will be affected if the selected signals are consolidated. Once a user has selected signals for consolidation and signaled that the selected signals should be consolidated (via, e.g., a consolidate button 2316), the GUI 2300 displays a dialog box 2316 that lists possible signal names for the user to select to be assigned to the resulting consolidated signal.

Figure 24:
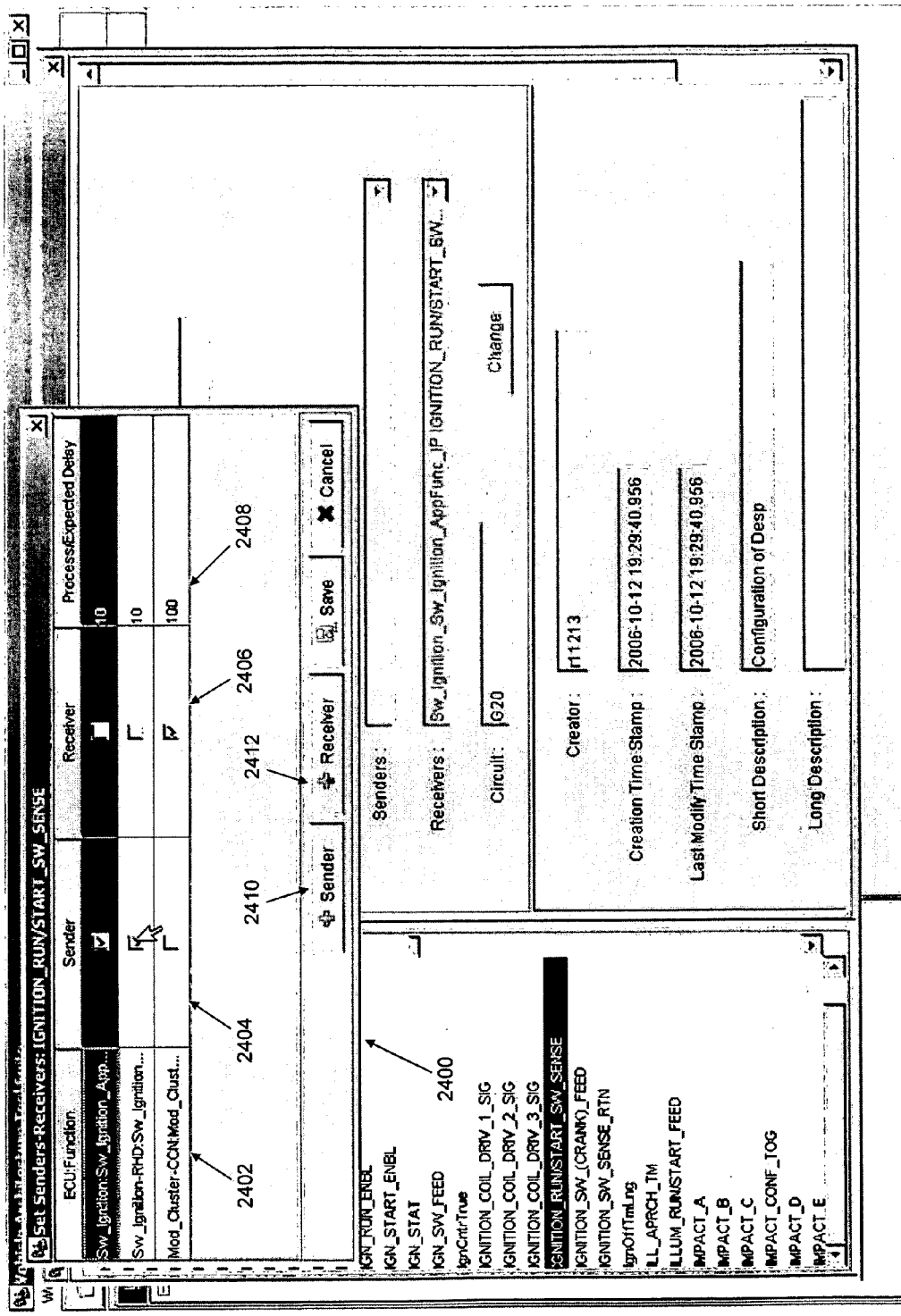

FIG. 24 is an example GUI 2400 for setting the senders and receivers of a selected signal. The GUI 2400 displays a list of components serve as a sender or receiver of the signal. Each entry of the list includes an identifier field 2402, a sender selection field 2404 to indicate whether the component is a sender of the signal, a receiver field 2406 to indicate whether the component is a receiver of the signal, and a delay field 2408 to indicate the time required (e.g., the worst case latency for the signal to reach its destination or the processing time required for processing the signal in a node before it is transmitted or re-transmitted, etc.). In one embodiment, a user can add a component to the list as a sender by selecting an add sender button 2410 or as a receiver by selecting an add receiver button 2412, whereby selection of one of the buttons 2410 or 2412 brings up a dialog box that lists potential components for addition to the list.

Figure 25:
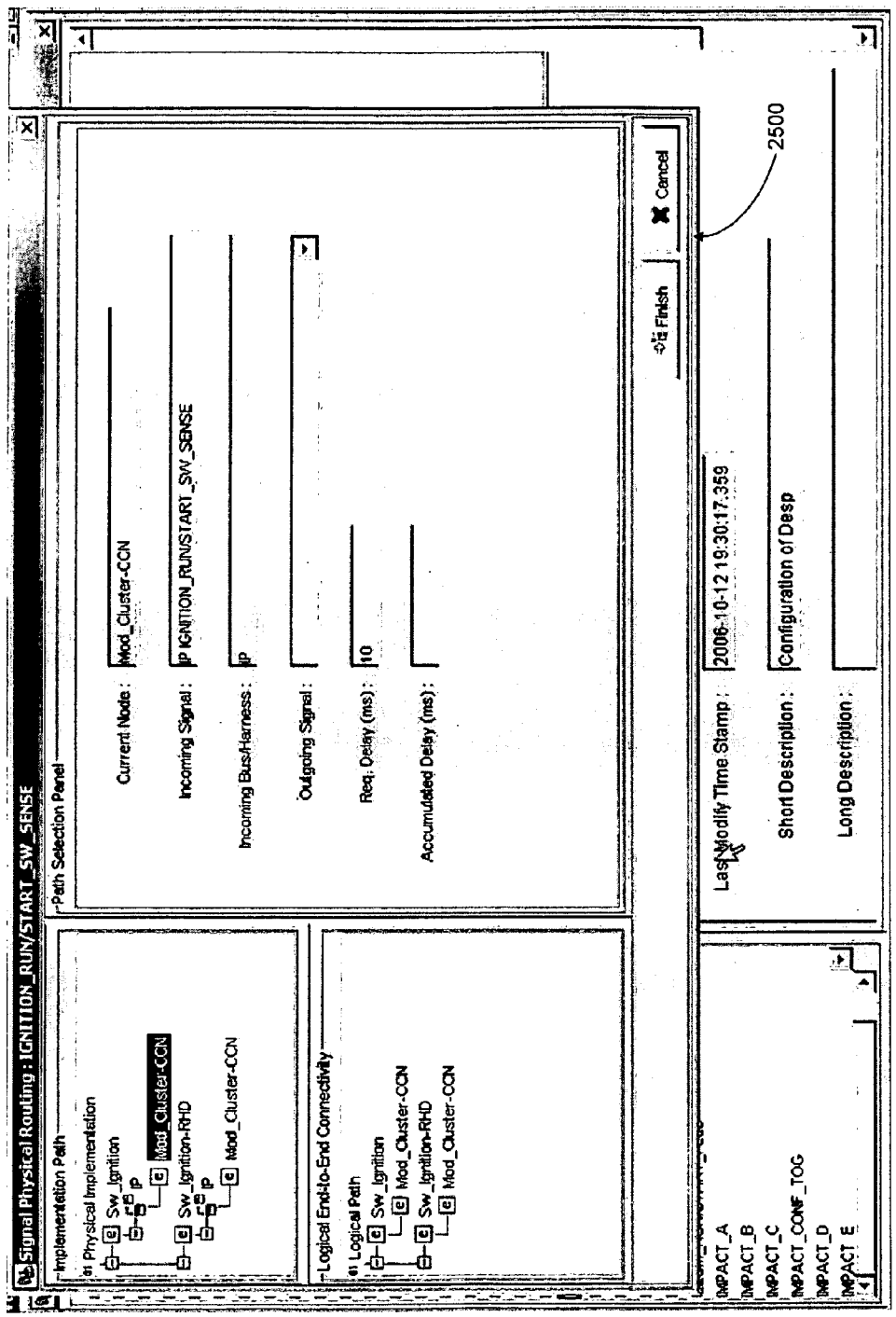

FIG. 25 is an example GUI 2500 for configuring the routing path of a selected signal. As illustrated by the GUI 2500, the designer can define the route of the signal trough manipulation of the tree structure. At each step of the tree structure, the user can choose the next leg of the route. Thus, the complete path from point A to point D is not shown. Rather, when the user selects point A, the user is shown the choices for point B. Once the user selects a choice for point B, the choices for point C are shown, and so on, until the point D is chosen, thereby setting the path for the signal.

Figure 26:
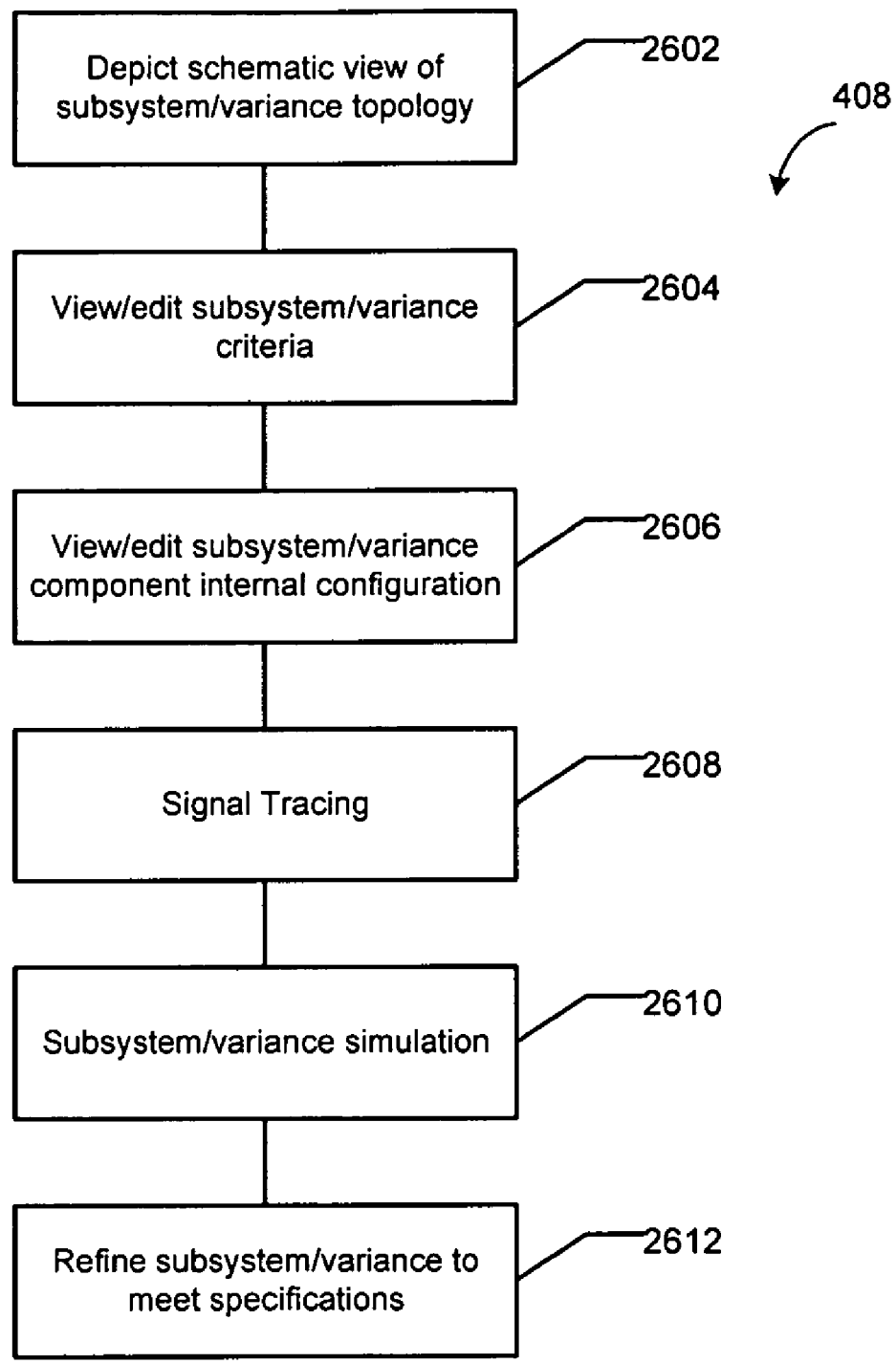
FIG. 26 is a flow diagram illustrating an E/E architecture simulation/verification process of the process of FIG. 4 in accordance with at least one embodiment of the present invention.

FIG. 26 illustrates the E/E architecture simulation/verification process (block 410 of FIG. 4) in accordance with at least one embodiment of the present disclosure. During the E/E architecture simulation/verification process, the designers from the various design domains can utilize their respective domain agents to simulate the performance of various subsystems or the overall E/E architecture so as to verify that the designed E/E architecture meets the designated performance criteria. The performance criteria can include, for example, defined maximum end-to-end times for some or all of the signals, maximum loading for the ECUs, devices, and network buses, task throughput, and the like.

As part of the E/E architecture simulation/verification process, the domain agent can provide various GUIs to facilitate the display of a schematic view of a selected subsystem topology or vehicle variance technology at block 2602. This schematic view allows the designer to rapidly verify the connections between components of the subsystem or vehicle variance. Further, at block 2604, the domain agent can provide a GUI to the user to permit the user to view and edit the performance parameters and criteria of the components of the selected subsystem or vehicle variance. At block E06, the domain agent can use a GUI to facilitate the display of a schematic view of the internal high-level configuration of certain components of the subsystem, such as a schematic view of the relationships between functions and tasks of an ECU. The domain agent further can provide a GUI to provide a graphical view of the signal routing/tracing within a selected subsystem or vehicle variance at block 2608.

Once a designer has specified the performance parameters for the various components of a subsystem or vehicle variance and has defined the performance criteria for the subsystem or vehicle variance, the designer can use GUIs provided by the domain agent to simulate the performance of the subsystem or vehicle variance to confirm that the design meets the specified performance criteria at block 2610. In the event that the performance criteria are not met, and thus necessitating further refinement of the design of the selected subsystem or vehicle variance. At block 2612 the designer can further refine the architecture of the subsystem or vehicle variance using the domain agent in an effort to design an architecture that meets the performance criteria. This refinement can include, for example, redistributing tasks and functions among the ECUs and devices, repartitioning the distribution of tasks and functions between hardware implementation and software implementation, changing the physical routing of certain signals, and the like. The processes of blocks 2602, 2604, 2606, 2608, and 2610 can be used for the refinement of the E/E architecture.

Figure 27:
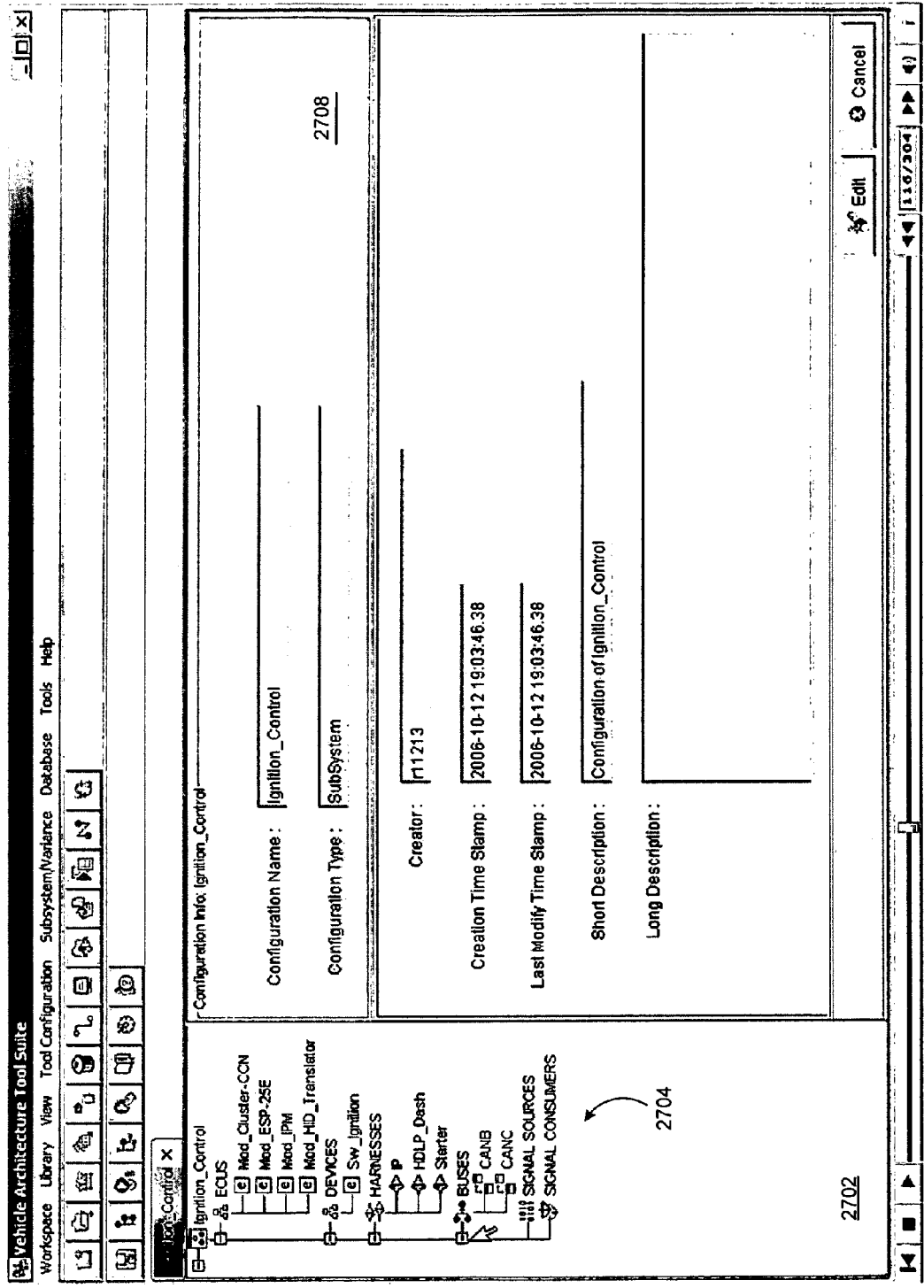
FIGS. 27-43 are diagrams illustrating example GUIs that facilitate the E/E architecture simulation/verification process of FIG. 26 in accordance with at least one embodiment of the present invention.

FIGS. 27-37 illustrate various example GUIs that can be implemented by a domain agent to facilitate the E/E architecture simulation/verification process of FIG. 26 in accordance with at least one embodiment of the present disclosure. FIG. 27 is an example GUI 2700 that provides a top-level view of a selected subsystem. The GUI 2700 includes a list pane 2702 that displays a component list 2704 of the components of the vehicle library that are implemented as part of the selected subsystem, including the ECUs, devices, harnesses, and network busses, as well as listing the components that serve as sources of signals and the components that serve as consumers of signals in the selected subsystem. The GUI 2700 further includes an information pane 2708 that identifies the subsystem name and the type (i.e., "subsystem" or "vehicle variance").

Figure 28:
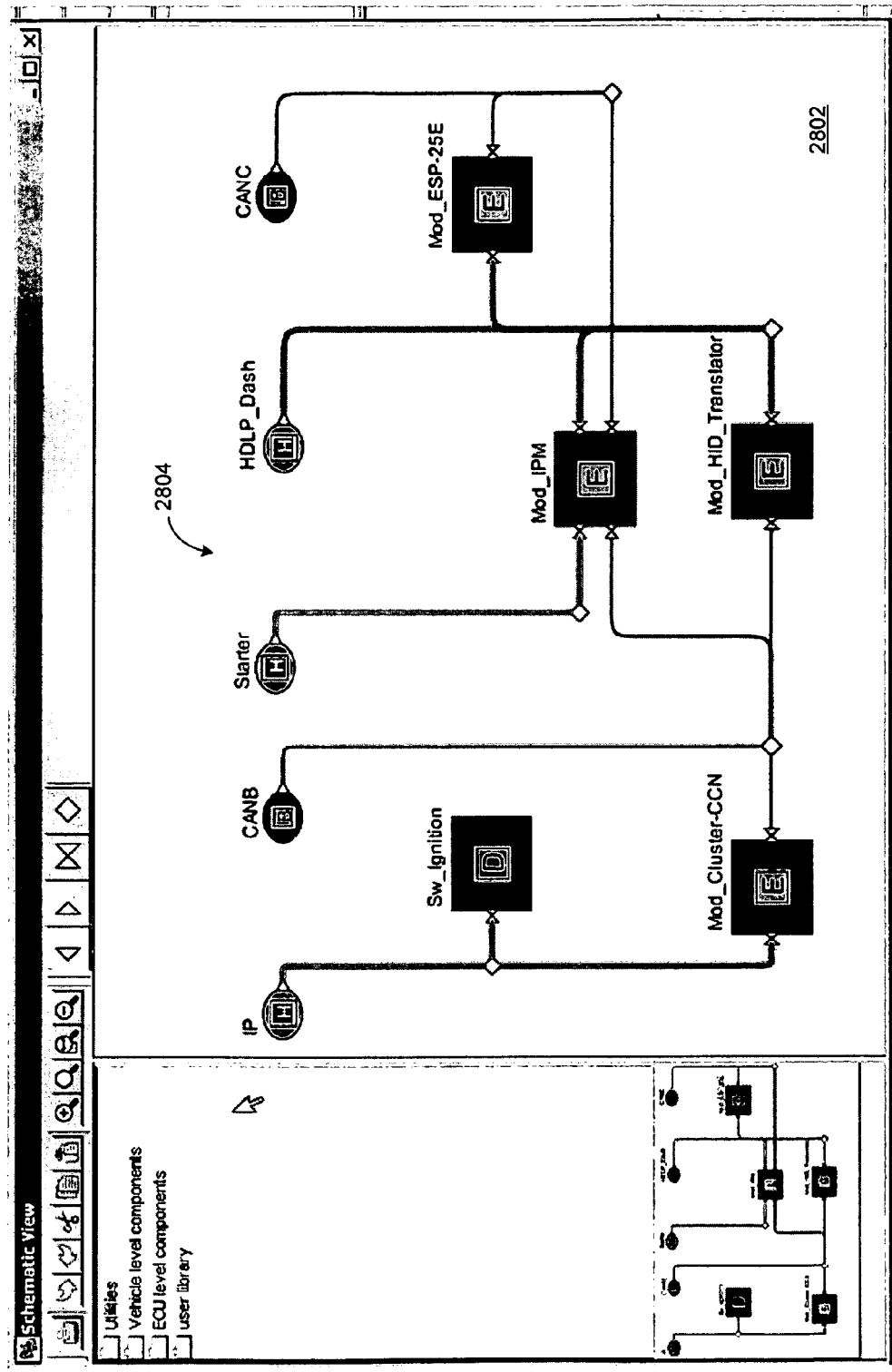

FIG. 28 is a GUI 2800 that provides a schematic view of the topology of the selected subsystem. The GUI 2800 includes a schematic pane 2802 used to display a topology schematic 2804 of the selected subsystem. As illustrated in FIG. 28, the topology schematic 2804 describes the connections between the components of the subsystem, and utilizes different designators to identify the different component types. To illustrate, the harnesses and network busses of the topology are identified using a circular icon, whereby the icon includes the letter "H" if it represents a harness or the letter "B" if it represents a network bus. The ECUs and devices of the subsystem topology are designated using a square icon, whereby the icon includes the letter "D" if it represents a device or the letter "E" if it represents an ECU. The graphical display of the topology of the selected subsystem afforded by the GUI 2800 allows a designer to rapidly comprehend and verify the connections between components of the selected subsystem. The domain agent generates the topology schematic 2804 based on the relationships and connections between the components of the selected subsystem as indicated by the data in the local copy of the unified database at the domain agent. As discussed above, information regarding the relationships and connections between the components can be imported from one or more files, the designer can use one or more of the GUIs described to create, modify, or delete relationship and connection information between the components, or a combination thereof.

Figure 29:
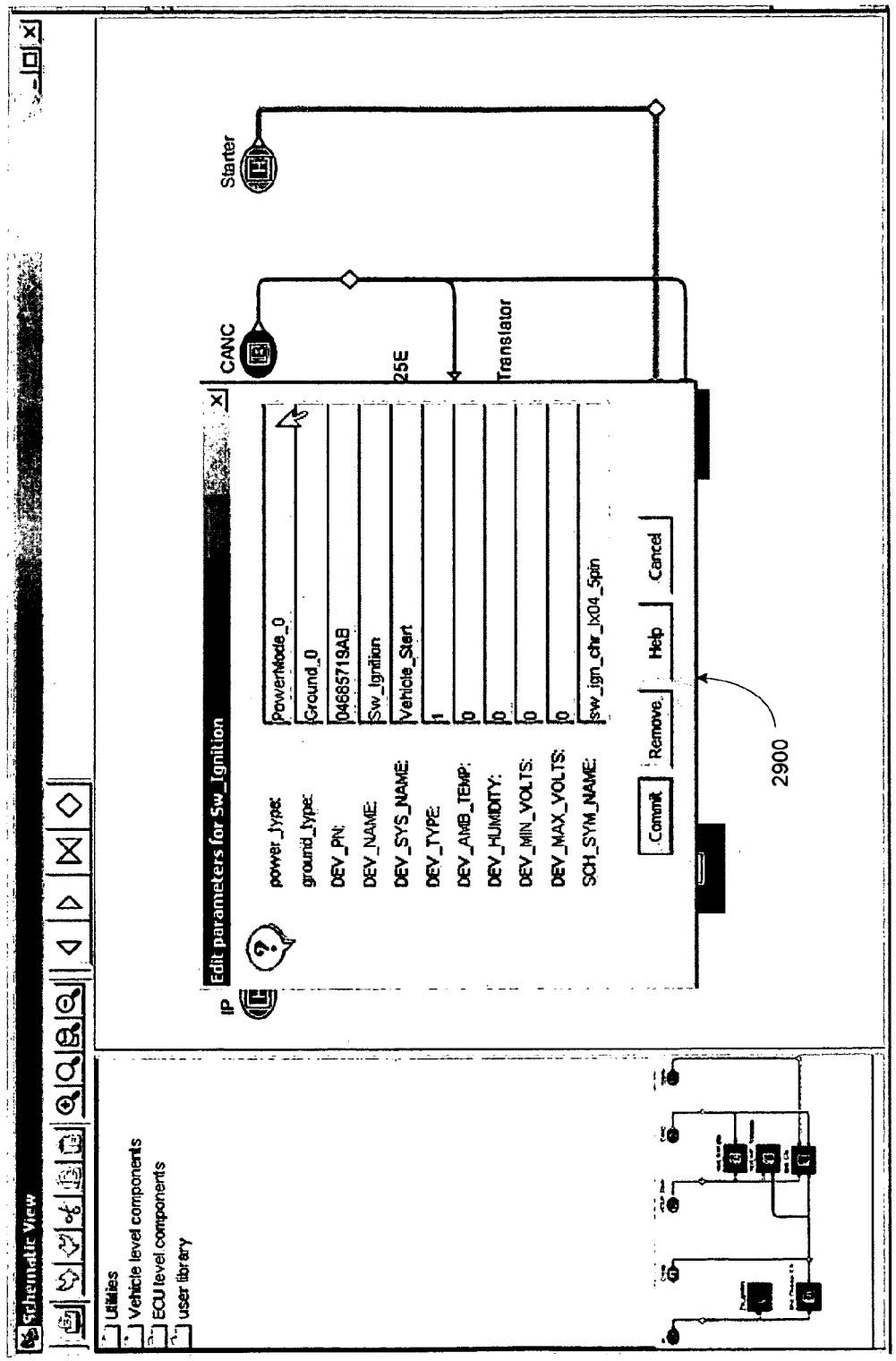
Figure 30:
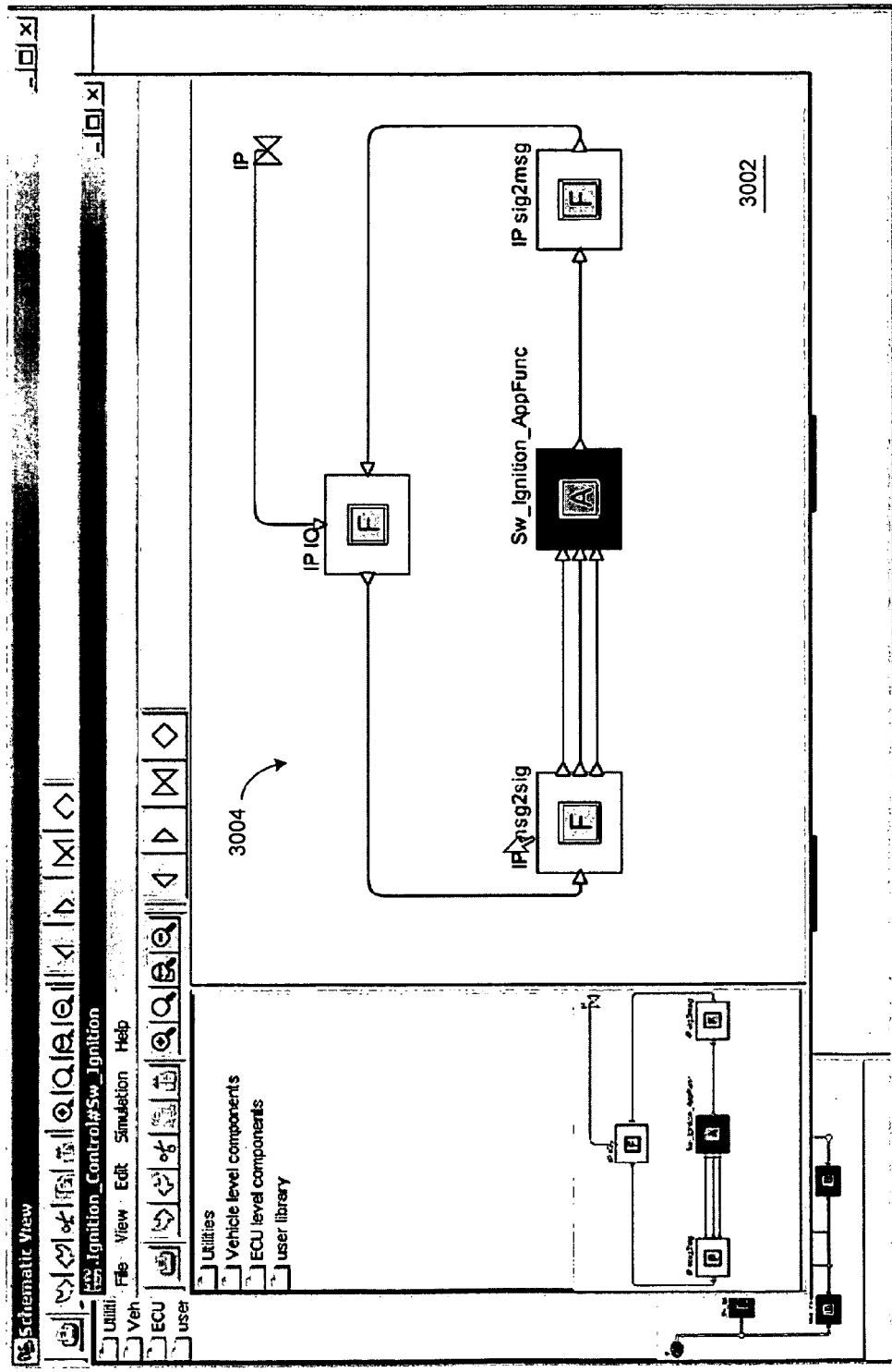

Further, in at least one embodiment, the GUI 2800 is configured such that the user can select the icon representing a component to access additional information regarding the component. FIG. 29 is an example GUI 2900 that is displayed upon selection of the "Sw_Ignition" device icon from the GUI 2800 of FIG. 28. In the depicted example, various editable operational information regarding the "Sw_Ignition" device is displayed, including the power type and ground type to which the device is connected, the part number (PN) of the device, the name of the device, the name of subsystem to which the device belongs, the device type, and certain expected operating parameters for the device, such as the ambient temperature and humidity the device is expected to be subjected to, the minimum and maximum operating voltage that the device can operate as expected, and the like. The user can edit some or all of this information using the GUI 2900. FIG. 30 is an example GUI 3000 for graphically presenting the internal configuration of the selected component, which in the depicted example is the internal configuration of the "Sw_Ignition" device. The GUI 3000 includes a configuration pane 3004 in which an internal topology schematic 3004 is displayed to graphically present the relationships between functions and software applications of the "Sw_Ignition" device. To illustrate, the internal topology schematic 3004 indicates that the "Sw_Ignition" device includes three functions: "IP IO"; "IP msg2sig"; and "IP sig2msg", each represented by a square icon having the letter "F", and includes a software application "Sw_Ignition_AppFunc" represented by a square icon having a letter "A". The internal topology schematic 3004 further indicates that the "IP IO" function receives signaling from the "IP" harness and provides a signal to the "IP msg2sig" function, that the "IP msg2sig" function generates three signals that are input to the "Sw_Ignition_AppFunc", that the "Sw_ignition_AppFunc" generates a signal that is input to the "IP sig2msg" function, and that the "IP sig2msg" function generates a signal that is output to the "IP" harness.

Figure 31:
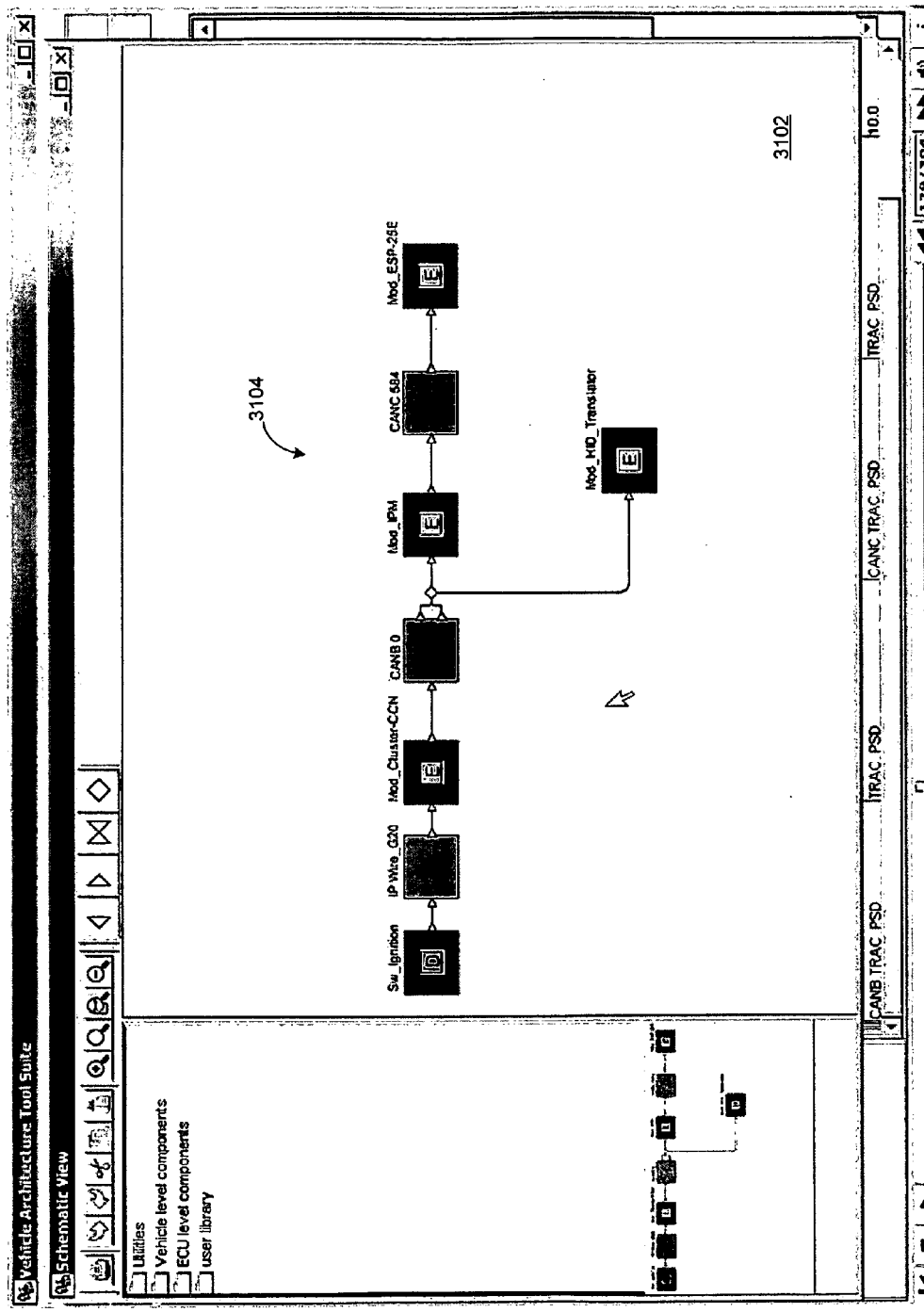
Figure 32:
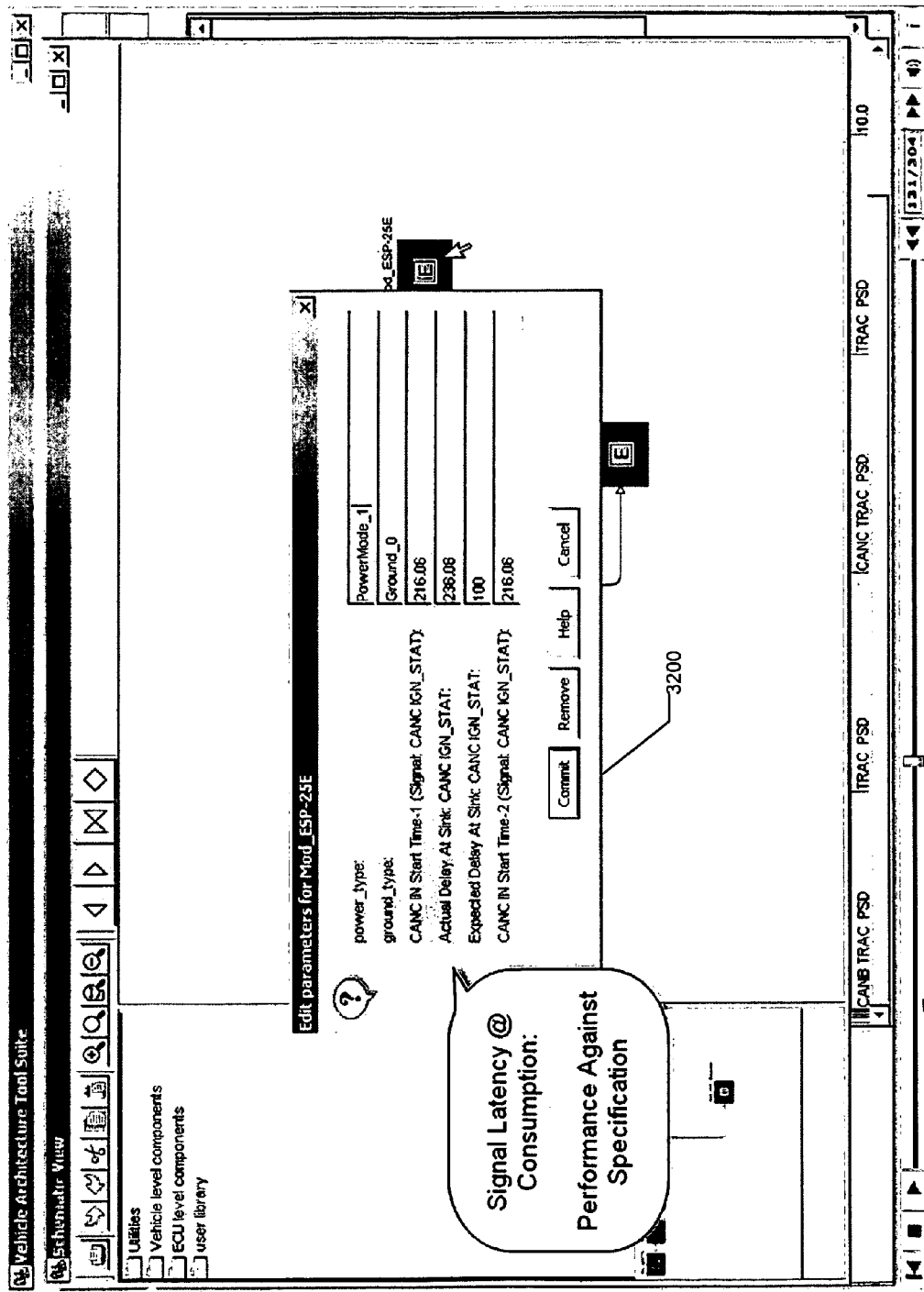

FIGS. 31 and 32 illustrate example GUIs implemented by a domain agent to graphically present signal tracing information for a selected signal within a selected subsystem. FIG. 31 is an example GUI 3100 having a schematic pane 3102 that graphically depicts a signal routing schematic 3104 for the selected signal. The signal routing schematic 3104 illustrates the one or more end-to-end paths of the selected signal through the subsystem as determined by the domain agent based on the relationships and connections between the components of the subsystems as represented in local copy of the unified database. In the example of FIG. 31, the signal trace for a signal "IGNITION_RUN/START_SW_SENSE" is depicted by the signal routing schematic 3104, whereby the signal is generated by the "Sw_Ignition" device, whereupon it is transmitted to the "Mod_Cluster-CCN" ECU via circuit "G20" of the "IP" harness. The "Mod_Cluster-CCN" ECU provides the signal to the "CANB 0" network bus. From the "CANB 0" network bus, the signal is provided to the "Mod_HI5translator" ECU, which consumes the signal for one or more tasks or functions. The signal is also provided from the "CANB 0" network bus to the "Mod_ESP-25E" ECU via the "CANC 584" network bus. The "Mod_ESP-25E" ECU consumes the signal for one or more tasks or functions. Thus, the "Sw_Ignition" device serves as the source of the signal and the "Mod_HI5translator" ECU and the "Mod_ESP-25E" serve as the end destinations of the signal. In order to determine the signal latency at any component along the signal trace path represented by the signal routing schematic 3104, the user can select the icon representing the component to direct the domain agent to display the GUI 3200 of FIG. 32. The GUI 3200 includes a field indicating the specified or desired maximum signal latency from initial transmission from the source to the selected component ("Expected Delay at Sink"). The GUI 3200 further includes a field indicating the actual signal latency from initial transmission from the source to the selected component ("Actual Delay at Sink") as determined from the subsystem simulation process described in greater detail below. To illustrate, the GUI 3200 represents the GUI initiated upon the selection of the "Mod_ESP-25E" ECU, which indicates that the actual signal latency of 236.06 milliseconds exceeds the expected signal latency of 100 milliseconds, thereby indicating to the user that the architecture of the subsystem will need to be refined to improve the actual signal latency, such as by modifying the physical routing of the signal, by giving the signal a higher processing priority, by reassigning the functions or tasks that consume the signal to another component further upstream in the signal trace, etc.

As discussed above, the domain agent can utilize the configurations of the components of a subsystem, their relationships and connections, and their performance parameters as indicated by the local copy of the unified database to simulate the operation of the subsystem for some period or duration. In at least one embodiment, a commercially available simulator is used for simulation, the results of which are provided for rapid understanding via graphical display on a GUI. In one embodiment, the simulator is the SystemC Simulator kernel, whereby the simulation models are developed in SystemC language. It will be appreciated that SystemC is both a description language and a simulation kernel. The written code compiles together with a corresponding library's simulation kernel to give an executable that behaves like the herein-described model when it is run. One characteristic of this simulation kernel is the ability to simulate concurrent processes or multiple threads with a pre-emptive scheduler. This enables a more realistic simulation of system (e.g., the vehicle communication networks where multiple nodes (ECUs) are concurrently executing software resulting is concurrent messages being sent on the networks). The simulation "deck" or environmental setup and model parameters are generated using the GUI of the associated domain agent. While the simulation is running, the results are captured in a data file for post processing. The post processing and display of the results of the simulation is done via the GUI and display screens in the domain agent. A simulation report detailing the results can be generated in, for example, hypertext markup language (HTML).

The models used in the simulation, in one embodiment, are described using the SystemC language, and captured in the library format. The models are parameterized and generic in nature to enable a vast number of scenarios to be tailored via the parameters. The libraries used for the network demonstration simulation can include: a hardware block model of a CAN controller (generic mail box based and specific MSCAN-based standard automotive CAN specification); a hardware block model for LIN; a LIN bus model emulating the bus protocol behavior based on automotive standard LIN specifications; a CAN bus model emulating CAN protocol behavior including the bit-level arbitration at message level; a gateway model emulating a gateway between two networks (e.g., a gateway between a high speed CAN network and a medium speed CAN or LIN network on the vehicle) whereby the translation delays are represented for translating the signal from one network/protocol to the other (the gateway model can also be represented by a generic ECU model whereby the software tasks for translation can be defined in more detail); a ECU hardware performance model emulating a generic microcontroller performance based on delays due to memory accesses, average instruction cycle time, power-up delays, interrupt latencies, and the like; an ECU software performance model emulating the software task execution times; an ECU preemptive scheduler model emulating the operating system (OS) tasking structure; event models emulating the generation of signals or events on a periodic and a priori basis; and error models emulating statistical injection of errors into the simulation. The models are instrumented with code to capture performance metrics, error logs and other data that may be required for analysis later.

The software architecture for each node is built up through software tasks. Those task are mapped to a CPU model based on their execution cycle time and priority of the execution. At any time, the penalty of the hardware can be represented as time delay and the penalty of the software task can be represented as execution time. The CPU model under each node is a preemptive priority-based scheduler, with which the higher priority task can interrupt the lower priority tasks. Modeling vehicle communication protocols is the key for vehicle network simulation. The capability of modeling network buses is fundamental to vehicle network simulation. The features included in a network protocol model can include: bus arbitration, bus load monitoring; tracing of message behavior; random error frame injection (passive and active); and random overload frame injection. ECU hardware models can be created based on a priority-based pre-emptive scheduler. A microcontroller (MCU) architecture can be mapped to each node in terms of execution time of each instructions/tasks. The fine-tuned execution time due to different kind of methods of memory access and penalty of interrupts can also be mapped into the model. Based on this hardware model, software tasking can be created and priority of each tasking can be assigned to manipulate Operating System (OS) for the node. Further, a variety of details for MCU performances can be specified, such as cycle counts for a particular instruction, a subroutine, or a task. The event/signal models are parameterized and via the GUI the designer can define the type, duration, periodicity, units etc of the signals or events. In this illustration—the switch activation for positioning the mirror was described.

When all the parameters are described for simulation of a particular scenario—the simulation kernel is invoked via a GUI—the designer is prompted to enter the simulation time in a time unit (e.g., milliseconds), which determines how long the simulation will run (representing elapsed real time). Based on memory capacity and assuming the base timing (tick) to be in the microseconds, typical simulation runs are seconds long. Depending on the granularity of the results required, the base tick of the simulation could be increased milliseconds to get longer simulation runs. The simulation tool automatically creates the required data structures to be fed into the simulation and the simulation executes. At the completion of the simulation, a post analysis GUI is invoked and the designer can view and analyze the results of the simulation or generate detailed reports.

The outputs of the simulation provide rich sets of information regarding vehicle network behaviors (bus traffic, message latency, average bus load, etc.), node behaviors (CPU load, hardware delays, etc.) and communication task behaviors (tasking time, software filtering, interrupt, etc.). This information is invaluable for vehicle communication network architects for debugging and optimizing the network architecture strategy before the vehicle is built.

The post processing tool can provide the following types of information: information of CAN/LIN bus (e.g., the average bus utilization can be viewed over a sliding time window); information for a node on a bus (e.g., average CPU utilization over sliding time window, task penalties, impact of the scheduler on CPU load); and information for a message (e.g., latency of each message and the components of the overall latency, tracing the signal/message through the topology and the software tasks, impact of scheduling on message latencies).

At the vehicle level, this simulation environment has the capability to simulate the entire network or networks at varying degrees of detail, which enables the vehicle manufacturer to study network behaviors very early in the design stage long before the vehicle is built. These network behaviors can include, for example, network errors, network efficiencies, message latencies, efficiencies of frame packing, message prioritization, bus bandwidth utilization. The simulation environment also permits the designers to understand integration and interaction of the different networks at a vehicle level, as well as analyze, specify, and validate response of a distributed system that operates over one or more networks and one or more ECUs. Further, the simulation environment can assist the designers in understanding gateway placement issues, such as CPU bandwidth requirements, task time requirements, scheduler timing requirements, validation of network management strategy, and potential use in design/validation of distributed systems.

The CPU performance of each node also can play a substantial role in maximizing the CPU utilization while guaranteeing the required performance. The simulation environment can provide the first hand information on the CPU load due to the tasks performing communication activities. With an effective OS model (e.g., OSEK) and task scheduling running on the OS, this setup can also be used to analyze the performance of an OS and the efficiency of the scheduler. At each node, this setup allows designers to explore the trade offs between hardware and software tasks, evaluate the performance of CPU, OS, and scheduler under the "real traffic" of the network.

Figure 33:
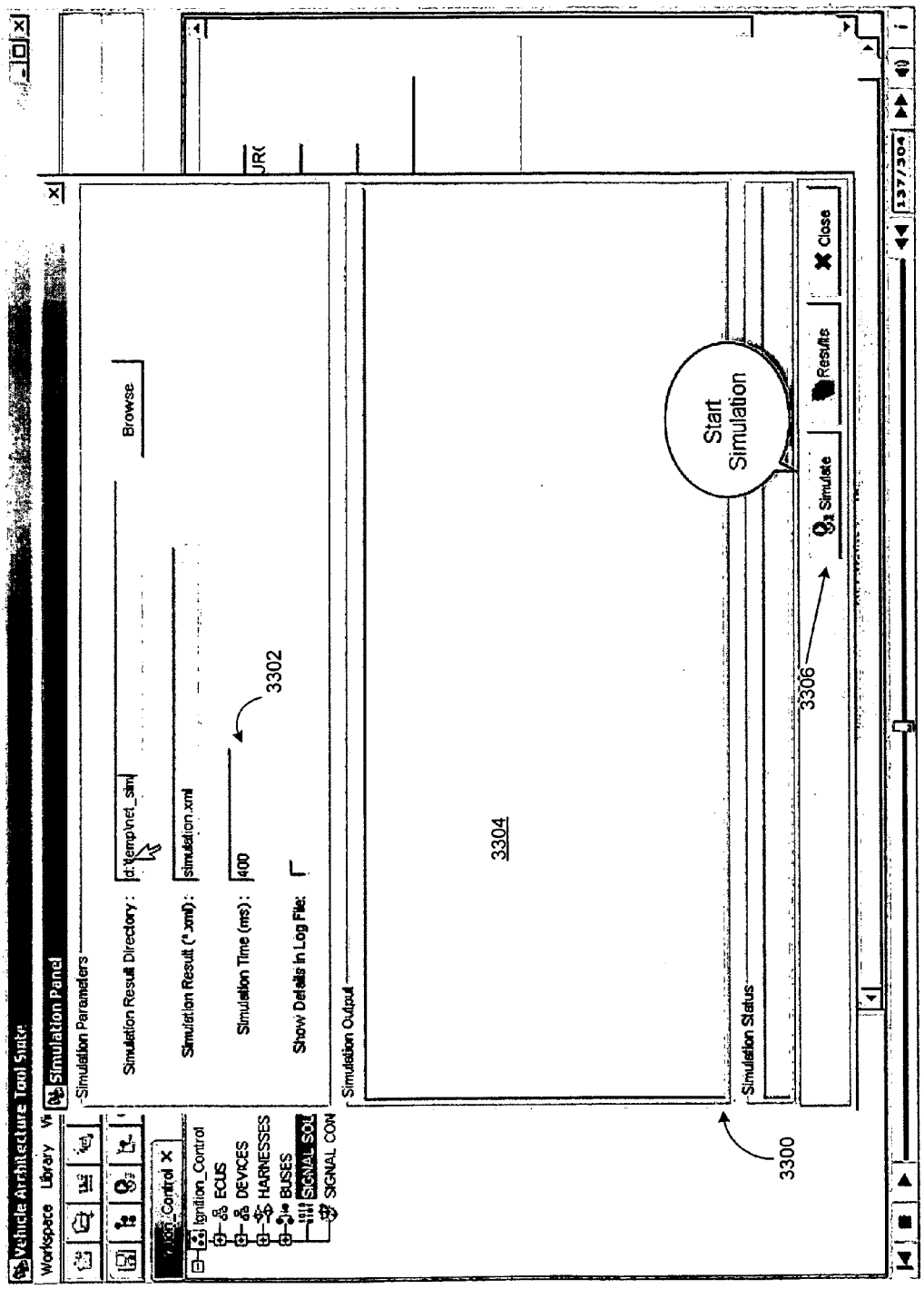
Figure 34:
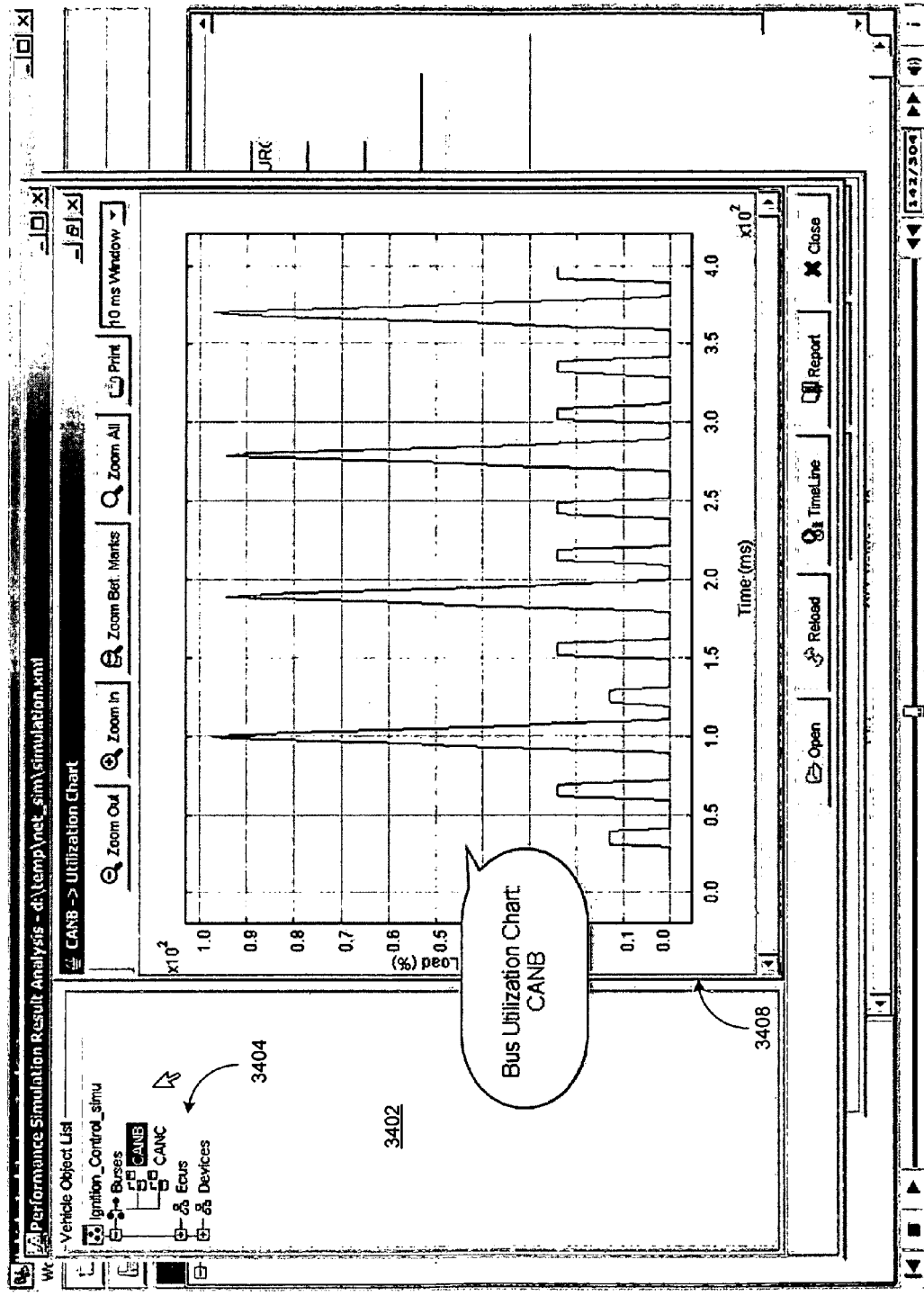
Figure 35:
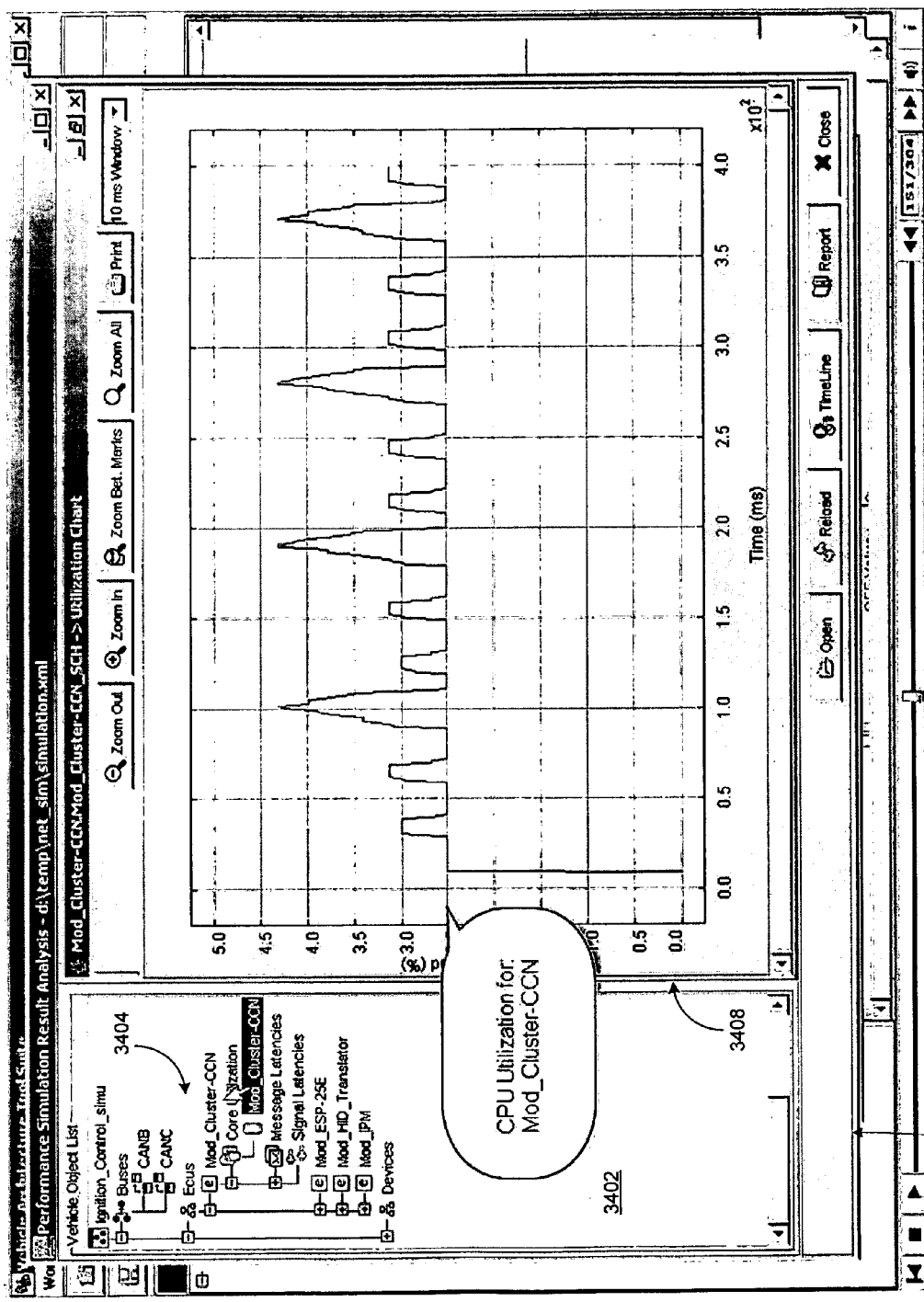
Figure 36:
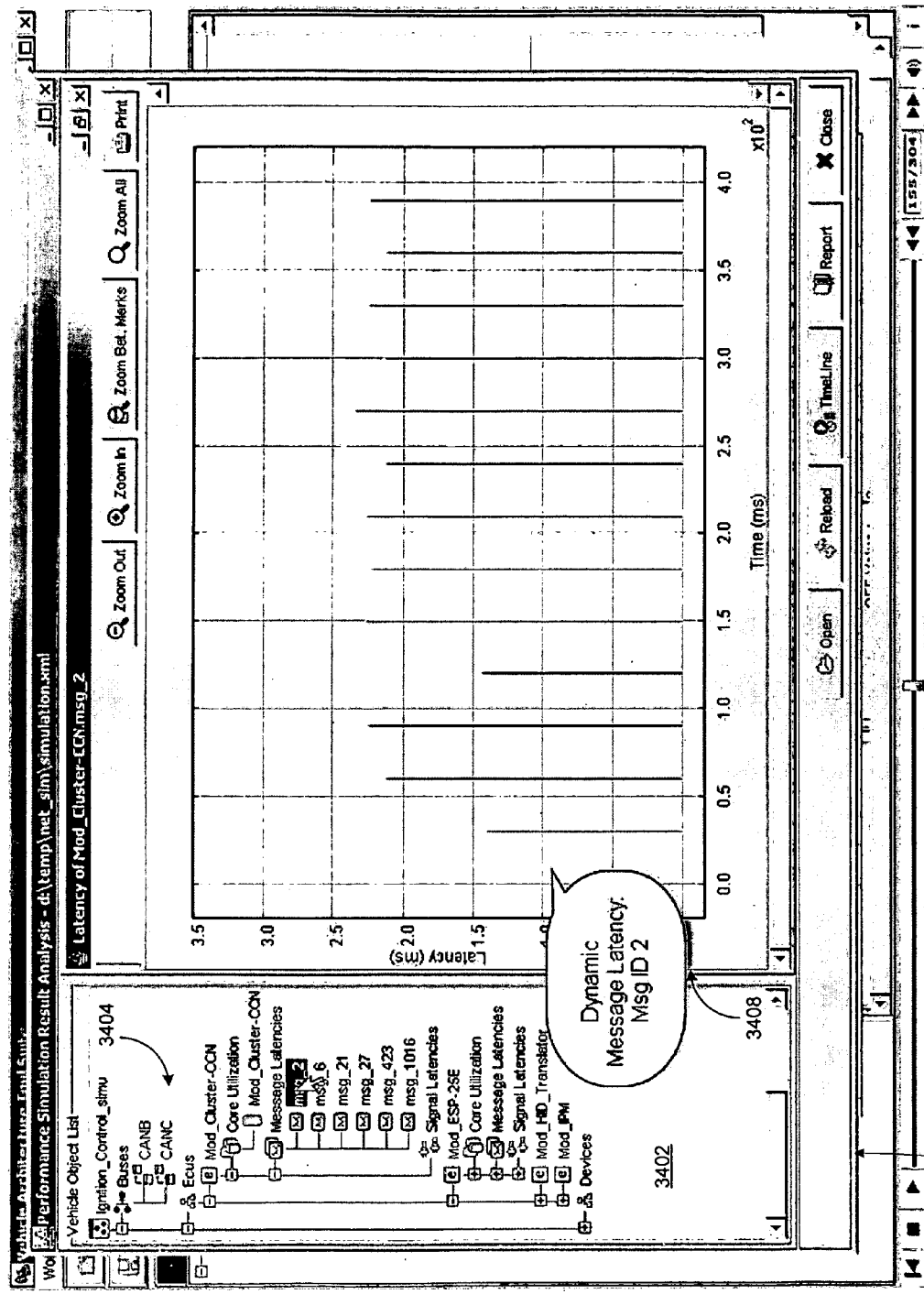
Figure 37:
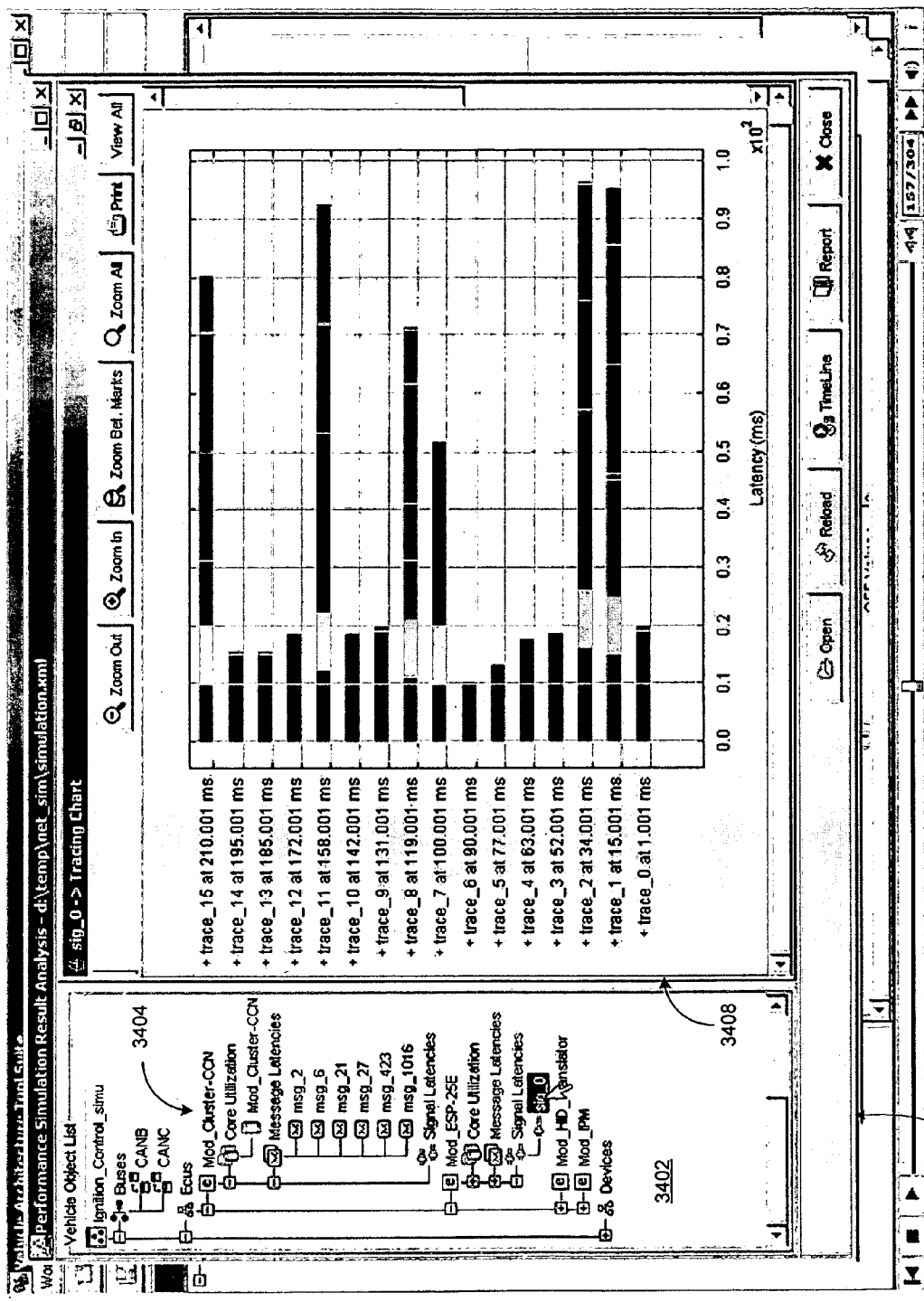

FIGS. 33-37 illustrate example GUIs for configuring the simulation of a selected subsystem and graphically presenting the simulation results to a user in accordance with at least one embodiment of the present disclosure. FIG. 33 is an example GUI 3300 used to configure a simulation to be performed for a selected subsystem. The GUI 3300 includes fields to identify the director and file to which the simulation results are to be stored, a duration filed 3302 in which the user can indicate the duration of the simulation, a simulation output pane 3304 in which simulation results or messages can be displayed, and a simulate 3306 to activate the simulation tool. FIG. 34 is an example GUI 3400 to graphically display simulation results. The GUI 3400 includes a list pane 3402 that displays a component list 3404 of the components of the subsystem for which there are simulation results. The GUI 3400 further includes a simulation results pane 3408 to display simulation results for component selected from the component list 3404. In the example of FIG. 34, the simulation results pane 3408 displays a simulated utilization chart for the "CANB" network bus of the "Ignition_Control" subsystem, where the utilization chart shows the load (%) of the "CANB" network over the 400 millisecond simulation period. FIG. 35 is another example of the GUI 3400 whereby the simulation results pane 3408 displays a simulated utilization for the central processing unit (CPU) or "core" of the "Mod_Cluster-CCN" ECU selected from the component list 3404. FIG. 36 is another example of the GUI 3400 whereby the simulation results pane 3408 displays a dynamic message latency for a message "ms442" processed by the "Mod_Cluster-CCN" ECU selected from the component list 3404. FIG. 37 is yet another example of the GUI 3400 whereby the simulation results pane 3408 displays a signal message latency for periodic instances of a signal "si440" processed by the "Mod_ESP-2E" ECU selected from the component list 3404.

The results of the simulation process may reveal that the E/E architecture as designed may not meet one or more performance criteria, such as maximum signal delay or maximum CPU or network utilization. Accordingly, as discussed above with respect to FIG. 5, the E/E architecture simulation/verification process can include a refinement process whereby the E/E architecture is modified in an attempt to address the design faults revealed by the failed simulation. This refinement process can include, for example, changing the physical routing of signals, reprioritizing functions and tasks, redistributing functions and tasks among the ECUs and devices, creating or removing functions or tasks, adding or removing ECUs and devices, and the like.

Figure 38:
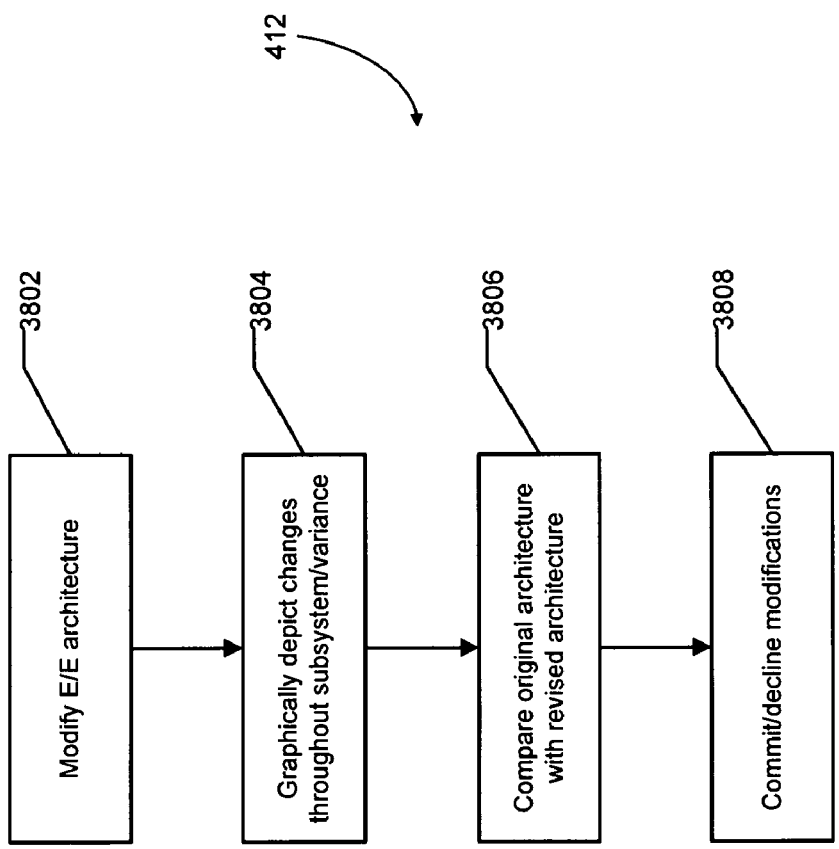

FIG. 38 illustrates the change management process (block 412 of FIG. 4) in accordance with at least one embodiment of the present disclosure. As discussed above, a designer in one design domain may make modifications to a component within the design domain that has ramifications for other design domains. To illustrate, the addition of a new device requires additional signaling to control the new device, changes to an existing harness or network bus or the addition of a new harness or network bus to transmit this signaling, the addition of new functions or tasks to generate the signals that control the new device, etc. Accordingly, the change management process can include utilizing one or more GUIs provided by the domain agent to modify the E/E architecture at block 3802. These modifications can include, but are not limited to, renaming modifications, adding/removing components, tasks, and functions, reassigning tasks or functions, rerouting signals, changing performance parameters of components, creating, modifying, or removing subsystems or vehicle variances, and the like. At block 3804, the domain agent can visually depict the changes throughout the subsystem or vehicle variance, or throughout the entire E/E architecture for the vehicle. As described in greater detail below, the changes can be graphically depicted via a hierarchical list of components of the subsystem or vehicle variance and their various attributes or characteristics, whereby the changes can be denoted via visual indicators associated with each listed item, such as by utilizing different colored fonts or different symbols to indicate changed items, deleted items, added items, etc. At block 3806, the designer can use the visual depiction of the changes resulting from the designer's modifications to compare the original E/E architecture with the revised E/E architecture to determine whether the results justify the ramifications of the modification and at block 3808 the designer can either commit the modifications to revise the E/E architecture or decline the modifications to return to the original E/E architecture based on these considerations. To illustrate, a designer may add a new task to a device that requires a new input control signal for the device. To accommodate the new input control signal, an upstream ECU may need to implement a new function, the addition of which may require a more powerful CPU for the ECU, and a new circuit may need to be added to the harness connecting the ECU and the device for transmitting the new signal. The designer, along with other designers in the same domain or different domains, may perform a cost-benefit analysis of this modification in view of these new requirements. To illustrate, assuming that additional cost of a more powerful CPU results in a $5 increase for the cost of the ECU and the cost to fabricate the harness with the additional wires raises the harness price by $1, and further assuming that 500,000 vehicles are projected to sold for the particular vehicle variance implementing this E/E architecture, thereby resulting in a $3,000,000 increase in the cost of implementing the new task ($6 increase per vehicle times 500,000 vehicles). Thus, if the new task is, for example, heating the right side view mirror, the design team may decide that the new task does not justify the cost of implementation, whereas if the new task is, for example, the activation of an airbag, the design team may then decide the new task justifies the cost of implementation.

In addition to allowing the designer who makes the modification to observe the resulting changes throughout the E/E architecture, the change management process further permits other designers in the same design domain and designers in the other design domains to also visually identify the effects of architecture modifications committed by another designer. To illustrate, a designer in the harness domain may access the harness domain agent and observe that designers in the subsystem domain have added new functionality to various ECUs in a subsystem that will require the addition of new circuits to the harness of the subsystem and new signals to the frames transmitted in the network busses of the subsystem. The designer in the harness domain then may consult with the designers who made the changes to verify their necessity or to further refine the modifications, or if the changes appear acceptable, the designer in the harness domain then may utilize the GUIs of the domain agent to implement the necessary design changes to the harnesses and network buses of the subsystem. The harness designer further may utilize the GUIs of the domain agent to perform the simulation and verification processes for the modified E/E architecture for the subsystem to verify correct operation.

Figure 39:
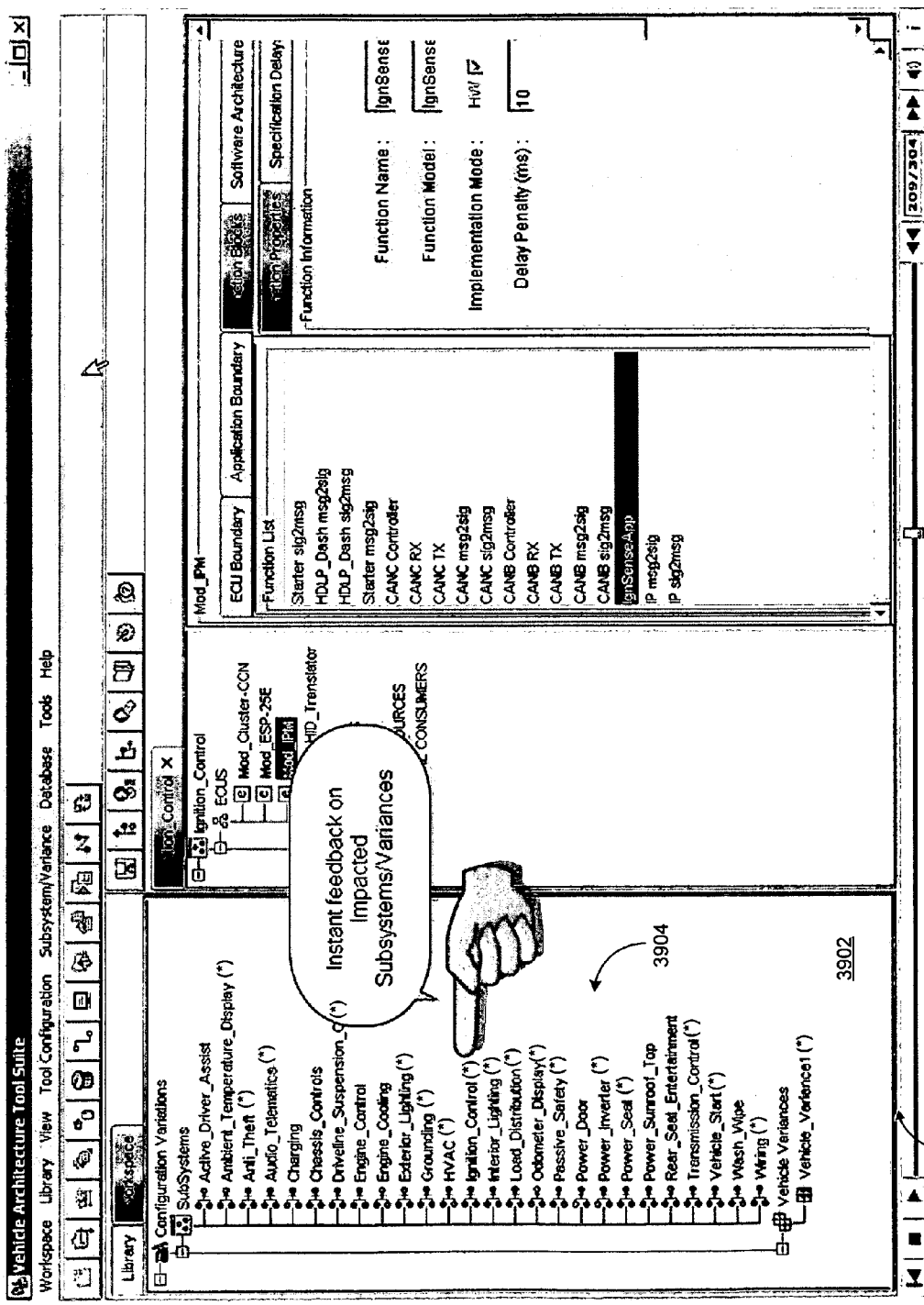
Figure 40:
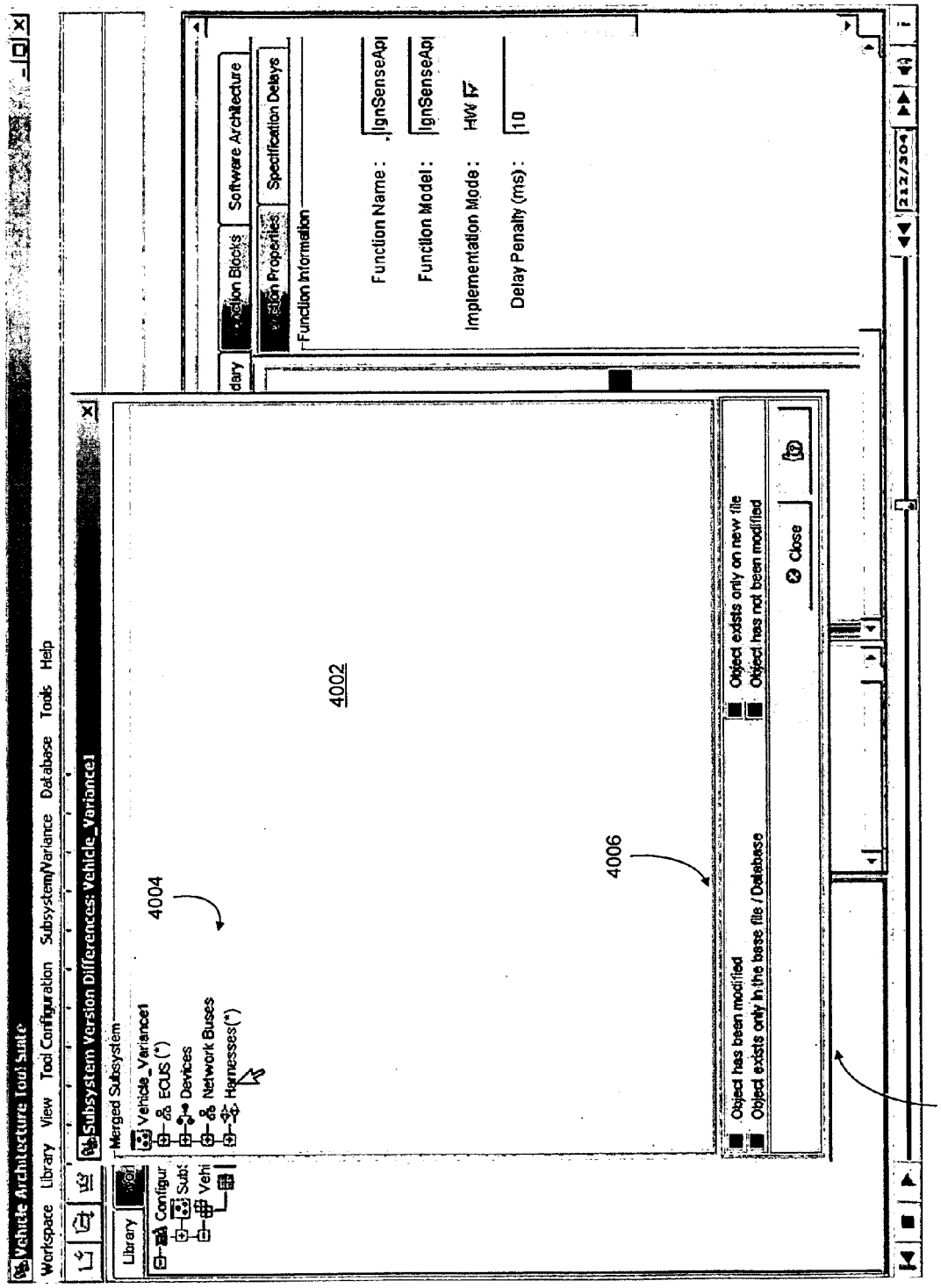

FIGS. 39-43 illustrate example GUIs for the change management process of FIG. 38 in accordance with at least one embodiment of the present disclosure. FIG. 39 is an example GUI 3900 for graphically depicting the subsystems and vehicle variances impacted by a modification to the E/E architecture. The GUI 3900 includes a list pane 3902 that displays an expandable list 3904 of subsystems and vehicle variances of the vehicle library. The list pane 3902 utilizes visual indicators of the impact status of each listed item. In at least one embodiment, the visual indicators comprises different text colors. To illustrate, listed objects that are not impacted by the modifications can be denoted using black text and listed objects that are impacted by the modifications can be denoted using red text. However, in view of the black-and-white aspects of the figures, those listed objects that are impacted are denoted with a "(*)" indicator in FIG. 39. FIG. 40 is an example GUI 4000 displayed by the domain agent in response to a user's selection of the "Vehicle_Variance1" object in the expandable list 3904 of FIG. 39. The GUI 4000 includes a list pane 4002 that displays an expandable hierarchical list 4004 of objects (components, component attributes, etc.) associated with the vehicle variance and their impact status. In the depicted example, the indicator "(*)" is used to indicate that one or more of the ECUs and one or more of the harnesses of the "Vehicle_Variance1" are impacted by the modifications. The GUI 4000 further can include an impact legend 4006 that depicts how different types of impact are denoted, such as whether the corresponding object has been modified or remains unmodified, whether the corresponding object exists only in the original E/E architecture or whether the corresponding object exists only in the revised (i.e., "new") E/E architecture.

Figure 41:
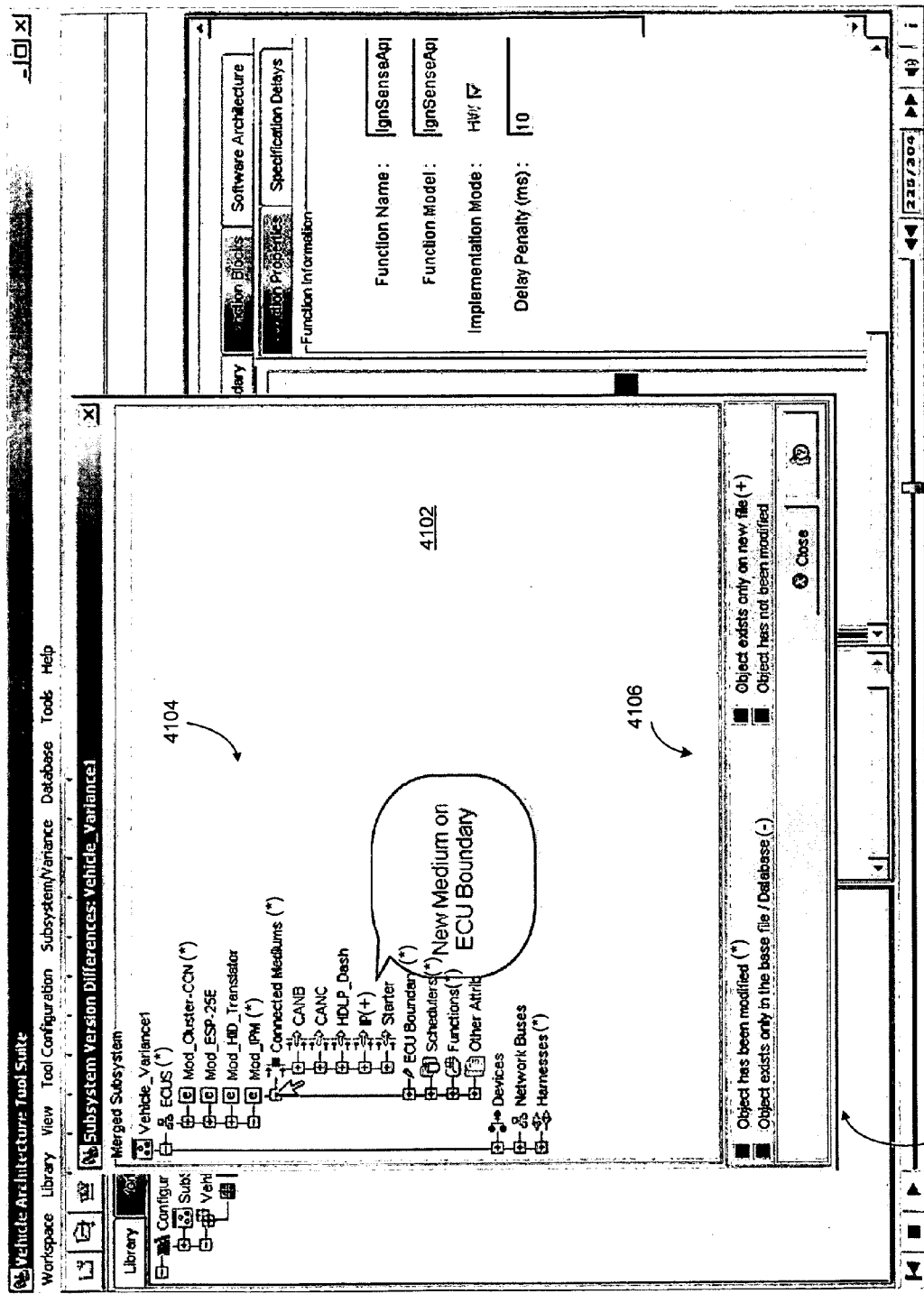
Figure 42:
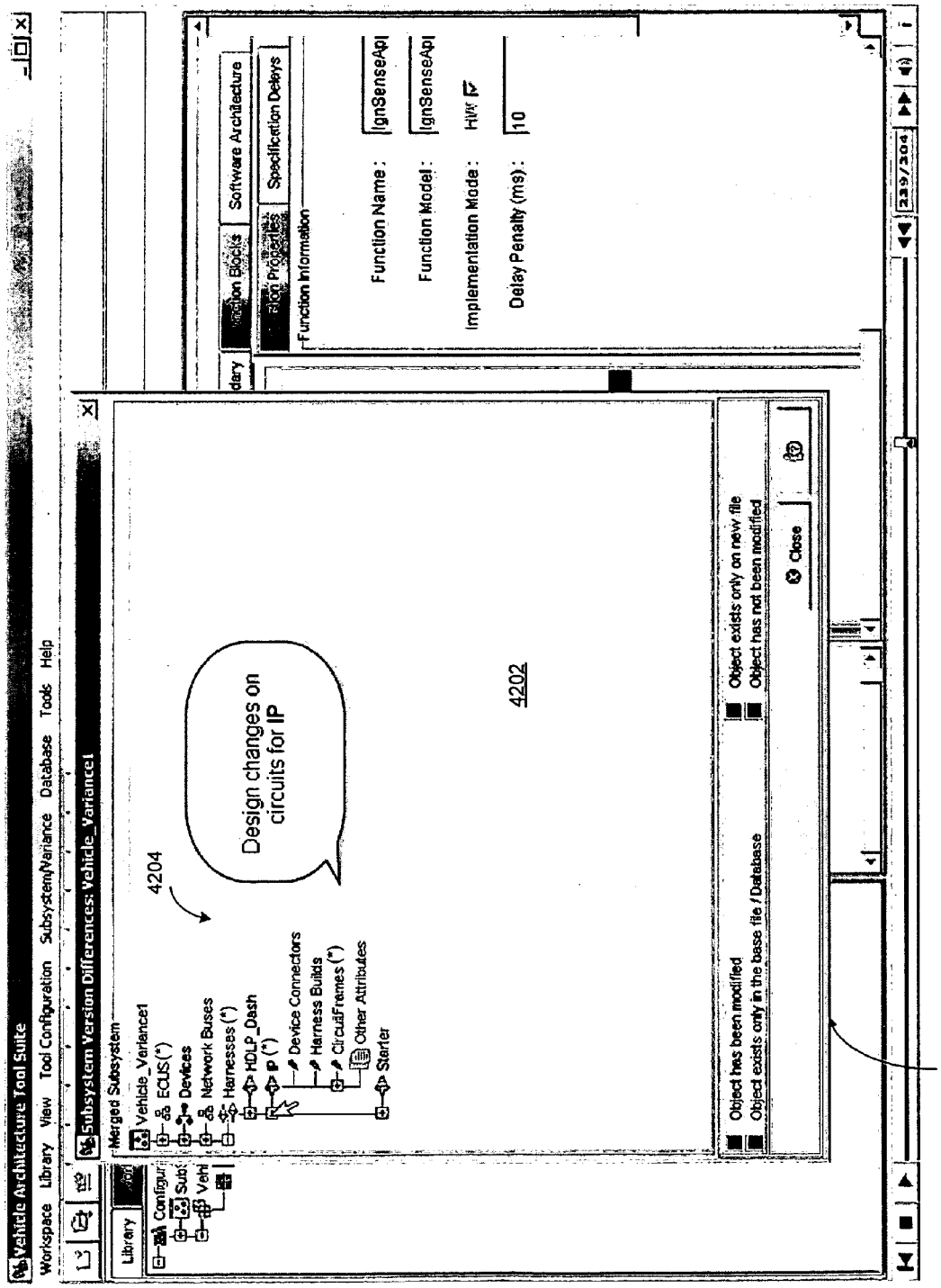
Figure 43:
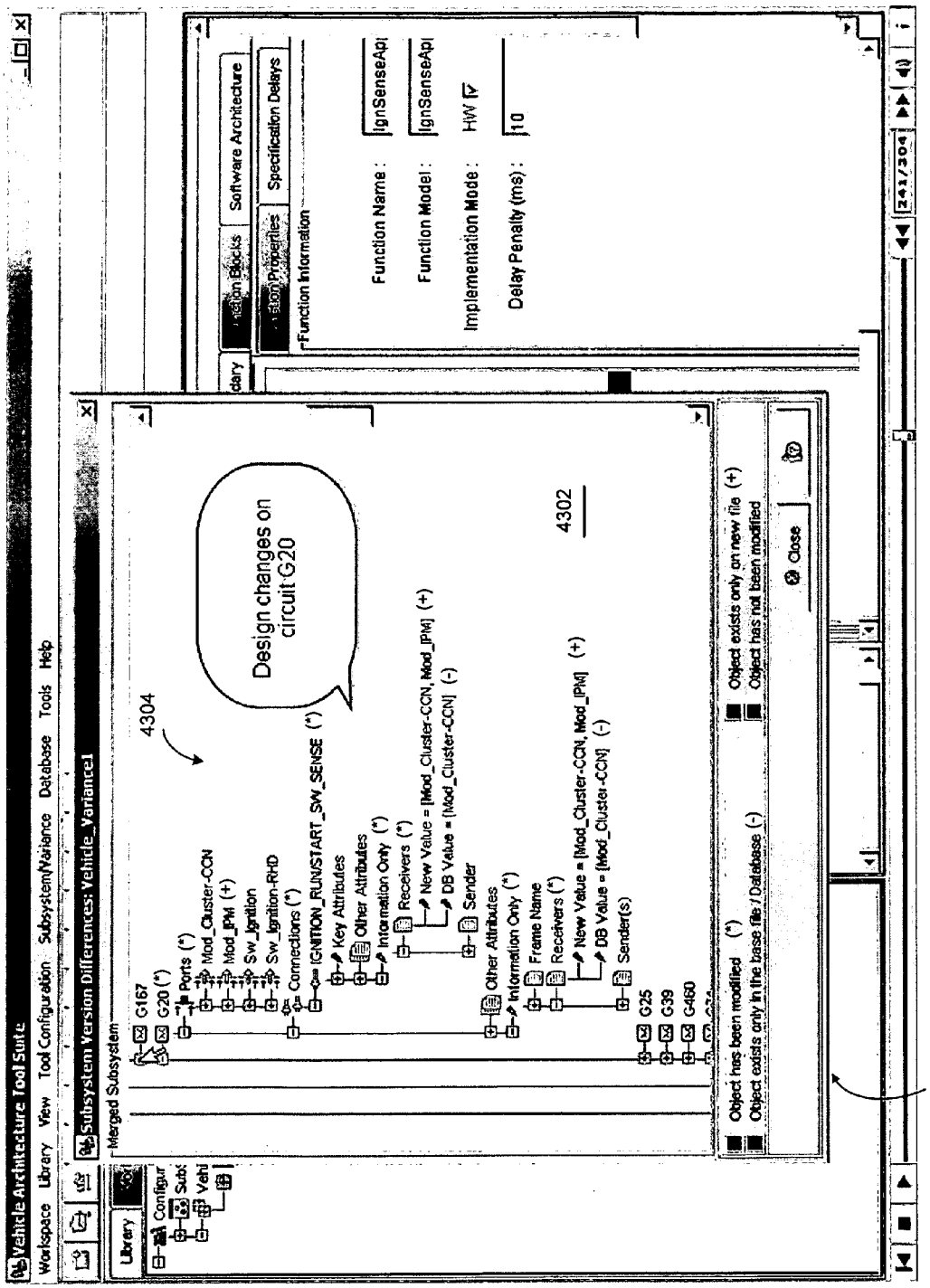

FIG. 41 is an example GUI 4100 provided by the domain agent in response to the user's selection of the "Mod_IPM" ECU from the hierarchical list 4004 of GUI 4000 of FIG. 40. The GUI 4100 includes a list pane 4102 that illustrates an expanded list 4104 for the attributes associated with the "Mod_IPM" ECU and an impact legend 4106 depicting how the various impact statuses are indicated. As illustrated in FIG. 41, the "connected mediums" (i.e., harnesses and network buses), the ECU boundary, and the schedulers for the "Mod_IPM" ECU have been impacted by the modifications to the E/E architecture. In particular, the illustrated expanded list 4104 indicates though the use of the "(+)" indicator that a new medium, "IP", has been connected to the "Mod_IPM" ECU. FIG. 42 is an example GUI 4200 provided by the domain agent in response to the user's selection of the IP harness from the hierarchical list 4004 in response to identifying, via the GUI 4100, that the "IP" harness has been connected to the "Mod_IPM" ECU. The GUI 4200 includes a list pane 4202 displaying an expanded hierarchical list 4204 to show the various higher-level attributes of the "IP" harness and their impact status. In the depicted example, the hierarchical list 4204 graphically depicts that the one or more circuits of the "IP" harness have been impacted by the modification via the use of the "(*)" indicator by the "Circuit-Frames" object of the hierarchical list 4204. FIG. 43 is an example GUI 4300 provided by the domain agent in response to the user's selection of the "G20" circuit of the "IP" harness from the hierarchical list 4204 in response to identifying the "IP harness has been impacted by the modifications to the E/E architecture. The GUI 4300 includes a list pane 4302 that displays an expanded hierarchical list 4304 of the attributes of the "IP" harness, including an expanded hierarchical list for the "G20" circuit of the "IP" harness. As illustrated by the list 4304, the "receivers" attribute of the "IGNITION_RUN/START_SW_SENSE" signal transmitted via the "G20" circuit has been modified, whereby the original receiver attribute ("DB Value=[Mod_Cluster-CCN]") has been changed (as signaled by the visual indicator "(−)") with the addition of another receiver ("New Value=[Mod_Cluster-CCN, Mod_IPM]")(as signaled by the visual indicator "(+)").

FIGS. 44-64 illustrate example techniques for GUI-based E/E architecture complexity management in accordance with at least one embodiment of the present disclosure. In at least one embodiment, the techniques described below are implemented by the vehicle harness agent 210 (FIG. 2) or other domain agent based on an E/E architecture designed for a vehicle platform using the techniques described above.

Vehicle manufacturers often provide a number of different configurations for any given vehicle platform. The different configurations can include, for example, different configurations for different world markets, different configuration levels (e.g., "base", "sport", "limited"), and combinations thereof. The vehicle manufacture further may offer any number of features for a vehicle platform, where some features may be standard for some vehicle configurations, optional for other vehicle configurations, and unavailable for yet other vehicle configurations. While the availability of multiple configurations and a wide array of features allows a consumer or business to order a vehicle to suit a particular need, the sheer number of possible combinations of configurations and orderable features results in substantial complexity in the design of the harnesses used to connect the electrical and electronic components used to implement the various features. In the conventional harness design process, harness designers maintain a spreadsheet of the various vehicle configurations and orderable features for a given vehicle platform, and from this spreadsheet the harness designers attempt to custom design a harness for each possible permutation of the configurations and orderable features. This approach can result in excessive cost as a custom harness may be designed and manufactured for a particular vehicle build that has few or no sales. Further, this approach makes it difficult for the harness designers to quickly evaluate whether costs could be reduced by combining various harness designs so that one harness can be implemented in a number of different vehicle configurations. Moreover, the harness designers may overlook a particular permutation and this oversight may only be discovered on the factory floor as a vehicle ordered with the particular permutation is being built but no harness is available for the particular permutation, thereby requiring the harness designers to rapidly design a harness and arrange for its manufacture and shipment to the factory in an effort to reduce the impact of the unavailable harness design on the manufacture flow of the factory.

One aspect of the example complexity management techniques described herein is to facilitate verification that the identified harness builds cover all orderable combinations of a vehicle, which is accomplished by reading the product planning data and device data, mapping the devices to the sales code features in the product plan and comprehending the aspects of the product planning, including thee variety of options (set of features combined) available to the customers in the different market segments the vehicle is sold (e.g., the U.S., Canada, Mexico, Europe, South America, etc.).

The harness domain agent takes all of the device information associated with the VVDs and reads the harness partitioning information from the DEF files, via a GUI, or both, and enables the user to partition the harness family. Further, the GUI enables the wiring engineer to define the in-line architecture showing the inter-connectivity between harness families and to allocate the required features/devices associated with each harness family. The domain agent then computes the connection patterns for each VVD and compares each VVD connection pattern with every other pattern and combines similar connection patterns to derive the first set of "maximum complexity" harnesses for that family of harnesses. This set of builds are with minimum if any give-aways but still supporting all the VVDs.

It often is not practical from a cost perspective for a vehicle manufacturer to build a significant number of harness builds for a harness family. Rather, a vehicle manufacture typically will pick a target number of harness builds that is acceptable for each harness family based on past experience. To illustrate, for a body harness family, the maximum complexity for harness builds in this family harness could be 1200 unique harness builds, whereas the vehicle manufacturer may have a target of no more than 70 builds for production. The complexity management techniques described herein enable designers to take the identified maximum complexity builds and through GUI-facilitated give-away analysis and cost number, try to reduce the number of builds to the target number in an iterative and intelligent manner while ensuring that all VVDs are covered.

Figure 44:
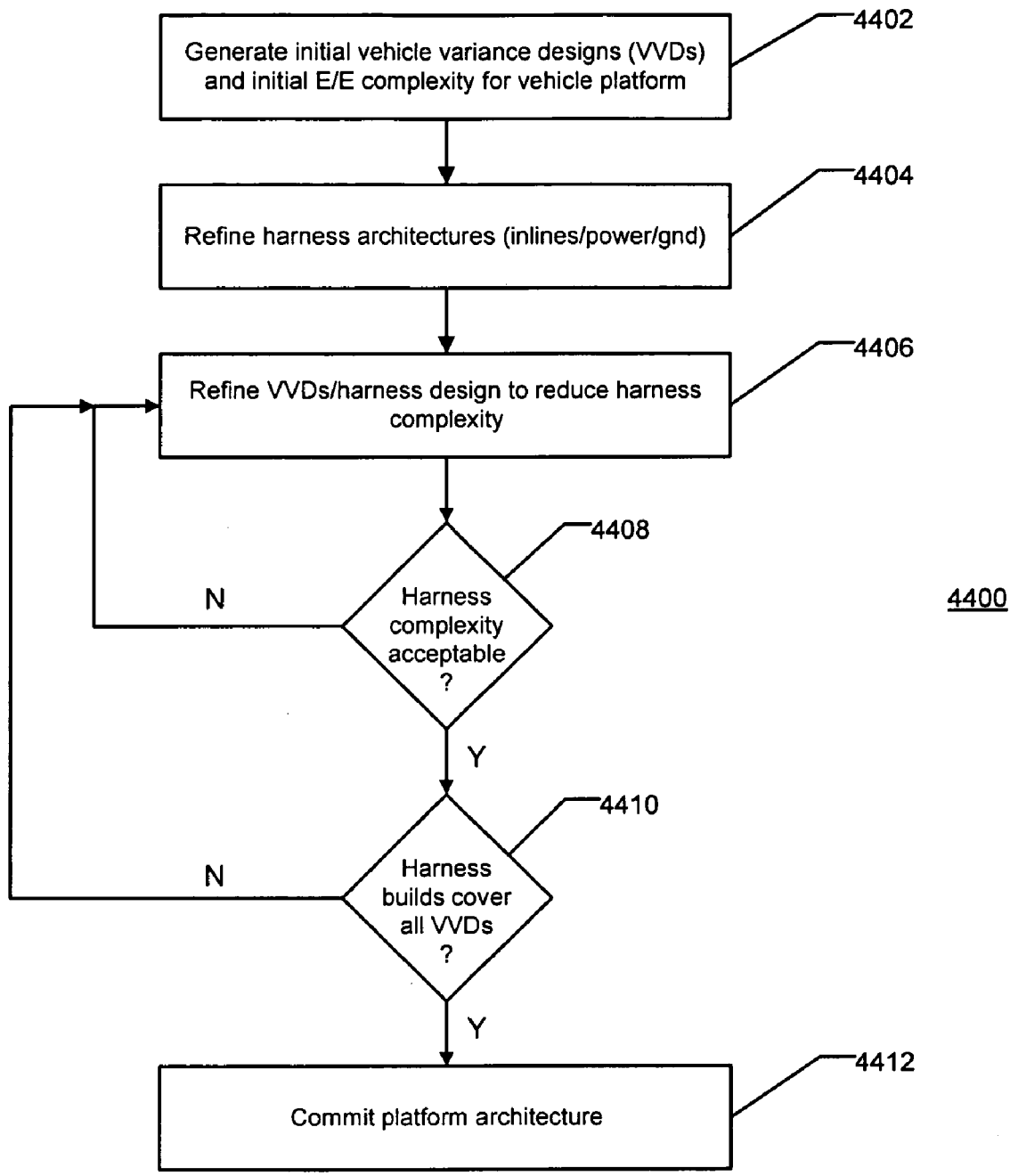
FIG. 44 is a flow diagram illustrating a vehicle architecture complexity management process in accordance with at least one embodiment of the present invention.

FIG. 44 illustrates an example method 4400 for vehicle architecture complexity management. At block 4402, the domain agent utilizes the E/E architecture designed for a vehicle platform and the product planning information to determine the initial vehicle variance designs (VVDs) and initial E/E complexity for the vehicle platform, whereby each vehicle variance design represents a unique orderable vehicle. The VVDs for a vehicle platform represents every permissible permutation of vehicle base configuration (also referred to as the "vehicle build" or the "body style") and selectable feature. To illustrate, assume that a vehicle platform has two vehicle base configurations, CONFIG1 and CONFIG2, and there are two separate optional features A and B (each corresponding to a different sales code), each of which can be implemented in either vehicle base configuration and which are not mutually exclusive options. As illustrated by Table 1, in this example there are four (4) VVDs for each vehicle base configuration, and thus eight (8) VVDs total for the vehicle platform. Table 1 also illustrates the nomenclature whereby each VVD is uniquely identified by a descriptor that combines its vehicle base configuration "bas26configuration" with each of the features of the VVD (separated by a "%"). To illustrate, the VVD descriptor "bas26configuration%X%Y" represents a VVD of the base configuration "bas26configuration" with features X and Y.

TABLE 1

EXAMPLE VVDs

| VVD | Combination | VVD Descriptor |
| --- | --- | --- |
| 1 | CONFIG1 with no options | CONFIG1 |
| 2 | CONFIG1 with option A | CONFIG1 % A |
| 3 | CONFIG1 with option B | CONFIG1 % B |
| 4 | CONFIG1 with options A and B | CONFIG1 % A % B |
| 5 | CONFIG2 with no options | CONFIG2 |
| 6 | CONFIG2 with option A | CONFIG2 % A |
| 7 | CONFIG2 with option B | CONFIG2 % B |
| 8 | CONFIG2 with options A and B | CONFIG2 % A % B |

Figure 45:
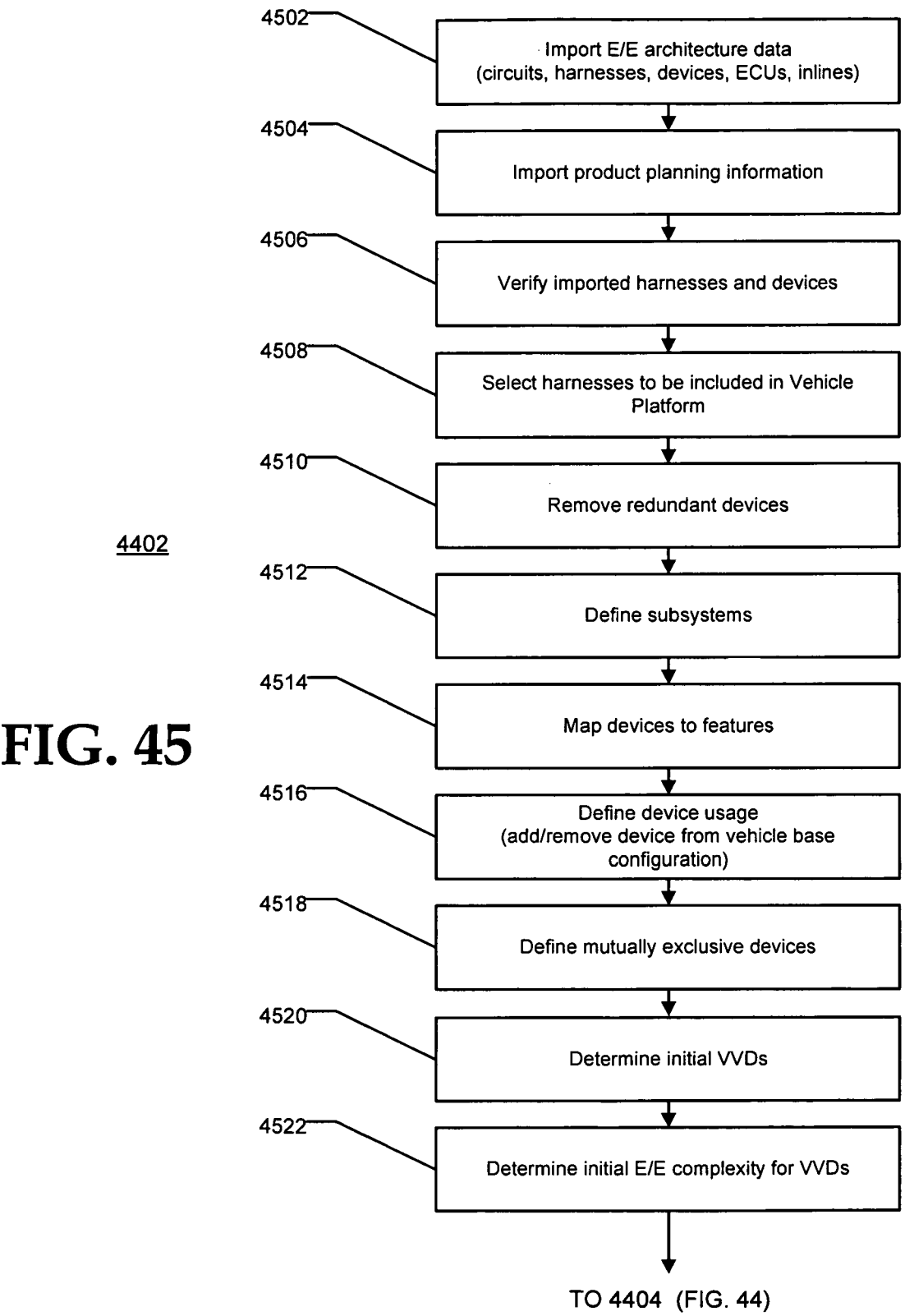
FIG. 45 is a flow diagram illustrating an initial vehicle variance definition (VVD)/complexity determination process of the process of FIG. 44 in accordance with at least one embodiment of the present invention.
Figure 54:
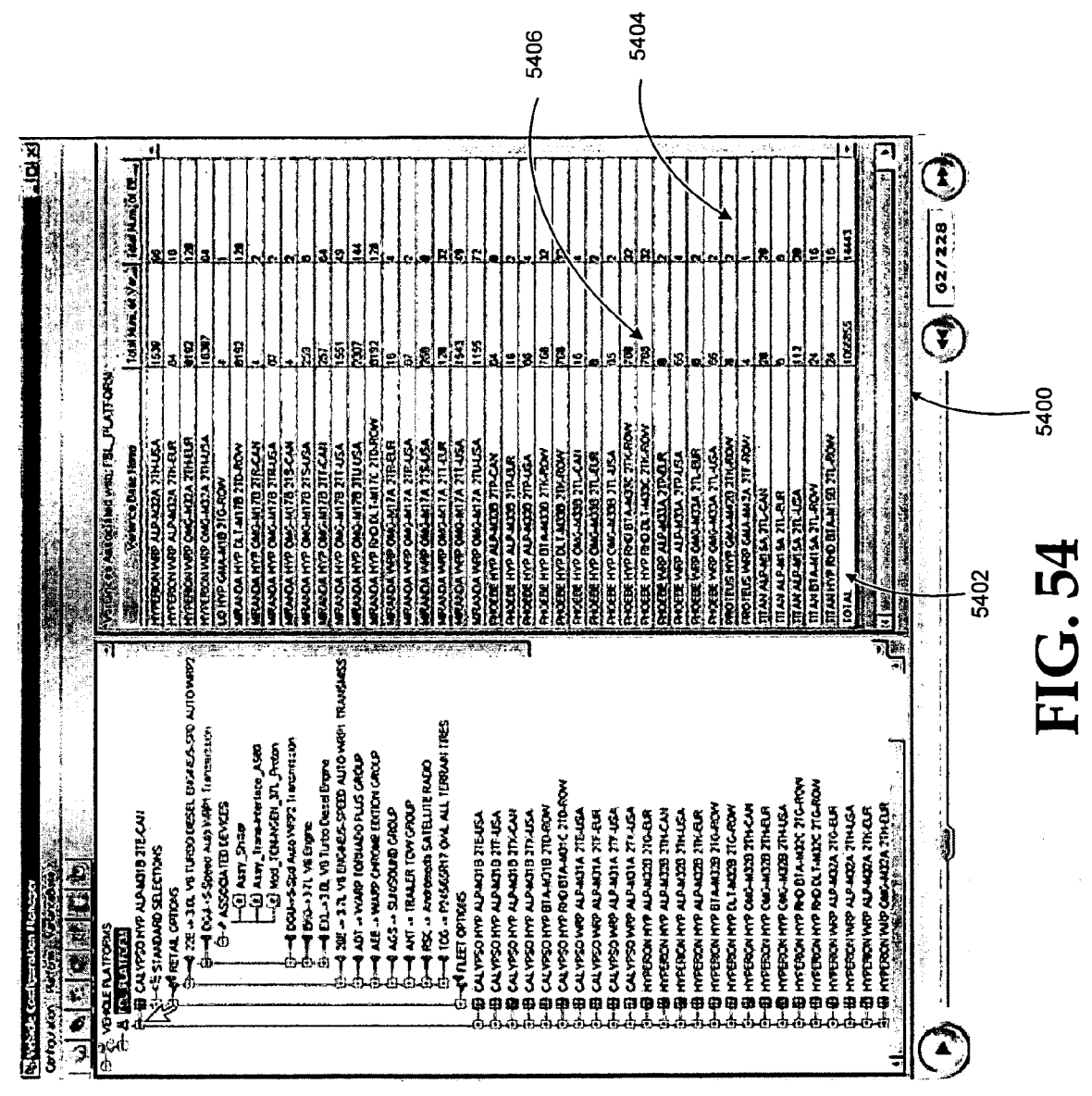

The E/E complexity for the vehicle platform represents the number of permissible permutations of the electronic/electronic components of all VVDs of a vehicle platform. The process of block 4402 is described in greater detail below with reference to FIG. 45 and FIG. 54 illustrates an example GUI for displaying the VVDs and E/E complexity for a vehicle platform.

After the determination of the initial VVDs and the E/E complexity for the E/E architecture of the vehicle platform, at block 4404 the designer can refine the harness architecture by configuring the inline connections between harnesses, defining the distribution of ground and power among the circuits of the harnesses, by verifying that the harness connectors are correct, and the like. The process of block 4404 is described in greater detail below with reference to FIGS. 55-59.

As discussed above, the sheer number of possible combinations of vehicle base configurations and features can result in a significant number of different harness builds, thereby driving up the harness design complexity for the vehicle platform and thus increasing the cost of implementation and the likelihood that a particular orderable vehicle will not have a harness designed for its particular combination of features.

Accordingly, at block 4406, a designer uses the domain agent to refine the harness design, the E/E architecture, and/or the VVDs to reduce the number of harness builds. After making these refinements, at block 4408 the designer uses the domain agent to determine the VVDs and the E/E complexity after modifications to the harness design, the E/E architecture, and the VVDs. If the harness complexity is acceptable, particularly in view of the costs of reducing complexity further, at block 4410 the designer uses the domain agent to verify each VVD is covered by a harness build (i.e., there is a harness build for very orderable vehicle). If not, the designer further refines one or more of the harness design, the E/E architecture, or the VVDs until each VVD is covered by a harness build for each harness family applicable to the VVD. It will be appreciated that while each VVD is to be covered by a harness build for an applicable harness family, a harness build may be used for any number of VVDs. If all VVDs are covered by a corresponding harness build for each applicable harness family, the designer can commit the platform architecture for implementation, or at least archive the platform architecture for further refinement in view of product planning changes or modifications made in other domains. The processes of blocks 4406, 4408, and 4410 are described in greater detail below with reference to FIGS. 60-64.

FIG. 45 illustrates the initial VVD/complexity determination process of block 4402 of FIG. 44 in greater detail. The method of FIG. 45, in at least one embodiment, is facilitated using the GUI of the domain agent. At block 4502, the designer imports the E/E architecture data for the vehicle platform into the domain agent. As described above, this E/E architecture data describes the components of the E/E architecture (i.e., ECUs and other devices, harnesses, connectors, and network busses), their functions and tasks, their connections (e.g., wiring circuits, logical signals (in network frames)) and other relationships, and certain performance parameters. In one embodiment, the E/E architecture data is represented by a circuit database identifying all of the wiring circuits of the E/E architecture data and one or more data exchange files (DEFs) that define the various harnesses of the E/E architecture and the devices to which the harnesses are connected. A DEF can include a logical DEF that includes the device connectors, the circuit-to-pin connections, and the harnesses. A DEF alternately can include a physical DEF that includes the information of a logical DEF and additional includes splice and inline connector information.

At block 4504, the designer imports the product planning information for the vehicle platform into the domain agent. The product planning information identifies all of the particular vehicle base configurations for the vehicle platform, identifies each of the available feature sales codes and whether the corresponding feature is standard, optional, not available, part of a package, etc., for each of the identified vehicle base configurations. The product planning information further can identify those features that are mutually exclusive (i.e., are not orderable together for the same vehicle). In addition to vehicle configuration information, the product planning information can include information regarding the "take rate" for each particular vehicle base configuration, each feature, etc. The "take rate" for a vehicle base configuration or feature represents the number of vehicles predicted to be ordered with the vehicle base configuration or feature. The "take rate" can be determined based on past purchase history or based on forward-looking predictions based on polling, focus groups, or other predictive information. Moreover, in at least one embodiment, the product planning information can include cost information for implementing certain aspects of a harness build. To illustrate, the cost information can include a per-unit harness build cost, a per-circuit cost, a per-connector cost, and the like.

Figure 46:
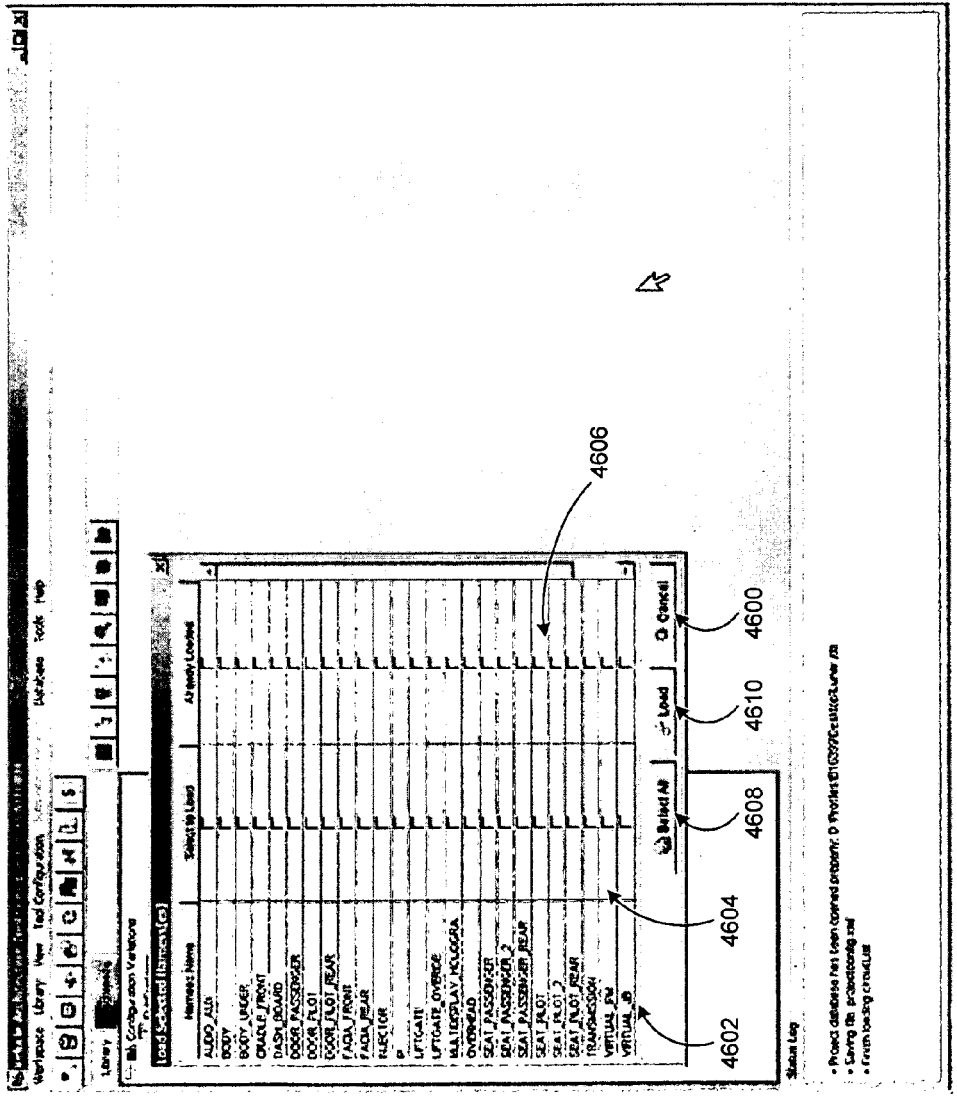

After the relevant information has been imported into the domain agent, at block 4506 the designer uses the GUI of the domain agent to select the harnesses represented in the imported E/E architecture data that are to be included in the vehicle platform. FIG. 46 is an example GUI 4600 to facilitate selection of harnesses for inclusion in a vehicle platform. The GUI 4600 displays a harness list 4602 that lists all of the harnesses. The GUI 4600 further a harness selection pane 4604 to receive user input (selection of a check box in the illustrated example) indicating which harnesses are to be included, and also included harness pane 4606 to display those harnesses that are already included. The selection of the harnesses can be facilitated using a "select all" button 4608 if all harnesses are to be included in the vehicle platform. Once the designer has selected the harness families, the designer can submit the user input indicating the selected harnesses via, e.g., a "load" button 4610.

Figure 47:
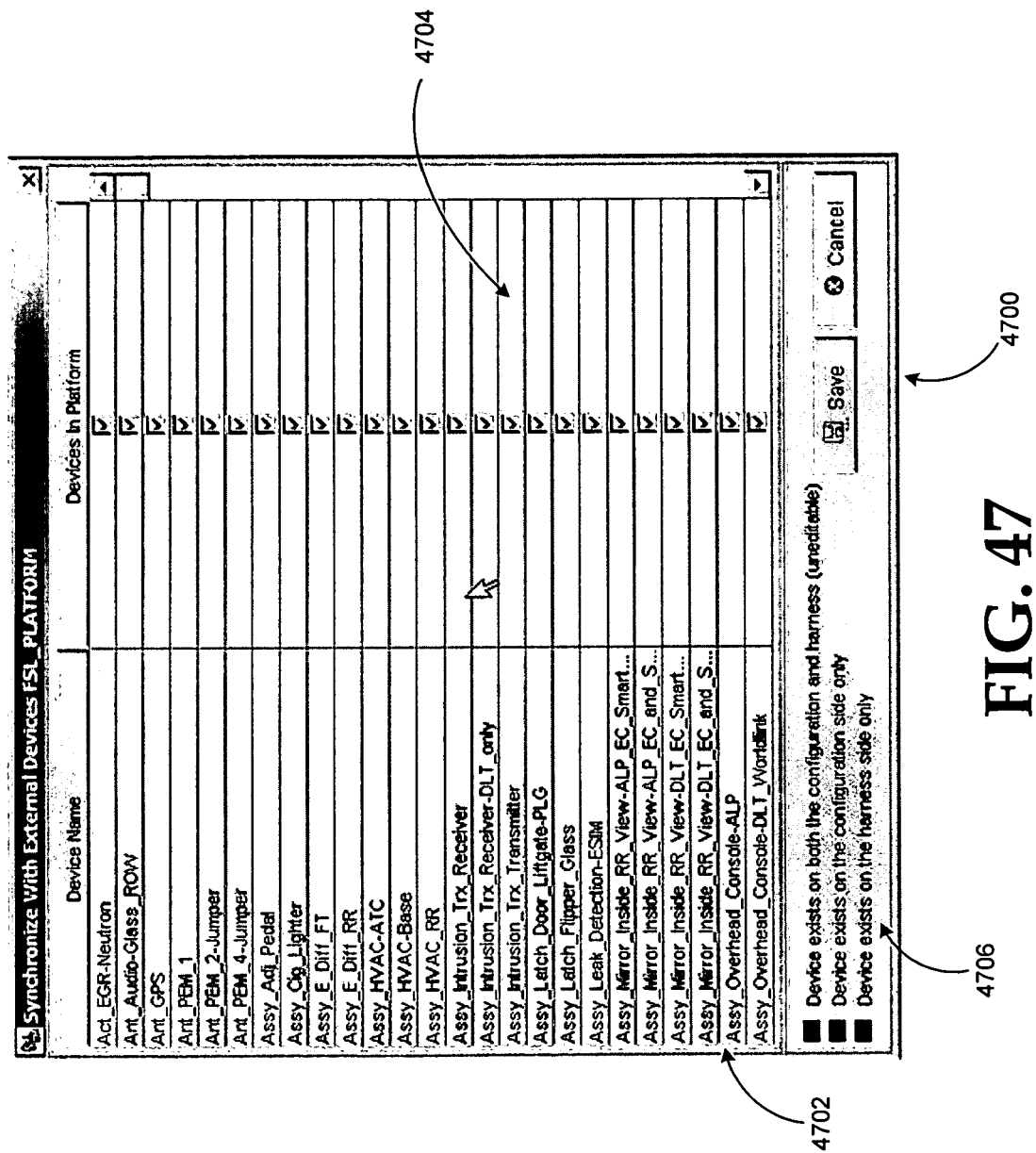

Referring again to FIG. 45, the importation of both the E/E architecture data and the product planning information can result in redundant devices (e.g., the same device has one name in the E/E architecture and a different name in the product planning information). Accordingly, at block 4508 the designer can use the domain agent to identify and remove redundant devices in a manner similar to the process described above. FIG. 47 illustrates an example GUI 4700 displaying a device list 4702 of devices in the E/E architecture. The GUI 4700 further includes a user input pane 4704 whereby the designer can select listed devices for inclusion in (or select listed devices for exclusion from) the vehicle platform. The GUI 4700 further includes a legend 4706 identifying the source of device: in the harness side only, in the configuration side only, or both.

Figure 48:
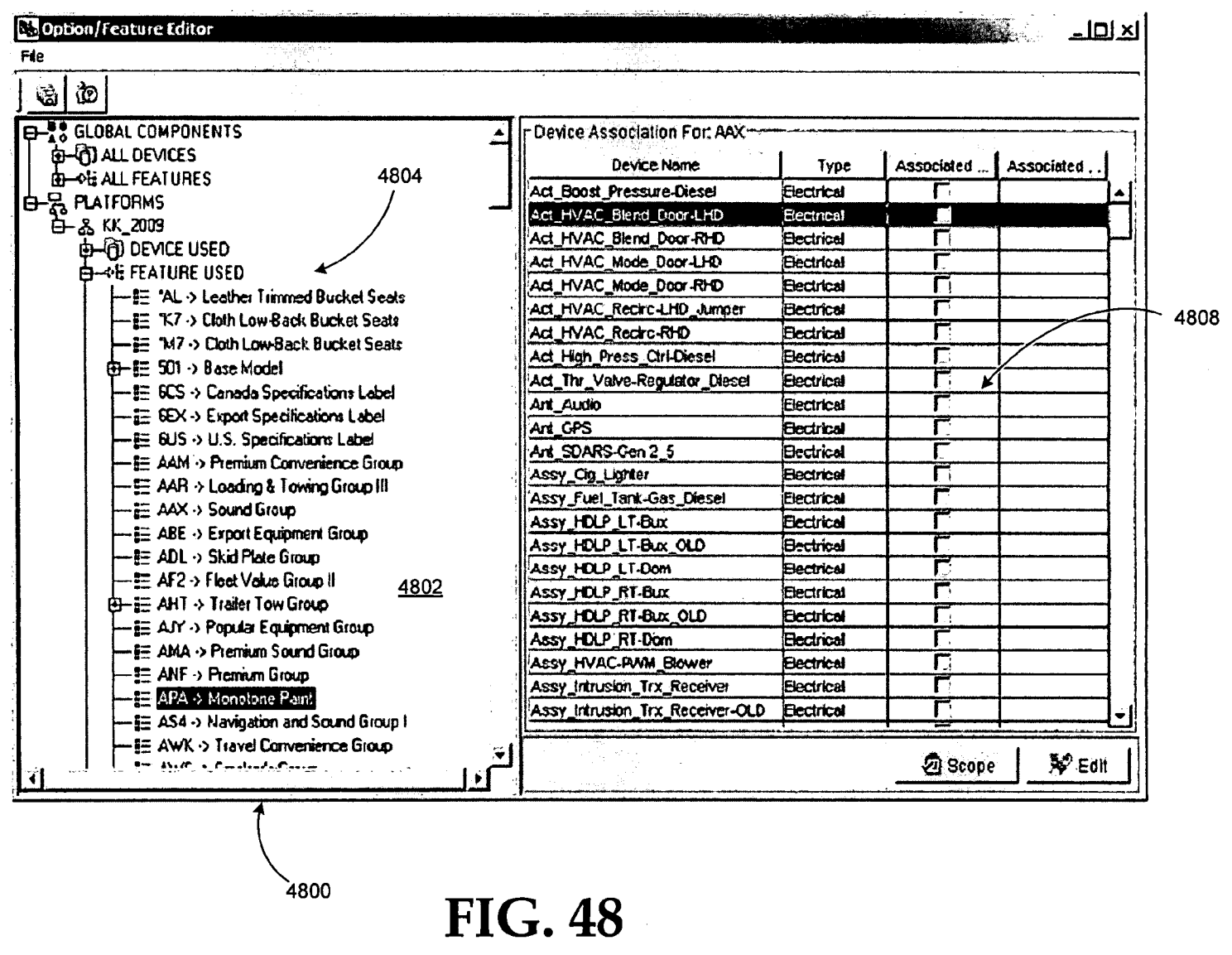

At block 4510 of FIG. 45, the designer can use the domain agent to partition the E/E architecture into one or more subsystems, if not already so partitioned in the imported E/E architecture data so as to facilitate assignment of devices to features. At block 4512, the designer uses the GUI of the domain agent to map devices of the E/E architecture to the features (sales codes) identified in the product planning information. To illustrate, if "Heated Seats" is one of the features, then the designer could associate a right seat heating element, a left seat heating element, a right heating switch, a left heating switch, a right heating fuse, and a left heating fuse with the "Heated Seats" feature. FIG. 48 is an example GUI 4800 for facilitating assignment of devices to features. In the depicted example, the GUI 4800 includes a list pane 4802 that displays an expandable 4804 of available features. Upon selection of a particular feature (feature "Sound Group" with sales code "AAX" in FIG. 48), the GUI 4800 displays a device list 4806 of all of the devices in the vehicle platform and further provides a user input pane 4808 to obtain user input from the designer indicating which devices are to be associated with the selected feature. In one embodiment, the GUI 4800 further is configured to permit the designer to filter the device list 4806 so as to only list those devices associated with one or more selected subsystems so as to limit the number of listed devices.

As the product planning information identified which features were available for which vehicle base configuration, and as devices are mapped to the various features at block 4512, the devices are automatically initially mapped to the vehicle base configurations based on features available to the vehicle base configurations. However, in certain situations, it may be advantageous to more particularly define the usage of a device by adding a device to or deleting a device from a vehicle base configuration. To illustrate, a "Premium Audio" feature may necessitate the deletion of one or more devices associated with the "Base Audio" feature. Accordingly, at block 4514, the designer can use the GUI of the domain agent to define the usage of the devices within the vehicle platform.

Figure 49:
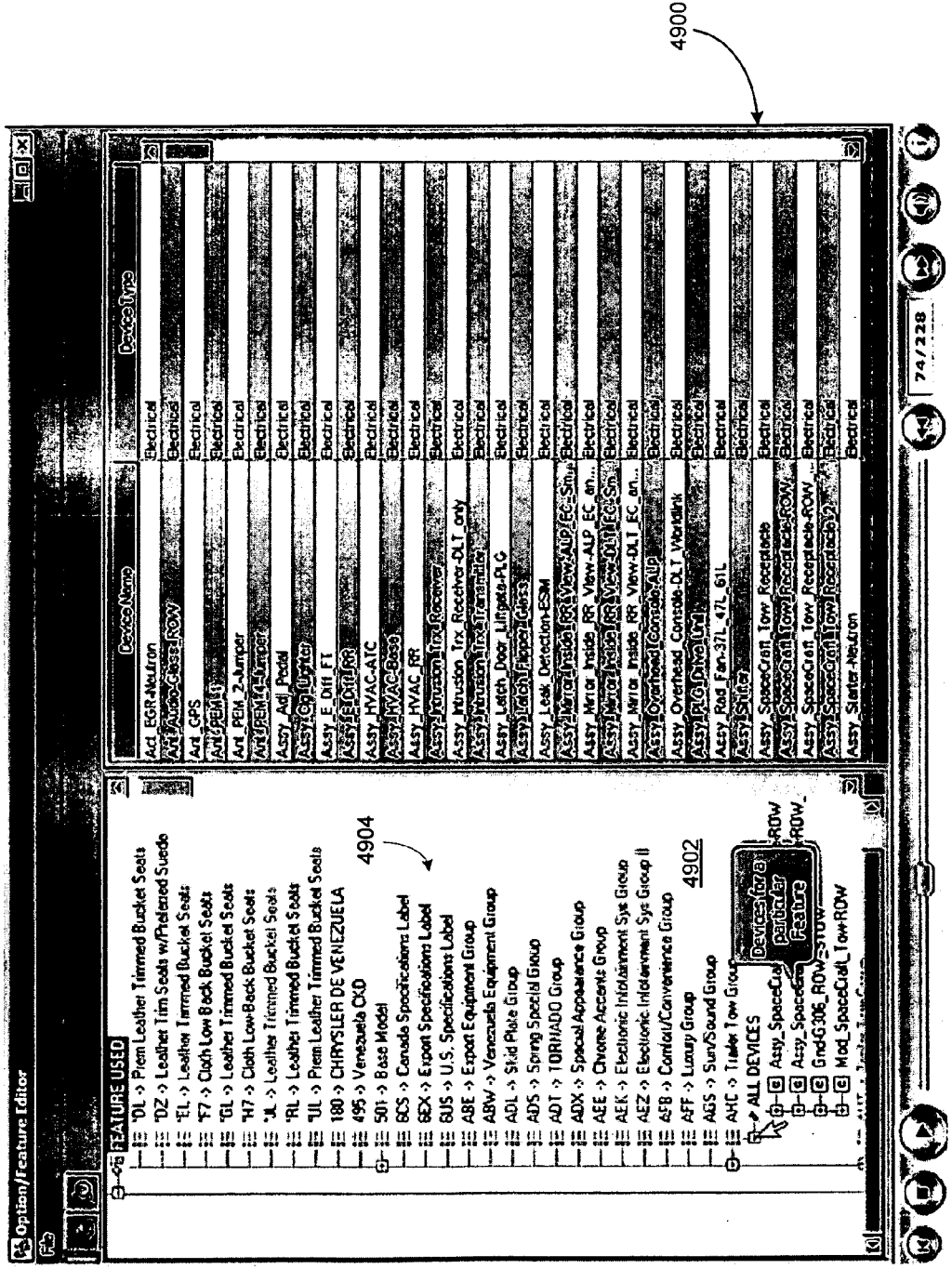
Figure 50:
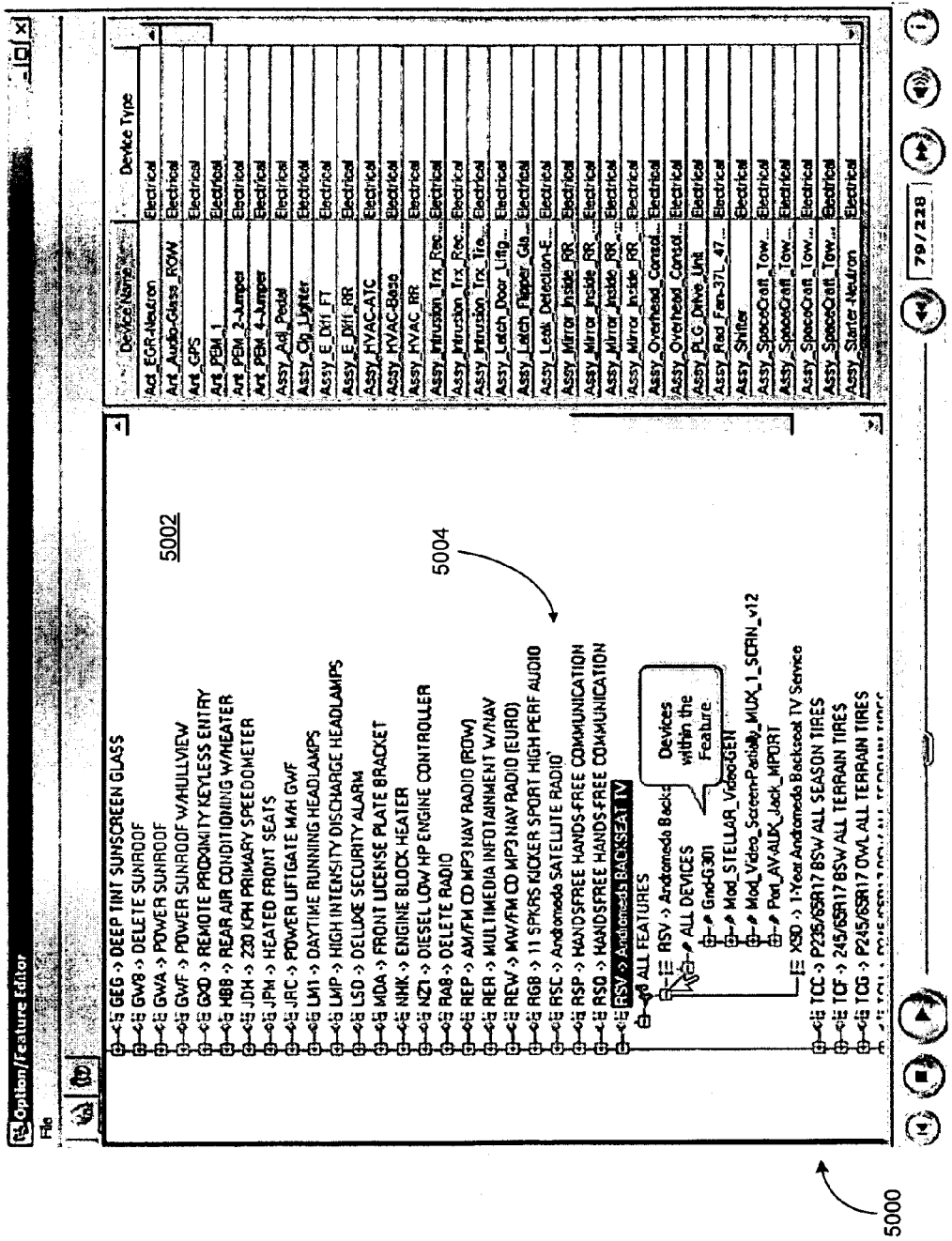

FIG. 49 is an example GUI 4900 to graphically display the relationship between devices and features. The GUI 4900 includes a list pane 4902 displaying an expandable list 4904 of the features available for a given platform. Upon selection of a particular listed feature, the list 4904 can expand to display the devices associated with the feature. Similarly, FIG. 50 is an example GUI 5000 to graphically display the options for a vehicle platform, whereby the GUI 5000 includes a list pane 5002 displaying an expandable list 5004 of options. Upon selection of a particular listed option, the list 5004 expands to display the one or more features associated with the option (e.g., if the option is a package of features) and the devices associated with each feature of the option.

Figure 51:
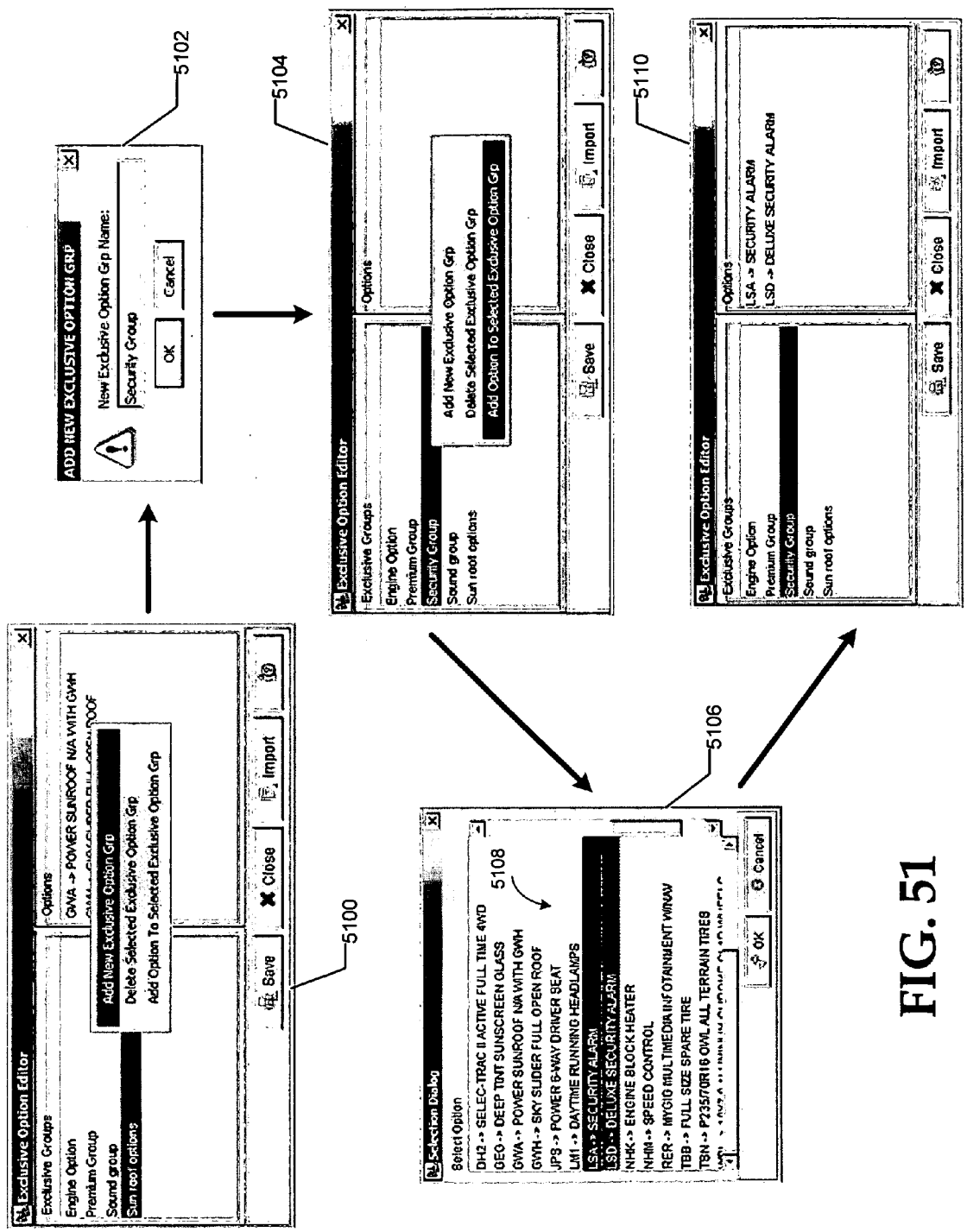

It will be appreciated that features in a vehicle platform often are mutually exclusive. To illustrate, a customer typically cannot order a vehicle having both a "base audio" feature and a "premium audio" feature as the premium audio feature often replaces devices (e.g., the receiver, the speakers, etc.) with higher-quality devices. As another example, a customer cannot order both a "six cylinder engine" feature and an "eight-cylinder engine" feature on the same vehicle. Accordingly, so that the VVDs and E/E complexity accurately reflects these impermissible feature permutations, at block 4518 the designer can use the domain agent to identify those features that are mutually exclusive, if not already identified as such in the imported product planning information. FIG. 51 is a series of GUIs illustrating an example process for identifying mutually exclusive features/options. GUI 5100 represents an editor listing various groups having mutually exclusive features or options. From the GUI 5100, the designer can initiate identification of a new group of mutually exclusive features or options. A GUI 5102 can be used to receive user input indicating the name of the new group and a GUI 5104 can be used to initiate the addition of mutually exclusive features or options to the indicated group. The GUI 5106 displays a list 5108 of features or options that can be selected by the designer for designation as being mutually exclusive. The GUI 5108 reflects the selection of the options "LSA→Security Alarm" and "LSD→Deluxe Security Alarm" as being mutually exclusive.

At block 4520 of FIG. 45, the designer identifies (via, e.g., a GUI (not shown)) a set of vehicle base configurations of the vehicle platform and the domain agent determines all of the VVDs initially available for the selected vehicle base configurations as all permitted permutations of the identified vehicle base configurations, the features and options available for each vehicle base configuration, and those features/ options that are identified as mutually exclusive.

Figure 52:
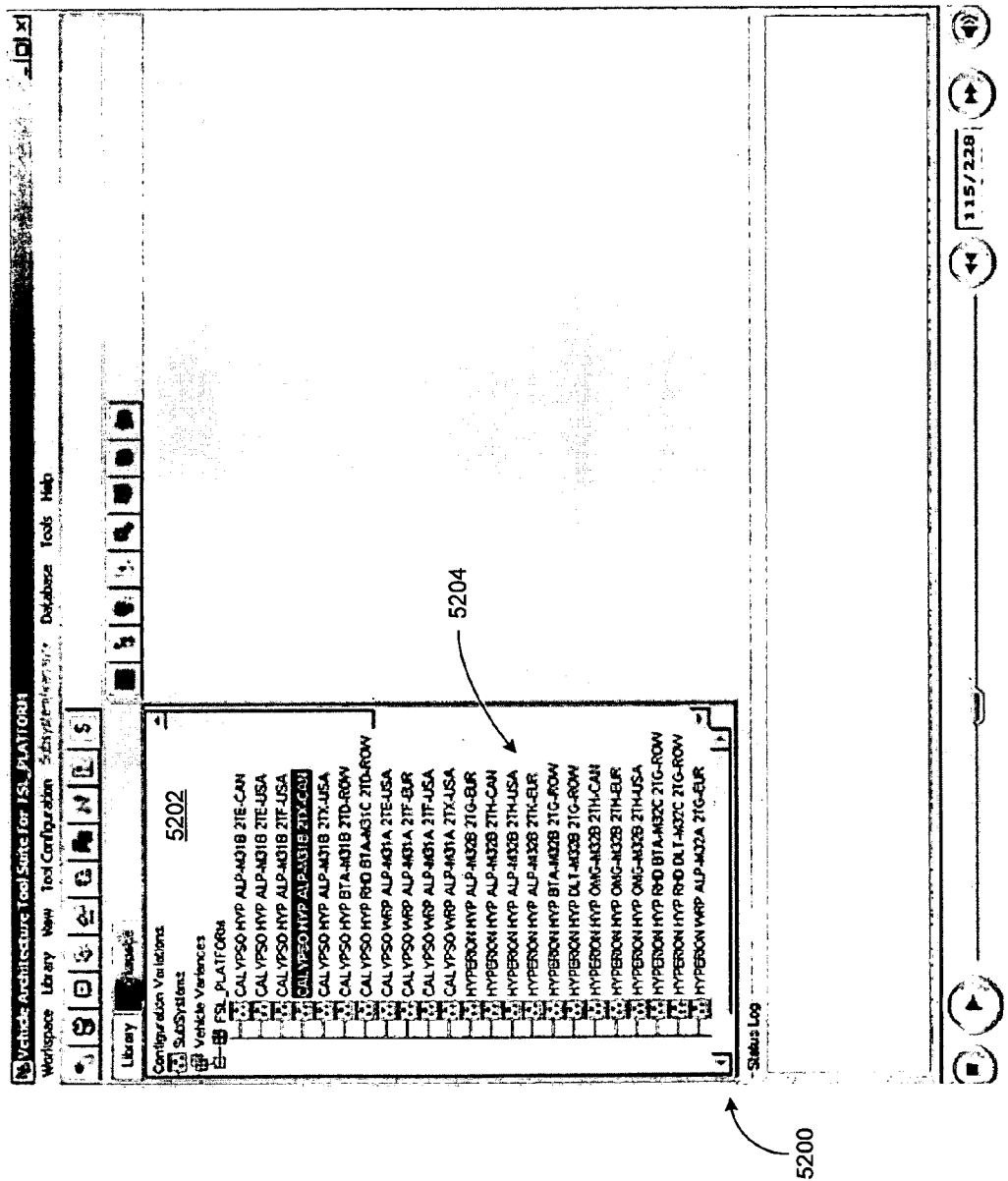
Figure 53:
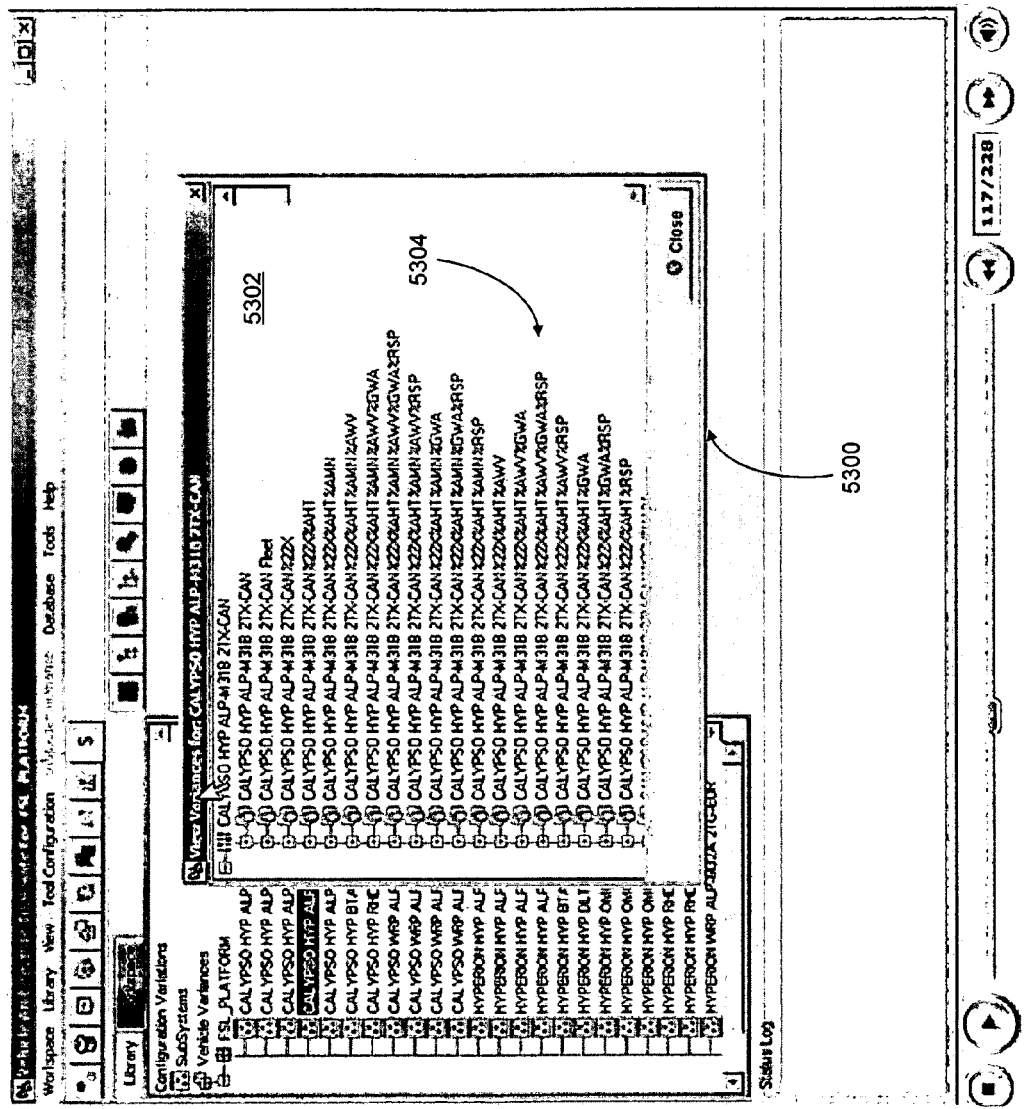

FIG. 52 is an example GUI 5200 having a list pane 5202 to display a list 5204 of vehicle base configurations for a vehicle platform "FSL_Platform". A designer can select a particular vehicle base configuration from the list 5204 to expand the list to display the standard selections, the retail options, and the fleet options for the particular vehicle base configuration, as well as the devices associated with the listed features and options. Further, a designer can select a particular vehicle base configuration from the list 5204 to initiate display of the VVDs for the selected vehicle base configuration. FIG. 53 is an example GUI 5300 having a list pane 5302 to display an expandable list 5304 of VVDs determined at block 4520 (FIG. 45) for the vehicle base configuration "CALYPSO HYP ALP-M31B 2TX-CAN".

Returning to FIG. 45, at block 4522 the domain agent determines the initial E/E complexity for the vehicle platform based on the VVDs for the vehicle platform and the devices associated with each feature incorporated in the VVDs. In at least one embodiment, the domain agent calculates the E/E complexity as the total number of E/E variations across all of the permitted VVDs calculated as the permitted permutations of vehicle base configurations, available features and options, feature/option exclusivity, and device association and usage.

FIG. 54 is an example GUI 5400 for displaying the initial E/E complexity of a vehicle platform. The GUI 5400 includes a display pane having a list 5402 of the vehicle base configurations of the vehicle platform and a list of the number of E/E variances for each vehicle base configuration, as well as a total number of E/E variances summed for all of the vehicle base configurations. Further, in the depicted example, the GUI 5400 lists the numbers of mechanical variances for the vehicle base configurations. The GUI 5400 further can be used to display the E/E complexity of the vehicle platform after further refinement.

Figure 55:
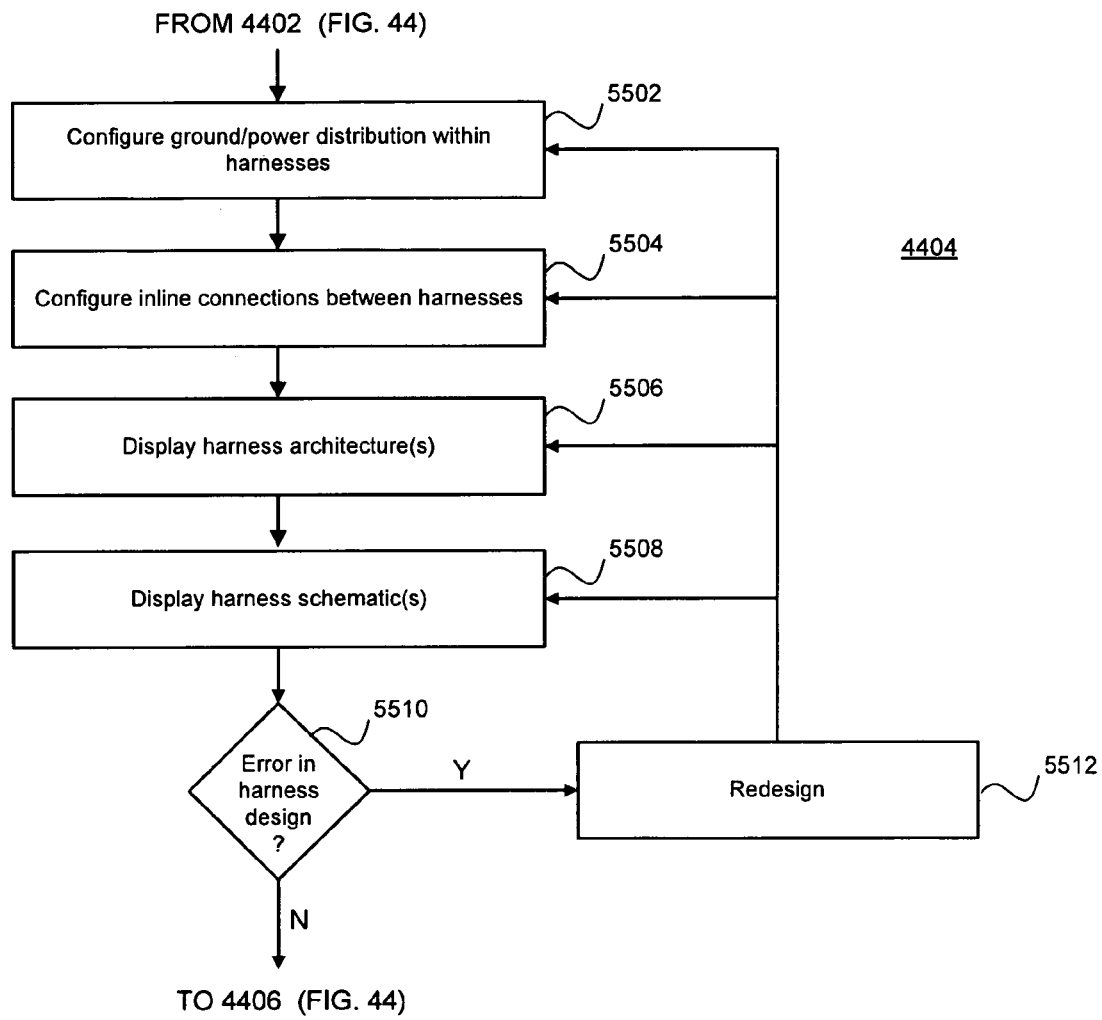
FIG. 55 is a flow diagram illustrating an example harness refinement process of the process of FIG. 44 in accordance with at least one embodiment of the present invention.
Figure 56:
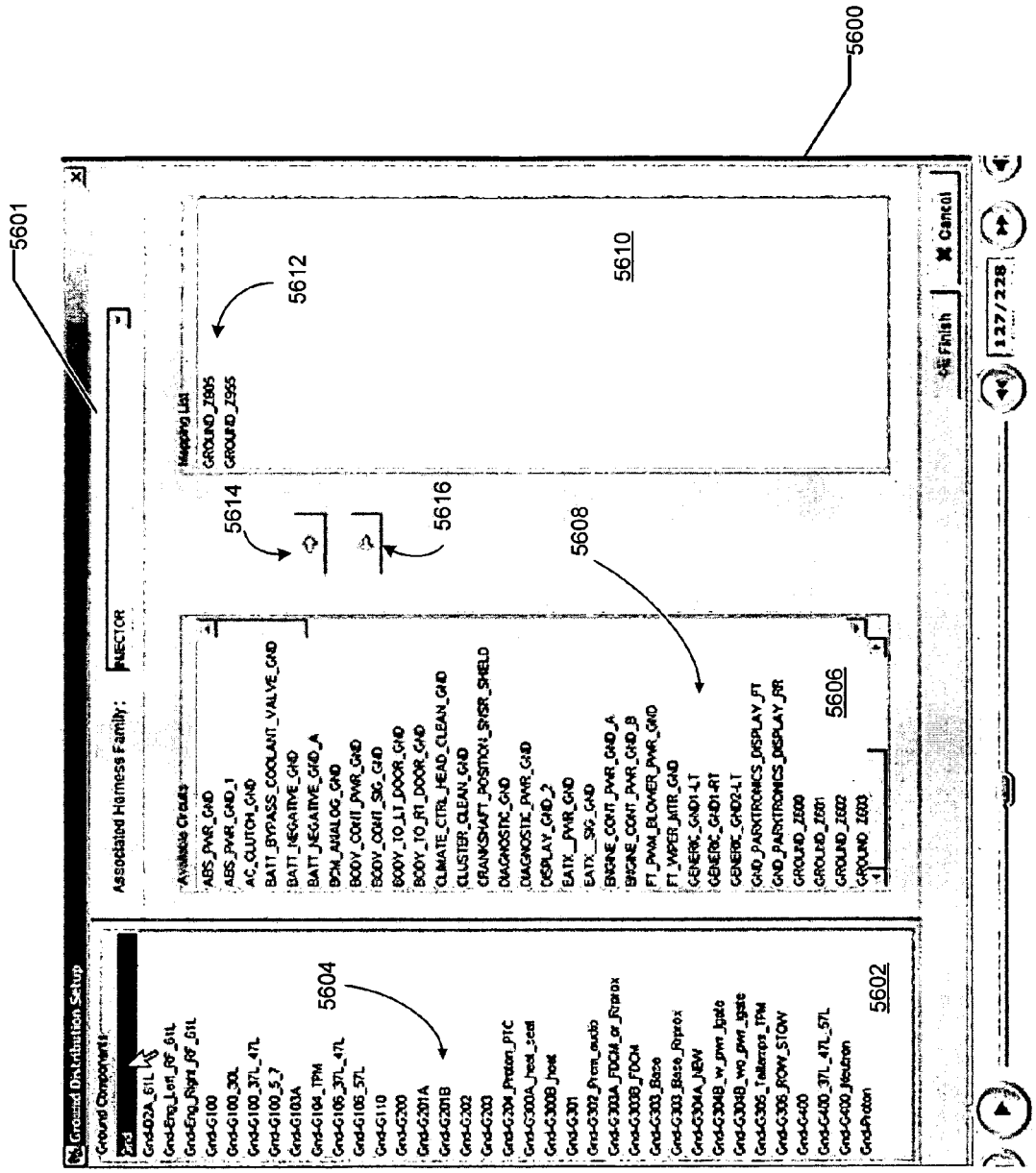
FIGS. 56-59 are diagrams illustrating example GUIs that facilitate the harness refinement process of FIG. 55 in accordance with at least one embodiment of the present invention.

FIG. 55 illustrates an example of the harness refinement process of block 4404 of FIG. 44 in greater detail. The imported E/E architecture data and the product planning data may not fully describe certain aspects of the harness configuration of the E/E architecture, such as how the power and ground references are distributed through the harnesses, how different harnesses connect to each other (i.e., how the inlines are configured). Further, it may be advantageous for the designer to visually verify that the E/E architecture related to the harness designs is correct. Accordingly, at block 5502 the designer can use the domain agent to configure the ground or power distribution with one or more harnesses. FIG. 56 is an example GUI 5600 used to facilitate this process. The GUI 5600 includes a harness selector feature 5601 (e.g., a pull-down list) to assist the designer in selecting a harness family (e.g., the "injector" harness family in the illustrated example). The GUI 5600 further includes a list pane 5602 to display a list 5604 of ground components (i.e., devices—ground posts—to which the harnesses are grounded on the vehicle via ground circuits; in other words all the grounding ties into the battery for a common ground for the vehicle). For a selected ground component from the list 5604, the GUI 5600 further includes a list pane 5606 to display a list 5608 of circuits of the selected harness family available to connect to the selected ground component and a list pane 5610 to display a list 5612 of harness circuits already associated with the selected ground component. The designer can add or remove harness circuits to the list 5612 via, e.g., an "add" button 5614 or a "remove" button 5616, respectively. A similar GUI can be used to distribute the power components within harness families.

Figure 57:
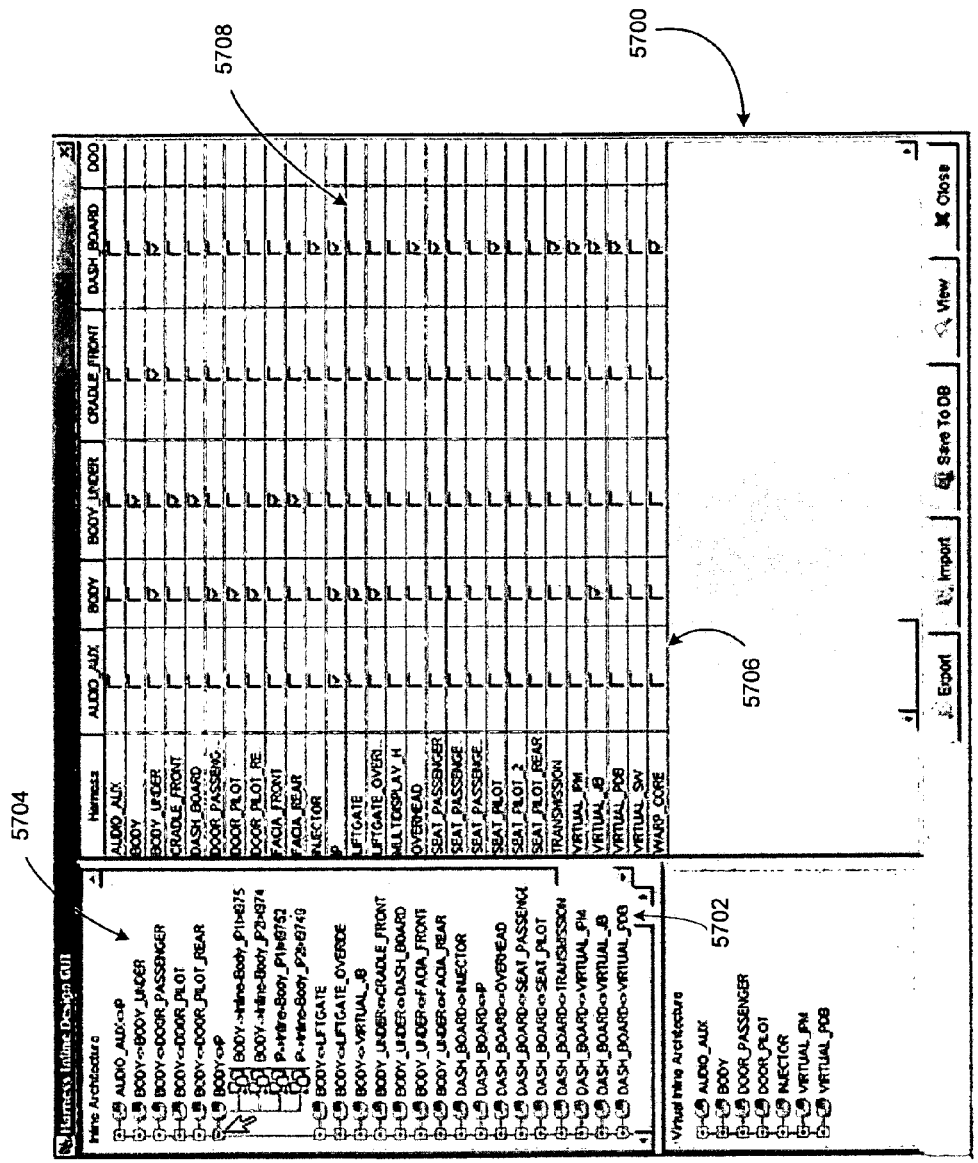

At block 5504 of FIG. 55, the designer further can use the domain agent to configure the inline connections between harnesses, where an inline connection represents a mapping of circuits and corresponding connector pins of one harness to connector pins and corresponding circuits of another harness. FIG. 57 is an example GUI 5700 that can facilitate the designation of inlines between harnesses. The GUI 5700 includes a list pane 5702 to display a list 5704 of inlines for the vehicle platform, whereby each inline uses the naming convention "harnessA<>harnessB" to indicate it is the inline connecting harness A and harness B. The list 5704 is expandable to display the particular connections within the inline. Further, the GUI 5700 includes a display pane 5706 to display a matrix 5708 of harness connections. In the depicted example, the list of harness families is scrolled both horizontally and vertically, and a connection between corresponding harnesses is indicated by a "check" in the box feature at the intersection of the two harnesses. In at least one embodiment, the domain agent determines the initial inline connections between harnesses via the E/E architecture data and populates the matrix 5608. However, the designer can use the GUI 5700 to further refine the inline configuration by adding new inlines not discernable by the domain agent from the original E/E architecture data, by removing unnecessary inlines, or by modifying existing inlines.

Figure 58:
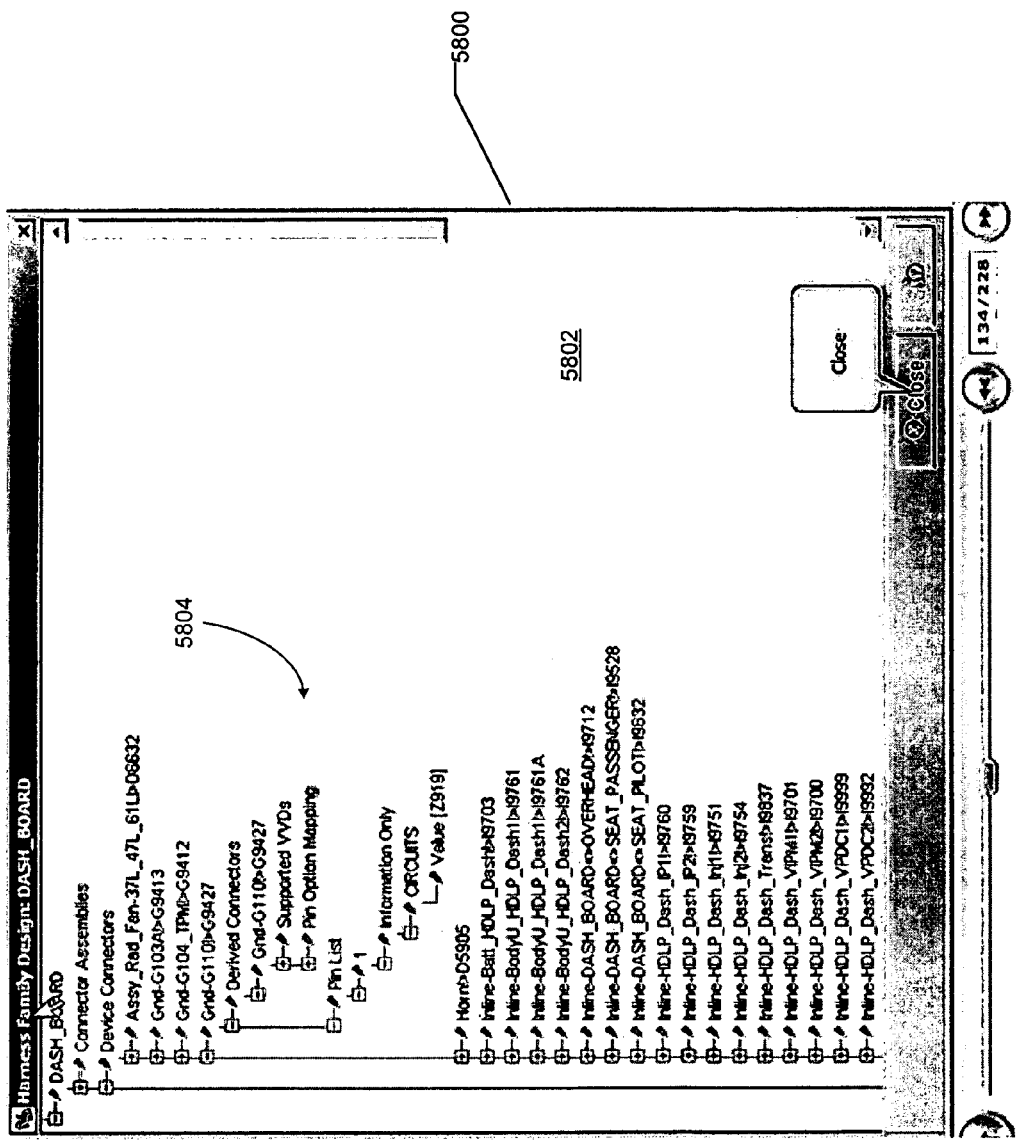
Figure 59:
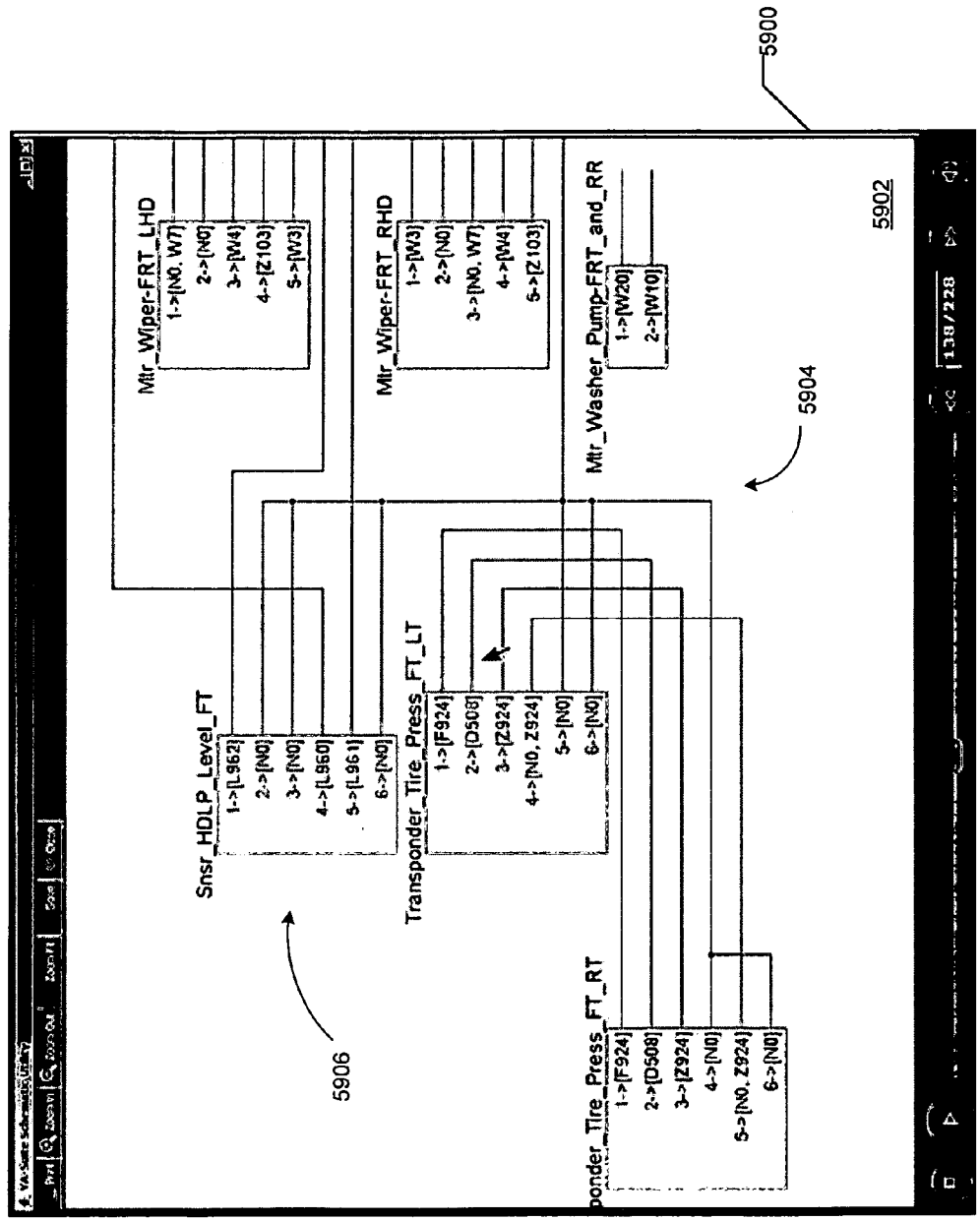
Figure 60:
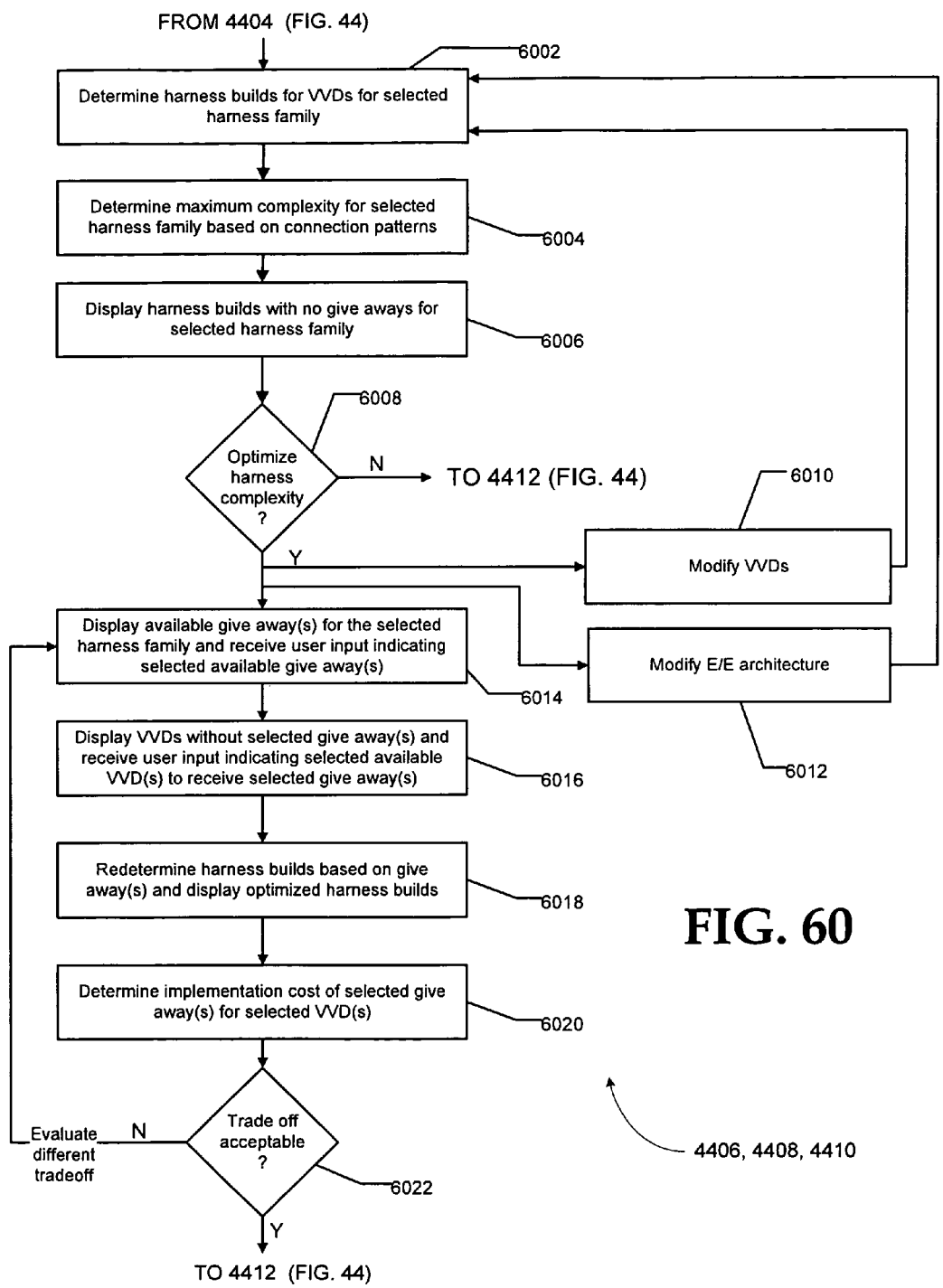
FIG. 60 is a flow diagram illustrating an example harness complexity optimization process of the process of FIG. 44 in accordance with at least one embodiment of the present invention.

Referring back to FIG. 55, at block 5506, the designer can use the domain agent to view the harness architecture in an expandable list format and at block 5508 the designer can use the domain agent to view the harness architecture in schematic format so as to verify the harness design. FIG. 58 is an example GUI 5800 having a list pane 5802 to display an expandable list 5804 of the harness design for a harness family, including connector assemblies and device connectors. For the device connectors, the list 5804 can list the mapping of signals to harness circuits and the mapping of harness circuits to connectors and pins. The list 5804 further can list the VVDs supported by a particular connector. FIG. 59 is an example GUI 5900 having a display pane 5902 to display a harness schematic 5904 of a selected harness. In the depicted example, the harness schematic 5904 depicts the device connectors of the "DASH BOARD" harness as boxes and the corresponding circuits of the harness as lines connecting terminals of the device connectors. The device connector boxes further display pin-to-circuit connector information. To illustrate, the box 5906 representing the device connector to the device "Snsr_HDLP_Level_FT" lists the mapping of harness circuits to corresponding pins of the device connector using the convention "pin#→[circuit ID]". For example, the descriptor "1→[L962]" in the box 5906 indicates that pin 1 of the device connector is connected to the circuit "L962" of the harness. The inline connectors and splices can be graphically represented in the same manner.

Returning to FIG. 55, at block 5510 the designer determines whether there are any errors in the harness design based on the visual information provided by the GUIs 5800 and 5900. To illustrate, the designer may discern from the displayed list 5804 of FIG. 58 or from the displayed harness schematic 5904 of FIG. 59 that a pin of a device connector is not connected to a corresponding circuit (i.e., the pin of the device connector is a "stub" or that a circuit of the wiring harness is connected at only one end. In such instances, the designer can use the domain agent to redesign the E/E architecture to correct the identified errors. The designer then may use verify the harness designs of the modified E/E architecture via one or more of the processes of blocks 5502, 5504, 5506, and 5508. After the designer has ascertained that no errors are readily identifiable in the harness designs, the process continues to block 4406 of FIG. 44 as described herein.

FIGS. 60-64 illustrate an example implementation of the harness complexity optimization process of blocks 4406, 4408, and 4410 of FIG. 6 in accordance with at least one embodiment of the present disclosure. Referring to the flow diagram of FIG. 60, at block 6002, a designer uses a domain agent to determine the initial harness builds for a selected harness family based on all of the VVDs for the vehicle platform and without incorporating any unused device configurations (referred to herein as "give-aways"). The number and configuration of the harness builds is determined from the applicable configurations of each of the VVDs.

At block 6004, the domain agent determines the connection patterns within each harness build identified in block 6002 to cluster harness builds based on a common connection pattern. To illustrate, assume that there are five components (components A, B, C, D, E) that can be connected within a harness family, and whereby there are eight initial harness builds in the harness family that support the eight VVDs in the example. Table 2 illustrates example connection patterns for these eight VVDs:

TABLE 2

EXAMPLE VVD/Harness Build

| VVD | Connection Pattern | Harness Build |
|---|---|---|
| 1 | A-B-C-D-E | 1 |
| 2 | A-B-D | 2 |
| 3 | A-B | 3 |
| 4 | A-B | 4 |
| 5 | C-D | 5 |
| 6 | A-B-C-D-E | 6 |
| 7 | A-B-D | 7 |
| 8 | A-B-C-D-E | 8 |

As Table 2 illustrates, harness builds 1, 6, and 8 (for VVDs 1, 6, and 8, respectively) have the same connection pattern and thus these harness builds can be collapsed into a single harness build 1A. Likewise, harness builds 2 and 7 (for VVDs 2 and 7, respectively) have the same connection pattern and thus can be collapsed into a single harness build 2A. The harness builds 3 and 4 (for VVDs 3 and 4, respectively) have the same connection pattern and thus can be collapsed into a single harness build 3A. Table 3 illustrates the resulting refined harness builds determined by the domain agent for the eight VVDs based on determining the connection patterns utilized by each VVD and then combining associated harness builds due to their overlap. This resulting set of harness builds that covers all VVDs without give-aways in the harness builds is referred to the "maximum complexity" of the harness build.

TABLE 3

EXAMPLE MAXIMUM HARNESS COMPLEXITY

| Harness Build | Connection Pattern | VVDs |
|---|---|---|
| 1A | A-B-C-D-E | 1, 6, 8 |
| 2A | A-B-D | 2, 7 |
| 3A | A-B | 3, 4 |
| 5 | C-D | 5 |

As illustrated by Table 3, by analyzing the initial harness builds for a harness family determined for all of the VVDs to determine their overlapping connection patterns and then clustering the harness builds by a common connection pattern, the number of harness builds identified to cover all eight VVDs can be reduced from eight harness builds to four harness builds.

Figure 61:
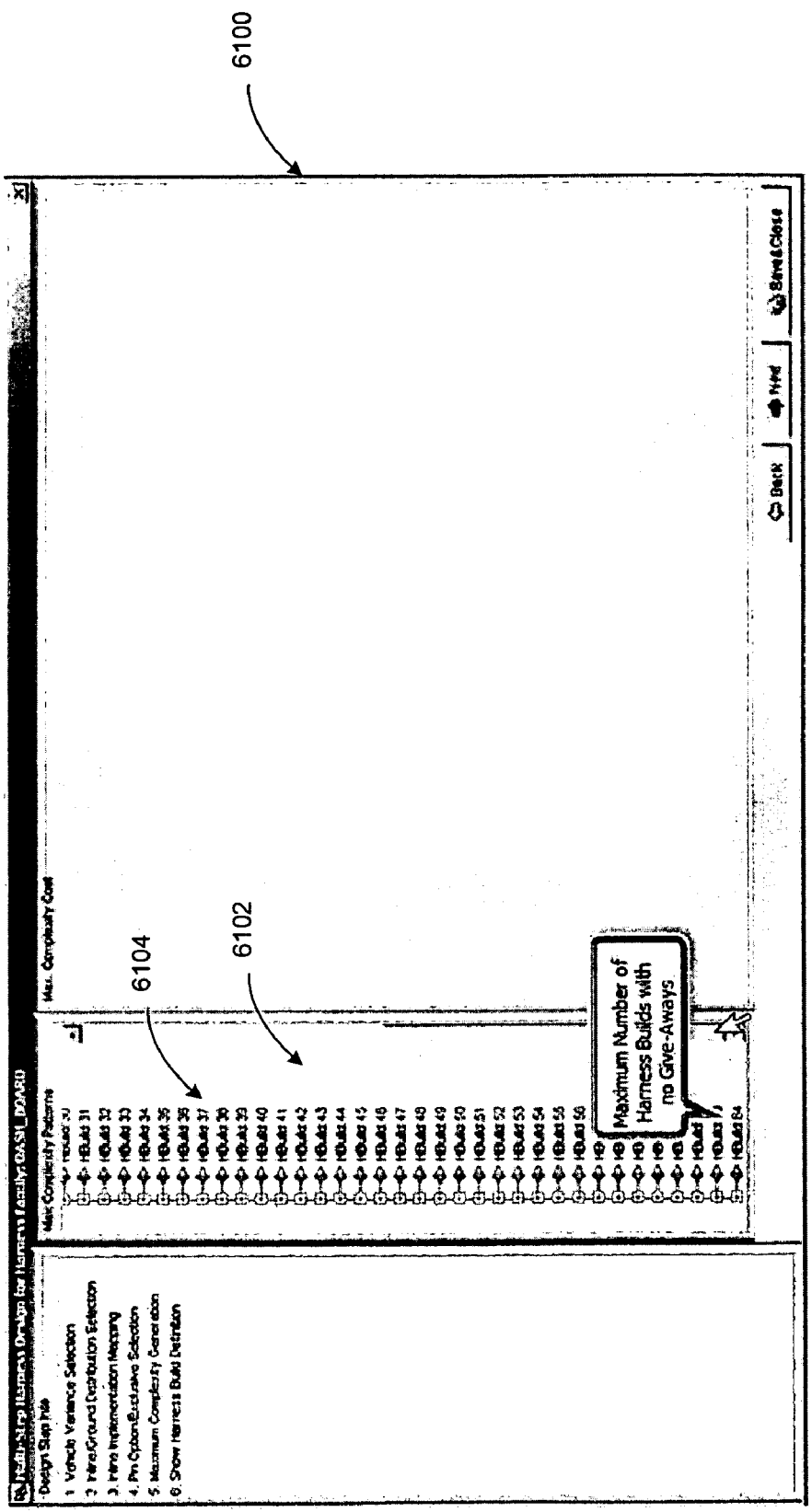
FIGS. 61-64 are diagrams illustrating example GUIs that facilitate the harness complexity optimization process of FIG. 60 in accordance with at least one embodiment of the present invention.

At block 6006, the domain agent uses a GUI to display the maximum harness complexity for the VVDs, i.e., the list of harness builds without any "give-aways" for the selected harness family, so as to allow the designer to determine the initial harness complexity for a given harness family. FIG. 61 is an example GUI 6100 having a list pane 6102 to display a harness build list 6104 of harness builds for a particular harness family. The harness build list 6104 is expandable to display a list of VVDs supported by a selected harness build. In the depicted example, sixty-four (64) harness builds for the "DAS45BOARD" harness initially are required to cover all of the VVDs of the vehicle platform.

At block 6008, the designer considers whether the indicated maximum harness complexity is acceptable. Factors in this decision can include, for example, the number of harness builds for a particular harness family, the monetary cost or time cost of fabricating each harness build, the cost of managing the number of harness builds, the cost of redesigning one or more subsystems to reduce the number of harness builds, the cost of implementing give-aways in the harness family, and the like. To illustrate, in one embodiment, the vehicle manufacture may set a predetermined maximum number of harness builds for any particular family and thus a redesign may be necessitated if this predetermined maximum is initially exceeded. For example, the manufacturer may set a maximum number of harness builds for the "DAS45BOARD" at fifty (50) harness builds, so the sixty-four initial harness builds would exceed this threshold and thus mandate a redesign in an attempt to reduce harness complexity.

A designer can take a number of approaches, or combinations thereof, in an effort to reduce harness complexity. To illustrate, at block 6010 the designer can remove or combine VVDs to reduce the total number of VVDs that need to be supported by a corresponding harness build. To illustrate, the imported product planning information may indicate that a particular vehicle base configuration may account for fewer than, for example, 1% of vehicle sales and thus it may be more cost effective to eliminate that vehicle base configuration from the vehicle platform (and thereby removing all VVDs based on the vehicle base configuration) than to redesign the E/E architecture in an effort to reduce the harness complexity arising from the vehicle base configuration. As another example, the designer may ascertain from the product planning information that a particular feature has a low take rate and thus it may be more cost effective to delete the feature from the vehicle platform and thereby reduce the number of VVDs than it would be to redesign the E/E architecture to keep the feature. In addition to, or as an alternate to, modifying the VVDs, at block 6012 the designer can modify the E/E architecture in an attempt to reduce harness complexity. To illustrate, it may be more cost effective to combine two devices into a single device with the attendant reduced wiring requirements than it would be to keep the two devices separate. As another example, the designer can attempt to reroute signaling to reduce the number of harnesses needed to conduct the signals from the signal source to the signal destination, thereby potentially reducing the wiring requirements of the harnesses and thus reducing the harness complexity. As yet another example, the designer can attempt to combine signaling from a number of harnesses into logical signaling transmitted via a network bus in an attempt to reduce harness complexity.

In addition to, or instead of, implementing changes in the VVDs and E/E architecture of the vehicle platform, the designer can investigate the trade offs of implementing one or more "give-aways" in the harness family. A "give away" is the implementation in one or more harness builds of a harness family the device connectors and wiring circuits needed to implement a particular optional feature even though that feature is not implemented in every VVD supported by the harness builds. The "give away" typically does not include the devices used to implement the feature (but a give away can include the device if it is more practical to do so). To illustrate, a digital tachometer may be an optional feature and require a device connector to the digital tachometer with two wiring circuits to carry signaling from an engine ECU to the digital tachometer via an "Engine" harness and a "dashboard" harness. Implementing the digital tachometer as a "give away" therefore would require implementation of the device connector and the two wire circuits (and corresponding inline connectors) in every harness build of the "dashboard" harness and implementation of the two write circuits (and corresponding inline connectors) in every harness build of the "engine" harness. Thus, while the cost of manufacturing each harness build for the "engine" and "dashboard" harnesses increases due to the "give away" of the digital tachometer, the number of harness builds for the "engine" and "dashboard" harnesses can be decreased as each harness build is capable of supporting the optional digital tachometer feature regardless of whether it is present in any given VVD, and thus a smaller number of harness builds is needed to support all of the VVDs.

Figure 62:
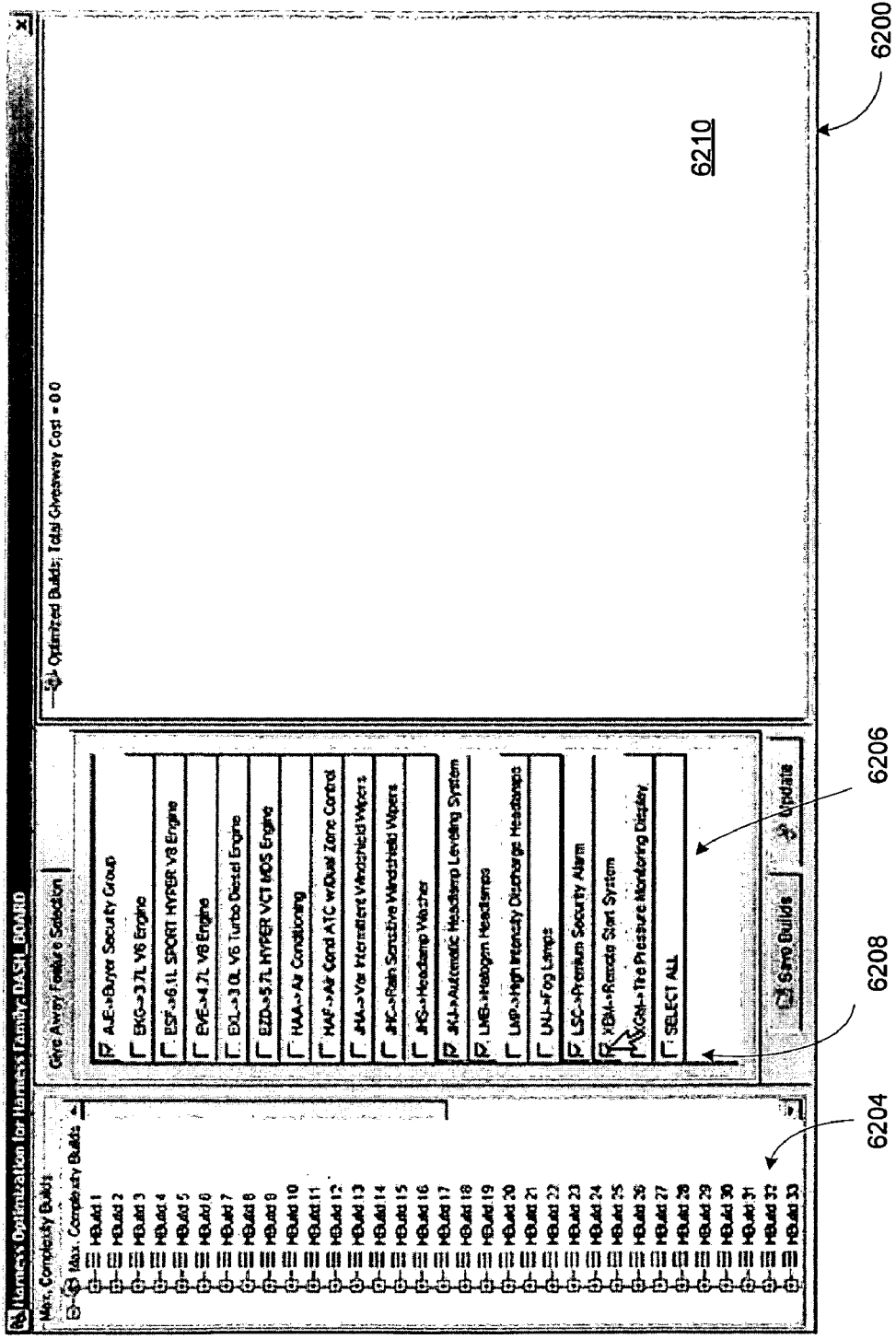

Accordingly, at block 6014 the domain agent determines the features and options available as "give-aways" for the selected harness family. In at least one embodiment, the domain agent has a knowledge of the features associated with the VVDs (e.g., it knows the devices required for the harness family based on the VVDs). For give-aways, the domain agent lists the features associated with the harness family based on the features associated with the devices connected to the harness family. The "giving away" part is then up to the designer's judgment. The give-away analysis can be done in an iterative approach whereby the designer selects a feature for give-away and then determines the cost of the give-away. The designer then determines whether the cost justifies the reduction in harness complexity. In at least one embodiment, the domain agent provides a GUI to display the "give-aways" and to receive user input from the designer that indicates which available features and options are to be implemented as "give-aways" for the harness family. FIG. 62 is an example GUI 6200 to facilitate this process. The GUI 6200 includes a list pane to display a list 6204 of harness builds, user input pane 6206 to display a list 6206 of features and options available for selection as "give-aways" and a user input feature 6208 (e.g., a check box) to receive user input indicating selection of one or more of the features or options from the list 6206. The GUI 6200 further includes a display pane 6210 to provide information regarding the "give away" cost of implementing the selected features and options as "give-aways". In the example of FIG. 62, the designer has selected the options of "Buyer Security Group", "Automatic Headlamp Leveling System", the "give-aways" have not been associated with particular VVDs, and thus the total give away cost is identified as "$0." The displayed give away cost information can include the total give away cost, a per unit cost, a per VVD cost, a per give away cost, and the like.

Figure 63:
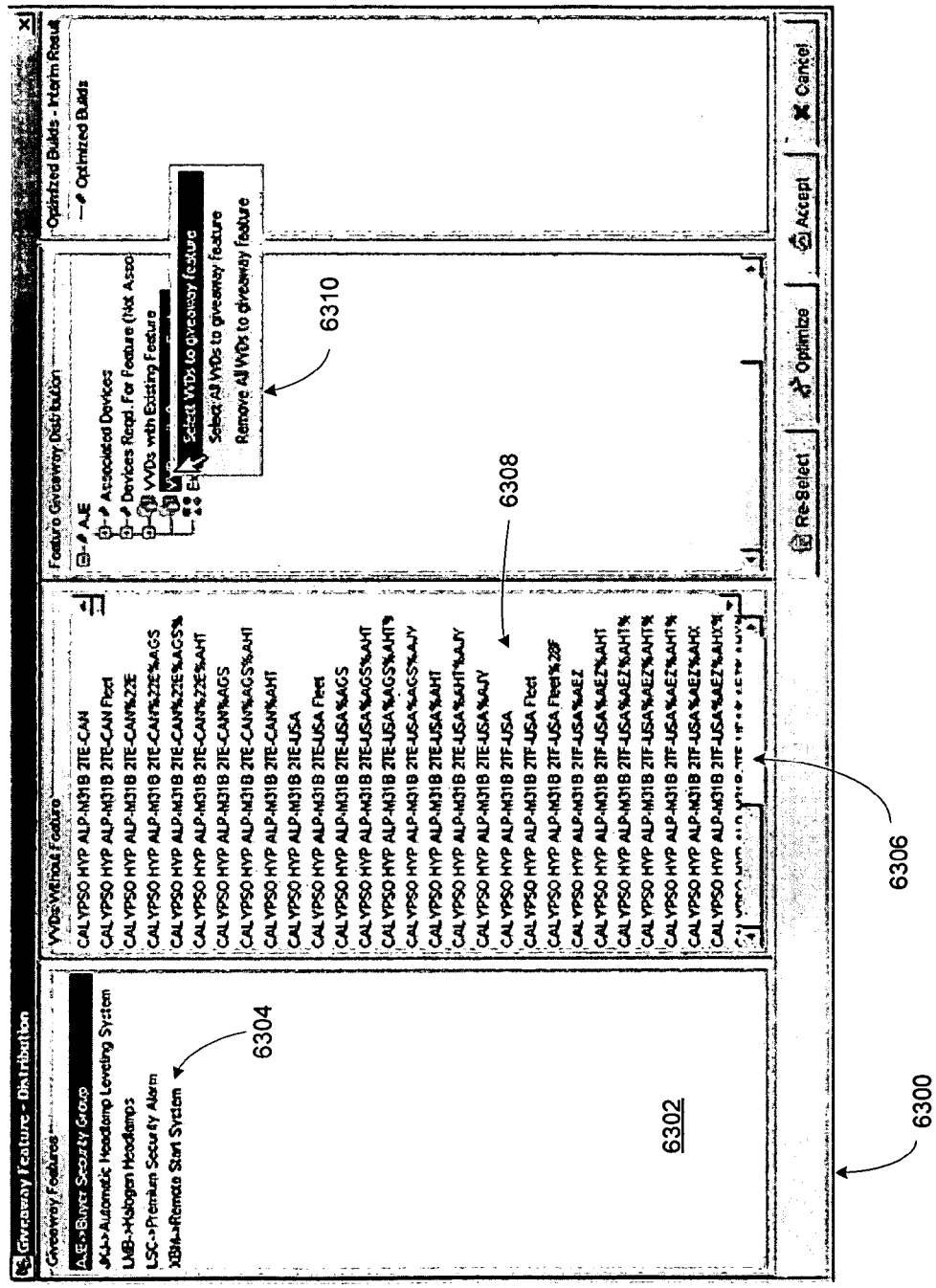

At block 6014, the domain agent displays those VVDs that do not implement the selected "give away" features and options and receives user input indicating which of those VVDs are to implement the selected features or options as "give-aways". FIG. 63 is an example GUI 6300 to facilitate the association of the selected "give-aways" with one or more VVDs of the vehicle platform. The GUI 6300 includes a list pane 6302 to display a list 6304 of the features or options selected as "give-aways" for a harness family and a list pane 6306 to display a list 6308 of VVDs that do not incorporate a features or option selected from the list 6304. The GUI 6300 further receives user input indicating which of the VVDs of the list 6308 is to implement the selected feature from list 6304 as a "give away". To illustrate, the designer can select the menu item "Select All VVDs" from a menu 6310 to associate all listed VVDs with the selected "give away" feature or option. Alternately, the designer can select the menu item "Select VVDs to give-away feature" from the menu 6310 to display another GUI (not shown) that permits the designer to individually select VVDs to implement the selected "give away" feature.

At block 6016, the domain agent uses the designer-identified "give away" features and the VVDs that are to implement the features or options as "give-aways" to redetermine the number and configuration of harness builds needed to cover all possible VVDs and displays the resulting optimized harness build list. FIG. 64 is an example GUI 6400 to display the original harness build list and the resulting optimized harness build list. The GUI 6400 includes a list pane 6402 to display the list 6204 of original harness builds without any "give-aways" and a display pane 6406 to display those features or options selected as "give-aways". The GUI 6400 further includes a list pane 6408 to display a list 6410 of the optimized harness builds resulting from implementation of the selected features or options as "give-aways." In the example of FIG. 64, the selection of the options of "Buyer Security Group", "Automatic Headlamp Leveling System", "Premium Security Alarm" and "Remote Start System" as "give-aways" for all VVDs of the platform results in a reduction in the number of harness builds to support all VVDs from the original sixty-four (64) harness builds to forty-one (41) harness builds.

At block 6018, the domain agent determines the implementation cost of the selected features or options as "give-aways" for the harness builds of the selected builds. This implementation cost can be based on any of a variety of factors. To illustrate, in one embodiment, a fixed unit cost is assigned for each "give away" feature or option (or based on different cost classes of "give away" features) and thus the direct cost of implementation is a product of the fixed unit cost and the number of vehicles likely to implement a harness build having the selected feature as a "give away" feature, rather than an actually implemented feature. To illustrate, assume, for example, there is a "give away" cost of $1 per harness to implement the "Remote Start System" feature as a "give away" and the product planning information indicates of the 100,000 vehicles expected to be sold, 90% of the vehicles sold will not implement the "Remote Start System." Thus, there is expected to be 90,000 vehicles to be sold having a harness with the "Remote Start System" at a give-away cost of $1 per vehicle, for a total give-away cost of $90,000 for implementing the "Remote Start System" feature as a give-away to reduce harness complexity. In another embodiment, the give-away cost can be more detailed, such as by breaking down the costs based on the number of connector give-aways, the number of circuit give-aways, and the cost of each connector give-away and circuit give-away (either on a fixed basis or on a class-type basis (e.g., giving a higher per unit basis to a lower gauge circuit than to a higher-gauge circuit)). The cost information can be imported from the product planning information, derived from the E/E architecture information, or supplied by a designer based on experience or some external source of information, or a combination thereof. The cost information can be displayed via a GUI provided by the domain agent (e.g., in display pane 6210 of GUI 6200 of FIG. 62).

At block 6020, the designer considers whether the reduction in the harness complexity afforded by the implementation of "give-away" features or options justifies the total "give-away" cost (i.e., whether the tradeoff between reduced harness complexity and increased production costs is acceptable). This decision can be made on any number of factors and their relative importance to the design process. To illustrate, there is considerable cost and complexity in managing a large number of harness builds, and this cost and complexity is compounded by the number of harness families present in a vehicle platform, each of them typically having a large number of harness builds. Accordingly, the total give-away cost for implementing a number of features or options as give-aways so as to significantly reduce the number of harness builds may be acceptable to the vehicle manufacturer. On the other hand, if the implementation of a particular feature as a give-away option results in a give-away cost in the millions of dollars but only results in a relatively small reduction in the number of harness builds, this tradeoff may not be acceptable to the vehicle manufacturer.

In the event that the tradeoff between reduced harness complexity and the total give-away cost is not acceptable, the designer can repeat the process of blocks 6008-6020 using a different tradeoff. To illustrate, the designer can select a different combination of features or options to be implemented as "give-aways", the designer can select a different set of VVDs to implement the selected features or options as "give-aways", and the like. Otherwise, if the tradeoff is acceptable, the designer can repeat the optimization process for other harness families of the vehicle platform. Once the harness designs have been sufficiently optimized, the flow turns to the finalization process of block 4412 of FIG. 44 as described above.

Although the complexity management process was described above in a particular context of harness complexity, it will be appreciated that this complexity approach utilizing determining common patterns to reduce the initial complexity and then further reducing complexity by identifying certain give-away features can be applied to other related areas of vehicle design. To illustrate, in at least one embodiment the complexity management process can be implemented in managing mechanical complexity in a vehicle. To illustrate, a vehicle platform may implement different rear fascia configurations based on whether the vehicle to be built includes a tow hitch, back-up sensors, one exhaust or two exhausts, parking assist, etc. The fascia designer then can determine all of the possible VVDs resulting from the different combinations of features related to the rear fascia and then investigate give-aways with respect to the rear facia to reduce the total number of rear facia builds. To illustrate, it may be advantageous to configure every facia with an opening for a tow hitch receiver so as to reduce the total number of rear facias, even though a number of VVDs may not implement a tow hitch.

The complexity management feature further can be applied to software complexity management in a vehicle platform. To illustrate, vehicle manufactures often utilize the same ECU build for different configurations of the same vehicle platform. Typically, the ECU implements a non-volatile memory that stores the code for all different configurations and the ECU can be configured to use the code for a particular configuration via, for example, a jumper connecting particular pins of the ECU. However, considerable cost is expended in this approach as the ECU requires non-volatile memory to store unused code for other configurations. To illustrate, assume that there are three possible code configurations for an ECU (e.g., one each for the U.S., European, and Japanese markets), and each configuration requires 1 MB of flash memory storage, even though there may be considerable overlap in the functionality provided by each code configuration. In this example, the ECU would need 3 MB of flash memory total to be able to store all three code configurations. However, with the ability to calculate the exact software feature content for each market using the above-described complexity management process, the vehicle manufacturer can identify only those software routines required for any given market and thus program the ECU destined for that marked with the only the required software, thereby reducing the memory requirements (e.g., to 1 MB) and hence the cost of implementing the ECU.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof

What is claimed is:

1. A computer-implemented method comprising:
    identifying a set of vehicle variance designs (VVDs) for a vehicle platform based on vehicle base configurations for the vehicle platform and features available for each vehicle base configuration;
    determining on a computer a first set of harness builds of a harness family necessary to support the set of VVDs;
    determining on the computer a first set of optional features to be implemented as give-away features in harness builds of the set of VVDs
    determining on the computer a second set of harness builds necessary to support the set of VVDs based on the first set of optional features implemented as give-away features; and
    saving the determined first set of harness builds and the second set of harness builds to one or more memory storage devices.

2. The computer-implemented method of claim 1, further comprising:
    determining on the computer a cost to implement the first set of optional features as give-away features for the vehicle platform.

3. The computer-implemented method of claim 2, wherein determining the cost to implement the first set of optional features as give-away features comprises:
    determining the cost to implement the first set of optional features as give-away features based on a per-harness cost to implement the first set of optional features as give-away features and based on a number of vehicles expected to be built without implementing the first set of optional features.

4. The computer-implemented method of claim 3, further comprising:
    determining whether to implement the first set of optional features as give-away features based on the cost to implement the first set of optional features as give-away features.

5. The computer-implemented method of claim 4, further comprising:
    in response to determining not to implement the first set of optional features as give-away features:
    determining a second set of optional features to be implemented as give-away features in the harness builds of the set of VVDs; and
    determining a third set of harness builds of the harness build necessary to support the set of VVDs based on the second set of optional features implemented as give-away features.

6. The computer-implemented method of claim 5, further comprising:
    determining a cost to implement the second set of optional features as give-away features for the vehicle platform.

7. The computer-implemented method of claim 6, further comprising:
determining whether to implement the second set of optional features as give-away features based on the cost to implement the second set of optional features as give-away features.

8. The computer-implemented method of claim 1, wherein determining the first set of harness builds comprises:
determining an initial set of harness builds, each harness build of the initial set of harness build corresponding to a corresponding VVD of the set of VVDs; and
determining the first set of harness builds based on similarities between connection patterns of the initial set of harness builds, the first set of harness builds comprising a reduced set of the initial set of harness builds.

9. The computer-implemented method of claim 1, further comprising:
displaying, via a graphical user interface (GUI), the first set of harness builds; and
displaying, via the GUI, the second set of harness builds.

10. The computer-implemented method of claim 1, further comprising:
displaying, via a graphical user interface (GUI), a list of optional features selectable as give-away features; and
receiving, via the GUI, user input indicating selection of the first set of optional features from the displayed list of optional features.

11. A method comprising:
displaying, via a graphical user interface (GUI), a first set of harness builds of a harness family necessary to support a set of vehicle variance designs (VVDs) of a vehicle platform;
displaying, via the GUI, a list of optional features selectable as give-away features in harness builds of the VVDs;
receiving, via the GUI, user input indicating selection of a first set of optional features to be implemented as give-away features; and
displaying, via the GUI, a second set of harness builds necessary to support the set of VVDs based on the first set of optional features implemented as give-away features.

12. The method of claim 11, further comprising:
displaying, via the GUI, a cost to implement the first set of optional features as give-away features for the vehicle platform.

13. The method of claim 12, further comprising:
determining the cost to implement the first set of optional features as give-away features based on a per-harness cost to implement the first set of optional features as give-away features and based on a number of vehicles expected to be built without implementing the first set of optional features.

14. The method of claim 11, further comprising:
displaying, via the GUI, the list of optional features selectable as give-away features in harness builds of the VVDs;
receiving, via the GUI, user input indicating selection of a second set of optional features to be implemented as give-away features; and
displaying, via the GUI, a third set of harness builds necessary to support the set of VVDs based on the second set of optional features implemented as give-away features.

15. A system comprising:
one or more processors;
a storage device configured to store a database comprising information representative of an electrical/electronic (E/E) architecture of a vehicle, the information including information regarding relationships and connections between components of the E/E architecture of the vehicle and including performance parameters for aspects of the E/E architecture; and
a computer readable memory configured to store executable instructions, the executable instructions comprising:
instructions to manipulate the one or more processors to provide a graphical user interface (GUI);
instructions to manipulate the one or more processors to display, via the GUI, a first set of harness builds of a harness family necessary to support a set of vehicle variance designs (VVDs) of a vehicle platform;
instructions to manipulate the one or more processor to display, via the GUI, a list of optional features selectable as give-away features in harness builds of the VVDs;
instructions to manipulate the one or more processors to receive, via the GUI, user input indicating selection of a first set of optional features to be implemented as give-away features; and
instructions to manipulate the one or more processors to display, via the GUI, a second set of harness builds necessary to support the set of VVDs based on the first set of optional features implemented as give-away features.

16. The system of claim 15, wherein the executable instructions further comprise:
instructions to manipulate the one or more processors to determine a cost to implement the first set of optional features as give-away features for the vehicle platform.

17. The system of claim 16, wherein the executable instructions further comprise:
instructions to manipulate the one or more processors to display, via the GUI, the cost to implement the first set of optional features as give-away features for the vehicle platform.

18. The system of claim 16, wherein the instructions to manipulate the one or more processors to determine the cost comprise instructions to manipulate the one or more processors to determine the cost to implement the first set of optional features as give-away features based on a per-harness cost to implement the first set of optional features as give-away features and based on a number of vehicles expected to be built without implementing the first set of optional features.

19. The system of claim 15, wherein the executable instructions further comprise:
instructions to manipulate the one or more processors to receive, via the GUI, user input indicating selection of a second set of optional features to be implemented as give-away features; and
instructions to manipulate the one or more processors to display, via the GUI, a third set of harness builds necessary to support the set of VVDs based on the second set of optional features implemented as give-away features.

20. The system of claim 19, wherein the executable instructions further comprise:
instructions to manipulate the one or more processors to determine a cost to implement the second set of optional features as give-away features for the vehicle platform.

21. One or more computer-readable storage devices comprising:
- computer executable instructions for causing a computer to perform a set of operations; and
- wherein the set of operations include:
  - identifying a set of vehicle variance designs (VVDs) for a vehicle platform based on vehicle base configurations for the vehicle platform and features available for each vehicle base configuration;
  - determining on a computer a first set of harness builds of a harness family necessary to support the set of VVDs;
  - determining on the computer a first set of optional features to be implemented as give-away features in harness builds of the set of VVDs;
  - determining on the computer a second set of harness builds necessary to support the set of VVDs based on the first set of optional features implemented as give-away features; and
  - saving the determined first set of harness builds and the second set of harness builds to one or more memory storage devices.

22. The one or more computer-readable storage devices of claim 21, wherein the set of operations further comprising determining on the computer a cost to implement the first set of optional features as give-away features for the vehicle platform.

23. The one or more computer-readable storage devices of claim 22, wherein determining the cost to implement the first set of optional features as give-away features comprises determining the cost to implement the first set of optional features as give-away features based on a per-harness cost to implement the first set of optional features as give-away features and based on a number of vehicles expected to be built without implementing the first set of optional features.

24. The one or more computer-readable storage devices of claim 23, wherein the set of operations further comprising determining whether to implement the first set of optional features as give-away features based on the cost to implement the first set of optional features as give-away features.

25. The one or more computer-readable storage devices of claim 24, wherein the set of operations further comprising:
- in response to determining not to implement the first set of optional features as give-away features:
  - determining a second set of optional features to be implemented as give-away features in the harness builds of the set of VVDs; and
  - determining a third set of harness builds of the harness build necessary to support the set of VVDs based on the second set of optional features implemented as give-away features.

26. The one or more computer-readable storage devices of claim 25, wherein the set of operations further comprising determining a cost to implement the second set of optional features as give-away features for the vehicle platform.

27. The one or more computer-readable storage devices of claim 26, wherein the set of operations further comprising determining whether to implement the second set of optional features as give-away features based on the cost to implement the second set of optional features as give-away features.

28. The one or more computer-readable storage devices of claim 21, wherein determining the first set of harness builds comprises:
- determining an initial set of harness builds, each harness build of the initial set of harness build corresponding to a corresponding VVD of the set of VVDs; and
- determining the first set of harness builds based on similarities between connection patterns of the initial set of harness builds, the first set of harness builds comprising a reduced set of the initial set of harness builds.

29. The one or more computer-readable storage devices of claim 21, wherein the set of operations further comprising:
- displaying, via a graphical user interface (GUI), the first set of harness builds; and
- displaying, via the GUI, the second set of harness builds.

30. The one or more computer-readable storage devices of claim 21, wherein the set of operations further comprising:
- displaying, via a graphical user interface (GUI), a list of optional features selectable as give-away features; and
- receiving, via the GUI, user input indicating selection of the first set of optional features from the displayed list of optional features.

* * * * *